(12) United States Patent
Xu

(10) Patent No.: US 10,838,945 B2
(45) Date of Patent: Nov. 17, 2020

(54) INFORMATION PROCESSING NETWORK BASED ON UNIFORM CODE ISSUANCE, METHOD THEREFOR, AND SENSING ACCESS DEVICE

(71) Applicant: Wei Xu, Shanghai (CN)

(72) Inventor: Wei Xu, Shanghai (CN)

(*) Notice: Subject to any disclaimer, the term of this patent is extended or adjusted under 35 U.S.C. 154(b) by 235 days.

(21) Appl. No.: 15/767,062

(22) PCT Filed: Oct. 9, 2015

(86) PCT No.: PCT/CN2015/091553
§ 371 (c)(1),
(2) Date: Apr. 9, 2018

(87) PCT Pub. No.: WO2017/059580
PCT Pub. Date: Apr. 13, 2017

(65) Prior Publication Data
US 2018/0300364 A1 Oct. 18, 2018

(51) Int. Cl.
*G06F 16/23* (2019.01)
*G06F 16/951* (2019.01)
(Continued)

(52) U.S. Cl.
CPC ............ *G06F 16/23* (2019.01); *G06F 16/951* (2019.01); *G06Q 20/3276* (2013.01); *G06Q 40/12* (2013.12); *G06Q 50/00* (2013.01)

(58) Field of Classification Search
CPC ........ G06F 16/23; G06F 16/951; G06Q 40/12
See application file for complete search history.

(56) References Cited

U.S. PATENT DOCUMENTS 8,464,953 B2  6/2013 Zsigmond et al.
8,953,491 B2  2/2015 Clegg
(Continued)

FOREIGN PATENT DOCUMENTS

CN    1841425 A    10/2006
CN    1011311758 A    2/2008
(Continued)

OTHER PUBLICATIONS

China National Intellectual Property Administration, "Refusal Decision," issued in Chinese Patent Application No. 201510649977.0, which is a counterpart to U.S. Appl. No. 15/767,062, dated Jul. 29, 2019, 19 pages.

(Continued)

*Primary Examiner* — A. Hunter Wilder
(74) *Attorney, Agent, or Firm* — Amster, Rothstein & Ebenstein LLP

(57) ABSTRACT

An information processing network based on uniform code issuance, wherein a releaser sends a corresponding code issuing request to a core administrator, such that the core administrator or a code issuing agency authorized by the core administrator generates a coding medium; in this way, when an accessing party identifies the coding medium with an equipped sensing access device, it may obtain information that matches the identified coding medium and further obtain the following information provided by the releaser, including: information to be released by the releaser, attribute state of the releaser, attribute state of an interacting party associated with the releaser, and information obtained from identifying other coding medium with the sensing access device equipped to the releaser.

52 Claims, 20 Drawing Sheets

(51) Int. Cl.
*G06Q 50/00* (2012.01)
*G06Q 20/32* (2012.01)
*G06Q 40/00* (2012.01)

(56) References Cited

U.S. PATENT DOCUMENTS

| | | | |
|---|---|---|---|
| 2014/0045472 | A1 | 2/2014 | Sharma et al. |
| 2016/0373556 | A1 | 12/2016 | Xu |

FOREIGN PATENT DOCUMENTS

| | | |
|---|---|---|
| CN | 100465951 C | 3/2009 |
| CN | 103414687 A | 11/2013 |
| CN | 103426083 A | 12/2013 |
| CN | 104881437 A | 9/2015 |
| CN | 105354747 A | 2/2016 |
| GB | 2489332 A | 9/2012 |
| JP | 2001-005883 A | 1/2001 |
| JP | 2004-046781 A | 2/2004 |
| JP | 2004-171039 A | 6/2004 |
| JP | 2008-027157 A | 2/2008 |
| KR | 2014-0116295 A | 10/2014 |
| WO | 2004080097 A1 | 9/2004 |
| WO | 2014028389 A1 | 2/2014 |

OTHER PUBLICATIONS

China National Intellectual Property Administration, "First Office Action," issued in Chinese Patent Application No. 201510649977.0, which is a counterpart to U.S. Appl. No. 15/767,062, dated Oct. 25, 2018, 54 pages (31 pages of English Translation of Office Action and 23 pages of Original Office Action).

Korean Intellectual Property Office, "Notice of Final Rejection," issued in Korean Patent Application No. 10-2018-7012401, which is a counterpart to U.S. Appl. No. 15/767,062, dated Feb. 25, 2020, 5 pages (2 pages of English Translation of Office Action and 3 pages of Original Office Action).

Korean Intellectual Property Office, "Notice of Preliminary Rejection," issued in Korean Patent Application No. 10-2018-7012401, which is a counterpart to U.S. Appl. No. 15/767,062, dated Jun. 25, 2019, 22 pages (13 pages of English Translation of Office Action and 9 pages of Original Office Action).

Australian Government IP Australia, "Examination report No. 1 for standard patent application," issued in Australian Patent Application No. 2015411154, which is a counterpart to U.S. Appl. No. 15/767,062, dated Jul. 4, 2019, 3 pages.

Eurasian Patent Office, "Office Action," issued in Russian Patent Application No. 201890924/31, which is a counterpart to U.S. Appl. No. 15/767,062, dated Mar. 13, 2020, 5 pages (1 page of English Translation of Office Action and 4 pages of Original Office Action).

Innovation, Sciences and Economic Development Canada, "Examiners Report," issued in Canadian Patent Application No. 3,004,488, which is a counterpart to U.S. Appl. No. 15/767,062, dated Feb. 8, 2019, 4 pages.

European Patent Office, "Extended European Search Report," issued in European Patent Application No. 15 905 678.7, which is a counterpart to U.S. Appl. No. 15/767,062, dated Apr. 4, 2019, 7 pages.

European Patent Office, "Supplementary European Search Report," issued in European Patent Application No. 15 905 678.7, which is a counterpart to U.S. Appl. No. 15/767,062, dated Apr. 25, 2019, 1 page.

Japan Patent Office, "Notice of Reasons for Refusal," issued in Japanese Patent Application No. 2018-537700, which is a counterpart to U.S. Appl. No. 15/767,062, dated Jul. 12, 2019, 16 pages (8 pages of English Translation of Office Action and 8 pages of Original Office Action).

Japan Patent Office, "Notice of Reasons for Refusal," issued in Japanese Patent Application No. 2018-537700, which is a counterpart to U.S. Appl. No. 15/767,062, dated Mar. 24, 2020, 12 pages (6 pages of English Translation of Office Action and 6 pages of Original Office Action).

Jerry Zeyu Gao et al, "Understanding 2D-BarCode Technology and Applications in M-Commerce-Design and implementation of A 2D Barcode Processing Solution," 31st Annual International Computer Software and Applications conference (COMPSAC 2007), IEEE, 2007.

INFORMATION PROCESSING NETWORK BASED ON UNIFORM CODE ISSUANCE, METHOD THEREFOR, AND SENSING ACCESS DEVICE

This application is a National Stage entry under 35 U.S.C. 371 of International Patent Application No. PCT/CN2015/091553, filed on Oct. 9, 2015, the entire contents of which is incorporated by reference herein.

FIELD

The present disclosure relates to an information processing apparatus, a network, and an information processing method therefor, and more particularly relates to an information processing network based on uniform code issuance, a method therefor, and a sensing access device.

BACKGROUND

The dissemination act of information has its own value: with advertisement as an example, its essence is making information dissemination resources valuable. A high-value advertisement is surely published through a resource that may advertise information to more population under the same conditions. That is, the more audiences the advertisement reaches, the higher its value is. In conventional advertising means, information is only "spread" out; while the spread-out totally loses control of the subsequent dissemination process.

For a commodity, each dissemination act during the process from information advertising through reaching a final deal contributes to the final deal. With loss of any part of information delivery, the information will not reach a person having intention to deal, and the deal will not be reached. Therefore, the information dissemination act has a value, while a person implements the dissemination act is entitled to obtain the value as a reward for its act. However, this value is always undervalued, because currently, an efficient and universally applicable technical means is unavailable to track effective dissemination acts implemented by respective disseminators during the whole process, such that the values of the respective disseminators during the dissemination process can hardly be cashed.

In a direct-selling hierarchy, the upstream-downstream relationship at each layer is clear, which is convenient for paying commissions layer by layer after the deal is made. However, the direct-selling hierarchy fails to fully embody the dissemination value; it has a drawback that you have to join in the dissemination network to become a member of the direct-selling hierarchy; it has become an occupant for a subject of the dissemination to create orders and directly get the commissions. Due to this utilitarian nature and a person's limitation that he/she cannot sell all stuffs, the kinds and scope of information (e.g., commodity information) are objectively narrowed. Further, the dissemination acts and commission payments under this direct-selling hierarchy cannot be verified and implemented through technical means.

The whole process of information dissemination, from an advertiser as an origin till the information is finally received and a certain act is taken, must be a path passing through different inter-person relationship circles, and each intermediate node is located at a crisscross between two or more inter-person circles. An inter-person network formed by people in the society is a complex of multi-layered inter-person relationship circles formed by social relationships having different close degrees such as blood relationship, diploma, work, interest and hobbies, a core of which is individual-centered (in other words, individuals are located at different social groups). Besides point-to-point manners such as personal meeting, phone call, and SMS, information interaction and circulation occurring in social communications of people currently relay more on Internet-based social networking platforms.

Although enough information may be found through search engines on the Internet, what have been accessed are not necessarily the information you need. Furthermore, for a common consumer who does not care about the Internet or latest trends of e-Commerce anywhere or anytime, he/she would have no enough keyword reservations for implementing further search. Therefore, to access information in this way has a relatively large limitation.

Information dissemination over social networks has the following characteristics: an information poster and disseminator has a certain prediction on whether a recipient will receive the information or further disseminate the information based on his/her understanding of the information recipients in a corresponding social group, which corresponds to the disseminator's active screening behavior to a certain degree, such that information dissemination in the inter-person circle has a stronger directivity. On the other hand, in a stable inter-person circle, each person will be cautious about his/her words and behaviors, such that a consequence of compromising the current inter-person relationships will not occur. This actually means social behaviors including information dissemination are all guaranteed with personal quality appraisals and social credits. Therefore, information dissemination through social networks, particularly circles with familiar people, a disseminator will consciously or unconsciously verify the information so as to ensure the trueness of the information as much as possible. Excluding serial frauds, the trueness and credibility of this dissemination are very high. However, similar screening operations are now determined and implemented by individuals. An effective technical means is unavailable to perform rights control to the situations of information senders and recipients; moreover, even the rights are set, it is still hard to match and verify the actual situations of the information senders and recipients with the set rights, such that the current information dissemination lacks pertinence with a poor effect.

Additionally, the information interaction for current social networks is Internet-based. However, the Internet has inherent defects: Internet users are not of a real name nature, who are represented by IP addresses, and such an "identity identification" may change at any time, such that a person may appear on the Internet with different roles. Even an operation is performed by a non-human (some animals, intelligent robots, etc.) on the Internet through a corresponding terminal, it cannot be discerned. The non-real name characteristic of the Internet is the largest barrier for business operation. Therefore, various business applications unanimously add ID number, home address, mobile number, phone number, real name and the like to urge subscribers to fill more detailed information. However, this will not only affect user conversion rate, but also will incur chain reactions in the aspect of information security such as personal privacy leakage.

Moreover, the information credibility on the Internet basically cannot be testified for individuals; therefore, the user will consciously or unconsciously hold a suspicious attitude on the Internet. In an Internet-based business mode, a merchant has spent massively on keeping customer stickiness, while commodity or service quality issues, regardless of their authenticity, will cause customer loss and repeated investment on marketing. The so-called e-Commerce mode/Internet mental mode will become a misconception of burning cash for traffic.

The virtual economy ushered by the Internet era substantively maps the real economy to a virtual space, which handles and digs out various consumption demands by extending new means using computer terminals and Internet convenience. However, the various kinds of Internet business modes can hardly closely combine the network virtual world with the real world. When you sit before a computer to pick up the mouse to start using the Internet, dimensional shift occurs, i.e., you shift from the real physical world to the virtual Internet. This virtual experience promptly ends when you put away the mouse to leave the computer, and you return to the real world. When you carry on activities in daily life with the Internet, such shift constantly exists. The various drawbacks above restrict the development of Internet economy and can hardly extend the Internet technologies to traditional industries.

Further, the social nature of people decides that their normal life is in the offline real economic circle, generally within a sensing range not exceeding a certain distance centered with an individual person. A means is urgently needed, which enables on-site experience offline (e.g., at a store) while may find corresponding resources (e.g., commodity information) from the virtual world, thereby associating the activities in the real world with the virtual world anytime and anywhere. However, effective technical means is currently unavailable to address this issue.

To access the virtual world in the Internet, a link (URL: Uniform Resource Location) may be entered in a browser. A simpler and more direct way is available in the mobile Internet, i.e., two-dimensional barcode. The two-dimensional code is a particular geometric image, which uses a black-and-white image distributed in a two-dimensional direction according to certain rules to record data symbol information. Two-dimensional codes for mobile phones are applications of two-dimensional code technologies on mobile terminals, which enable users to quickly access the Internet in any networked real world.

Chinese patent application No. 200510033918.7, filed on Mar. 31, 2005, entitled "MOBILE TERMINAL SHOPPING METHOD AND SYSTEM THEREOF," discloses a method and a system for implementing mobile terminal shopping using a two-dimensional code. A mobile terminal photographs a two-dimensional code through a built-in camera and decodes the two-dimensional code; then, the mobile terminal sends a payment request message to a payment subsystem which completes payment.

Chinese patent No. ZL200480005625.1, filed on Mar. 8, 2004, entitled "METHOD FOR PROVIDING MOBILE SERVICES BY USING CODE GRAPH," discloses a method and a system for providing mobile services using a code graph, specifically a method and a system for providing content providing services, geographical information providing services, product information providing services, taxi call services, personal contact information providing services or payment services using two-dimensional codes. A mobile terminal photographs a two-dimensional code through a built-in camera and decodes the two-dimensional code; then, the mobile terminal sends a service providing request message to a service provider server, the service provider server providing a service to the mobile terminal itself, or the service provider server communicating with another server to provide a service to the mobile terminal.

However, the smart phone as a main means for on-site sensing in the mobile Internet cannot overcome the inherent drawbacks existing in the Internet. A further problem currently encountered is that the process for the mobile phone to sense the two-dimensional code is too complex: unlocking the mobile phone screen to open an APP's two-dimensional scanning function, and at least 6-7 times of click operations are needed. Secondly, for a certain two-dimensional image perceived, a typical consumer cannot discern a correspondence relationship between the two-dimensional code and a mobile phone application; therefore, scanning is always performed through some common code scanners; then, the obtained two-dimensional parsing results are all webpage links; after clicking, it is the mobile phone browser that is first opened, instead of the mobile APP that may execute corresponding functions. All of such problems will greatly affect use experience. Further, wearable devices such as Google glasses and smart watches are actually still a transformed smart phone, except being more portable; besides, they pose a great threat to the privacy of other people.

Currently, it is hard to effectively associate or verify a user's identity with an operation executed by a device such as a smart mobile phone or a real environment where the user is located through the prior art, which is adverse to for example, track an act like dissemination as implemented in information dissemination, and adverse to identify the user's identity by other relatives and friends in his/her social circles; besides, effective measures are unavailable for an external supervising and regulating agency to regulate the information interaction between the user and other user or application server and the operations executed.

SUMMARY

To address the above problems currently existing, the present disclosure provides an information processing network based on uniform code issuance, an information processing method therefor, and a sensing access device applicable thereto.

In the information processing method based on uniform code issuance provided by the present disclosure, any interacting party in a plurality of interacting parties may act as a releaser to obtain a coding medium matching information provided thereby; any interacting party may act as an accessing party to identify the coding medium through a sensing access device equipped, to thereby obtain information matching the identified coding medium and to further obtain the information provided by the releaser of the identified coding medium.

In a different example, any interacting party may act only as a releaser, or only as an accessing party, or act both as a releaser and an accessing party in different circumstances. The coding medium identified when any interacting party acts as an accessing party may be a coding medium generated based on the information provided by the interacting party as a releaser, or a coding medium generated based on information provided by other interacting party as the releaser.

Any releaser sends a corresponding code issuing request to an interacting party as a core administrator in the plurality of interacting parties to require acquiring a coding medium matching the information provided by the releaser; the core administrator receives the corresponding code issuance request such that the core administrator or a code issuing agency authorized thereby generates the coding medium. In a different example, the code issuing agency refers to a coding medium generating unit equipped to the releaser that sends the corresponding code issuing request, or a coding medium generating unit equipped to other interacting party than the releaser, or a third-party coding medium generating device other than the plurality of interacting parties.

Preferably, because code issuance of the coding medium is obtained by requesting the core administrator and generated by the core administrator, or although the coding medium is generated by the code issuing agency, it must be authorized by the core administrator, the core administrator may uniformly manage generation of the coding medium.

In a different example, the information provided by the releaser for generating the coding medium includes any or any combination of the following: information to be released by the releaser, attribute state of the releaser, attribute state of an interacting party associated with the releaser, and information obtained from identifying other coding medium using the sensing access device equipped to the releaser. Then, such information corresponding to the coding medium may be known by identifying a certain coding medium using the sensing access device.

In some examples, the information corresponding to a certain coding medium may only include some information items in the information above; while some other information items therein may be corresponding to another coding medium, which may be either separately sent to any interacting party such as an accessing party or an appointed interacting party, or sent, together with the coding medium either corresponding to the information item or not corresponding to the information item, to the any interacting party such as an accessing party or an appointed interacting party.

In some examples, service information may be one kind of information that needs to be released, included in the information provided by the releaser for obtaining the coding medium. The service information corresponds to a service provided by an interacting party as a service agency; the service corresponding to the service information is independently provided by one service agency or provided by cooperation from a plurality of service agencies; any interacting party knowing this service information, e.g., an accessing party obtaining the service information by identifying the coding medium, sends a service providing request to the service agency, such that the interacting party (e.g., the accessing party) sending the service providing request or an interacting party appointed thereby may obtain the service corresponding to the service information. Based on different natures of the services provided, the core administrator, the releaser, the interacting party associated with the releaser, the accessing party, and the interacting party associated with the accessing party may respectively act as a service agency to participate in the service providing process, or act as a party obtaining the entirety or a part of the service, respectively.

In different examples, the service provided by the service agency or the service information corresponding thereto matches an execution situation of a set operation and/or a set attribute state; the set operation includes operations independently executed by appointed on or more interacting parties in the plurality of interacting parties, or operations executed by cooperation from appointed some interacting parties thereamong; and the set attribute state refers to a state of one attribute or a superimposition of states of a plurality of attributes corresponding to one appointed interacting party in the plurality of interacting parties, or a superimposition of respective corresponding attribute states of appointed some interacting parties among the plurality of interacting parties.

Preferably, specific providing situations of the service information or service may be prescribed in a service providing policy. For example, it may be prescribed that the service agency only provides a service when the set operation is correctly executed by an appointed interacting party, and/or when the attribute state of the appointed interacting party is consistent with the set attribute state; for example, if the service agency has a capability to provide a plurality of different services, it may be prescribed that a certain service therein may be provided when the actual execution situation of the set operation and/or the actual attribute state of the appointed interacting party belongs to a certain situation, while a different service is provided when belonging to another situation. Based on different natures of services, in some examples, an interacting party as the service agency per se may act as an appointed party (one of appointed parties), and whether its operation execution situation and/or attribute state is consistent with a prescribed service providing policy is verified to determine whether to provide a corresponding service.

Any interacting party has an attribute corresponding thereto. An attribute item and/or a corresponding state of the attribute item may act as one kind of information that needs to be released or may be used to be combined with other information that needs to be released, included in the information provided by the releaser for obtaining the coding medium. Any interacting party may provide such information to other interacting parties by directly sending the attribute state or by releasing a coding medium including information corresponding to the attribute state.

Preferably, specific situations of attribute adjustment may be prescribed by an attribute adjustment policy. Attributes of an interacting party satisfies any one or any combination of the following: the states of one or some attributes of any interacting party are adjusted based on state changes of another one or some attributes of the any interacting party; states of one or some attributes of any interacting party are adjusted based on state changes of one or some attributes of an interacting party associated with the any interacting party; states of one or some attributes of any interacting party are adjusted based on execution situation changes of a set operation of the any interacting party; and states of one or some attributes of any interacting party are adjusted based on execution situation changes of a set operation of an interacting party associated with the any interacting party.

The attributes corresponding to the any interacting party are recorded and state adjustment are performed by one attribute management agency independently or by cooperation from a plurality of attribute management agencies; in different cases, the attribute management agency may refer to any one of the following: the any interacting party, an interacting party associated with the any interacting party, the core administrator, and a third-party management device other than the interacting party appointed by the core administrator.

Any interacting party has one or more identification information corresponding thereto; each identification information of the each interacting party may be used as one kind of information that needs to be released, or may be used to be combined with other information that needs to be released, included in the information provided by the releaser for obtaining the coding medium. Any interacting party may provide such information to other interacting parties by directly sending the identification information or by releasing a coding medium including the identification information. The identification information may act as one attribute of the interacting party and have the characteristic described above regarding the attributes.

Preferably, the identification information may satisfy any one or any combination of the following: the identification information corresponding to the any interacting party when performing any operation is used for binding the execution situation of the operation with the interacting party; the any interacting party superimposes the identification information of the any interacting party to the information to be released to the outside and then directly releases the superimposed information; the interacting party receiving the released information determines the interacting party that provides the released information by discerning the identification information; when the any interacting party acts as a releaser, after superimposing the identification information of the any interacting party to the information to the released to the outside, provides the information superimposed with the identification information to the core administrator or the code issuing agency authorized by the core administrator to generate a corresponding coding medium, and releases the coding medium; the accessing party identifies the corresponding coding medium to obtain a binding relationship between the coding medium and the releaser.

In some examples, the identification information of any interacting party may be independently provided or provided together with other attributes or other information. When any interacting party as a releaser sends a corresponding code issuing request during executing an operation set thereto, the information simultaneously provided to the core administrator at least includes the identification information of the interacting party and the information about its executing of the set operation, thereby binding the coding medium generated based on the corresponding code issuing request with the releaser's execution situation of the set operation, such that the binding relationship may be known by identifying the corresponding coding medium.

One attribute of any interacting party is a monetary share of the interacting party, having the characteristics about the attributes described above; an entirety or a portion of the monetary share of the any interacting party may be distributed and adjusted between appointed some interacting parties; the monetary share of the any interacting party is obtained or adjusted according to any one or any combination of the following manners: the any interacting party obtains a matching monetary share by pledging assets to the core administrator or an appointed approval authority or an appointed other interacting party; the any interacting party obtains a monetary share of a corresponding percentage through exchanging by paying a currency of any kind to the core administrator or an appointed approval authority or an appointed other interacting party; the any interacting party obtains a monetary share or the currency exchangeable to the monetary share of a corresponding percentage paid to the any interacting party by the core administrator or an appointed approval authority or an appointed other interacting party; and appointment of the approval authority or other interacting party is implemented by the any interacting party, or the core administrator, or an interacting party associated with the any interacting party. appointment of the interacting party and distribution of the monetary share may be prescribed by an attribute adjustment policy associated with monetary share attribution.

In some different examples, that the interacting party pays the monetary share is to obtain a service (not limited to obtaining a commodity, content, and rights, etc.) provided by the service agency; or the interacting party obtains a monetary share paid thereto by other interacting party as a reward based on its execution of a certain operation (particularly an operation prescribed by the monetary distribution policy). A preferable currency is a digital currency, which may facilitate share distribution (transfer) between different interacting parties or even may be actually used in replacement of an issued currency in different regions of the real world.

one of the attributes of the any interacting party refers to association information about an association between the interacting party and other interacting party; and when the any interacting party is executing the set operation and/or adjusting the set attribute state, the attribute management agency may adjust the attribute state of the interacting party associated with the any interacting party. In some examples, an interacting party becomes a registered user of one or some other interacting parties to thereby form an association therebetween; or an interacting party is mutually associated with a peer interacting party when performing a cooperative interaction operation; or, an accessing party is associated with a releaser by identifying a coding medium; or, some interacting parties are appointed as associated interacting parties by a service agency, or a policy stipulation agency, or the core administrator; and so on.

one of the attributes of the any interacting party refers to a set weight index corresponding to the interacting party; based on the weight index, the attribute management agency may coordinately adjust different attributes of a same interacting party or coordinately adjust a same attribute of different interacting parties. With distribution of monetary share as an example, it may be correspondingly adjusted based on different situations of operation execution of a certain interacting party, which may also be distributed based on respective operation execution situations of different interacting parties.

one attribute of any interacting party refers to a physical world characteristic corresponding to the interacting party; the physical world characteristic includes, but not limited to, corresponding to any one of the following or any combination thereof of a real environment and/or a virtual environment where the interacting party is currently located: time parameter, location parameter, ambient parameter, and state of another one or some attributes of the interacting party per se. In some examples, although some physical world characteristics per se are not affected by any interacting party (e.g., time), executing of some actions or states by a certain interacting party or its associated interacting party may be used as a start point/end point of metering or measuring the physical world characteristic, thereby becoming the physical world characteristic corresponding to the interacting party. Based on different application situations, the physical world characteristics may be obtained via various approaches such as from the any interacting party, its associated interacting party, the core administrator, or an external third party, etc. The real environment and/or virtual environment may be divided into a plurality of physical grids based on different physical world characteristics; a physical world characteristic corresponding to a certain interacting party may facilitate respective parties to understand the real environment and/or virtual environment where the interacting party is located and thereby understand the physical grid where the interacting party is located.

the core administrator stipulates or updates coding rules and decoding rules matching the coding rules, such that the core administrator or a code issuing mechanism authorized thereby may generate corresponding coded information based on uniform coding rules and generate a corresponding coding medium based on the coded information; and a sensing access device based on the matching decoding rules may identify corresponding coded information from the coding medium as well as the information provided by the issuer. Any interacting party as a policy releasing agency stipulates or updates a policy associated with the information provided by the releaser; the policy includes, but not limited to, a service providing policy associated with the information provided by the releaser, and/or the attribute adjustment policy associated with the attribute state provided by the releaser; and policy appointment and update by the policy releasing agency matches the execution condition of the set operation and/or the set attribute state.

Preferably, in the example, in the policy of the policy releasing agency, execution logic of a set operation of appointed one or more interacting parties among the plurality of interacting parties is set, such that the corresponding coding medium generated based on the coding rules matching the policy includes an instruction that drives the corresponding interacting party to execute the set execution logic; and the sensing access device of the corresponding interacting party obtains the instruction by identifying the coding medium based on the matching decoding rules. Preferably, if an accessing party is a registered user of the releaser of the coding medium or an interacting party associated therewith (e.g., a service agency associated with the releaser), then the accessing party decodes and parses the coding medium based on decoding rules consistent with the coding rules to obtain corresponding instruction or information, for performing information interaction or interactive operation with the appointed releaser or the interacting party associated therewith, thereby capable of forming a closed loop transaction process which cannot be accessed by an external non-appointed interacting party, which provides a higher security.

Preferably, any information provider or any coding medium releaser may form an interactive network centered about itself, corresponding to voluntarily accessing the interactive network. Besides obtaining corresponding information, any information receiver or any accessing party identifying the coding medium may also be passively accessed to the above-mentioned interactive network.

In some application examples, when any interacting party as a first releaser is sending a first code issuing request, the information provided at least includes identification information of the first releaser, and a first coding medium generated based on the first code issuing request is obtained; any other interacting party as an accessing party identifies the first coding medium with the equipped sensing access device to at least obtain the identification information of the first releaser, and the information provided when sending a second code issuing request as a second releaser at least includes the identification information of the first releaser and the identification information of the second issuer, to thereby bind the second coding medium generated based on the second coding request with the first issuer and the second issuer, the binding relationship being knowable by identifying the second coding medium.

In some application examples, the first releaser and the interacting party associated therewith constitute a first ad-hoc interactive network centered about the first releaser; the second issuer accesses the first ad-hoc interactive network by identifying the first coding medium, causing the second issuer and the first issuer to be associated, and causing a second ad-hoc interactive network, which is formed by the second issuer and an interacting party associated therewith and centered about the second issuer, to be integrated with the first ad-hoc interactive network; and the second accessing party accesses the second ad-hoc interactive network by identifying the second coding medium and meanwhile accesses the first ad-hoc interactive network to achieve association with the first releaser and the second releaser.

In some application examples, an interactive network exists between a first interacting party and an interacting party associated therewith; a second interacting party and a third interacting party access to the interactive network, respectively, to be associated with the first interacting party, respectively; information released by the second interacting party to the first interacting party includes any one or any combination thereof: shared information, search request information, and help request information; the first interacting party sends the shared information to the third interacting party in the interactive network; the first interacting party searches, based on the search request information, reply information associated with the search request information in the interactive network, and sorts the reply information to form a search request, and then pushes the search result to the second interacting party; the reply information is provided by the third interacting party to the first interacting party; and the first interacting party sends the help request information to the third interacting party in the interactive network to facilitate the third interacting party to provide the reply information to the first interacting party based on the search request information.

In some application scenarios, a plurality of first interacting parties are provided, which correspond to a same motif or a plurality of different motifs, respectively; the second interacting party is associated with the first interacting parties having a corresponding motif based on one or more identification information of the first interacting parties; the first interacting party of one motif or a fourth interacting party associated therewith, as the first issuer, issues a first coding medium obtained to the second interacting party; and the second interacting party, after identifying as a first accessing party the information corresponding to the first coding medium, issues as a second issuer a second coding medium generated based on the information provided by the second issuer to the first interacting party (parties) of other motif.

In some application examples, the first interacting parties of a plurality of motifs adjust, based on a secondary weight index, attribute states under corresponding identification information of the second interacting parties associated with them respectively; and the core administrator receives attribute states under the corresponding identification information of the second interacting parties, which are provided by the respective first interacting parties, and comprehensively adjusts the attribute states under all identification information of the second interacting parties based on a comprehensive weight index.

In some application scenarios, a plurality of second interacting parties are associated with a same first interacting party, respectively; the first executing party sets the execution logic of an operation; the operation with the execution logic being set includes any one or any combination of the following: independent operation of respective second interacting party, interactive operations between the plurality of second interacting parties, and interactive operations between the second interacting parties and the first interacting party; and the first interacting party provides the execution logic to the core administrator, such that the coding medium generated by the core administrator or the code issuing agency authorized thereby based on the corresponding code issuing request from the first interacting party or the second interacting party includes an instruction that drives the first interacting party and/or the second interacting party to execute a corresponding operation set with the execution logic; the first interacting party or the second interacting party obtains the instruction by identifying the coding medium through their respective sensing access device.

In some application scenarios, the plurality of first interacting parties are associated with a same third-party interacting party, and information interaction between the first interacting party and the core administrator is uniformly implemented by the third interacting party; the third executing party sets the execution logic of an operation; the operation with the execution logic being set includes any one or any combination of the following: independent operation of respective first interacting party or second interacting party, interactive operations between the plurality of second interacting parties, interactive operations between a plurality of second interacting parties, and interactive operations between the second interacting parties and the first interacting party; and when an operation with execution logic being set is set with corresponding identification information and the corresponding interacting party executes any step of the operation with execution logic being set, the third interacting party provides the identification information of the operation and the identification information of the interacting party executing the operation to the core administrator to cause the generated coding medium to at least include the identification information, such that any interacting party may obtain execution conditions of respective steps in the operation by identifying the coding medium.

Preferably, the any coding medium may be released by the releaser to at least one region identifiable by the accessing party through any one or any combination of the following manners: the releaser sends the corresponding coding medium to the sensing access device of the accessing party; the releaser includes a module that may provide the at least one region, and releases the corresponding coding medium through the module; and the releaser sends the corresponding coding medium to a module that may provide the at least one region and releases the corresponding medium through the module.

Preferably, based on the information provided by the releaser, the core administrator or the code issuing agency authorized thereby generates a matching coding medium or generates a coding medium and a corresponding hyperlink; and the coding medium refers to any one or any combination thereof: a bar code image where the coded information is generated in a pattern of one-dimensional code, two-dimensional code, or multi-dimensional code; an optical lattice diagram where the coded information is generated in a form of light-shadow ray or refurbishing frequency variation or in a form of visible light or UV or infrared light or polarized light; and a digitalized acoustic wave or radio wave generated with a specific law or a specific frequency variation pattern; and the sensing access device includes a device that may identify a corresponding type of coding medium and/or hyperlink.

The present disclosure provides a sensing access device that may be adapted to implement the information processing method based on uniform code issuing and the functions described in respective examples. An interacting party using the sensing access device acts as a releaser, an accessing party, a core administrator, a service agency, a policy releasing agency, a code issuing agency, and an attribute management agency in different circumstances, following the method above and the corresponding features described in the examples of the method.

The sensing access device is configured through software, hardware or a combination thereof, so as to be capable of implementing any one or any combination of the respective examples below:

In some examples, the sensing access device identifies a coding medium to obtain information matching the identified coding medium;

In some examples, the sensing access device identifies the coding medium to cause an interacting party equipped with the sensing access device as an accessing party to access an ad-hoc interactive network constructed with a releaser of the coding medium as the center, such that the accessing party may interact via the sensing access device with the releaser or other interacting party associated with the releaser in the ad-hoc interactive network.

In some preferred examples, the interacting party equipped with the sensing access device is an entity person.

In some examples, the sensing access device comprises:

an obtaining module configured for obtaining a coding medium of a corresponding type; wherein the obtained coding medium may be decoded by a decoding unit of the sensing access device or a decoding unit of other interacting party to obtain coded information; further, the coded information decoded may be parsed by a coded information decoding unit of the sensing access device or a coded information parsing unit of other interacting party to obtain information matching the coded information;

a sensing/receiving unit configured for causing the interacting party equipped with the sensing access device to interact with other interacting party; for example, but not limited to: sending a service providing request for obtaining a service and/or obtaining corresponding service information, service or service providing voucher, etc., sending as a releaser a code issuing request to the core administrator and providing information and/or receiving the generated coding medium/or an authorization for autonomously code issuing, sending or receiving any information/coding medium, sending or receiving a policy needed by an appointed coding rule or receiving a coding rule or corresponding decoding rule stipulated or updated by the core server, sending or receiving an attribute state of the interacting party or an associated interacting party, performing information interaction with other interacting party accessed to the interactive network sending the corresponding information or data to other parts in the sensing access device or receiving from these parts the information having been sent to other interacting parties, etc.; a sending/receiving unit equipped to other interacting parties; by sending/receiving such information and further processing it by a corresponding module of the sensing access device, corresponding functions may be implemented by the interacting party equipped with the sensing access device;

Optionally, the sensing access device may include an input unit for inputting the input information involved in the interaction; different input units based on the required input information may have various forms;

Optionally, the sensing access device may include an exhibiting unit configured for exhibiting content identified from the coding medium and content involved in interaction; such contents may be visual, audio or any other arbitrary form.

Optionally, the sensing access device may include a coding medium generating unit, for generating a corresponding coding medium based on authorization of the core administrator, the information provided by the interacting party equipped with the sensing access device being superimposed in the generated coding medium.

Optionally, different parts of a sensing access device are configured in a same interacting device or separately configured in a plurality of interacting devices that are signal connected; wherein the interacting device is a mobile terminal, or a stationary terminal, or a wearable device (also including human body implants); the interacting device is provided with an internal sensor or signal connected with an external sensor to acquire attribute states of the interacting party.

In some examples, the decoding rules matching the coding rules based on which the core administrator or an interacting party under its authorization generates the coding medium are set in client software; the sensing access device decodes the coding medium matching the coding rules through the client software to obtain corresponding coded information, parses the corresponding coded information to obtain parameters included in the coding medium, and automatically imports the parameters into the automatically boosted client software; and for an unidentifiable coding medium, the sensing access device automatically installs the decoding client software or updates the decoding rules in the decoding client software or issue an error prompt.

In some examples, the sensing access device is provided with an acquiring unit adapted to acquire at least some attribute states corresponding to the interacting party equipped with the sensing access device; the attributes states, for example, include, but not limited to: physical world characteristics, identification information, association information, weight index, monetary share, user profile of an entity person, physical state of the entity person, etc.

the interacting party with the entity person as the body has one or more identification information corresponding thereto; each identification information of the interacting party satisfies any one or any combination of the following:

corresponding identification information when the interacting party is performing any operation is used for binding an execution situation of the operation to the interacting party;

the interacting party, after superimposing the identification information of the interacting party to the information to be released to the outside, directly releases the information superimposed with said identification information; and the interacting party receiving the released information determines, by identifying the identification, the interacting party that provides the released information; and when the interacting party acts as a second releaser, after superimposing the identification information of the interacting party to the information to be released to the outside, provides the information superimposed with the identification information to the core administrator or the authorized code issuing agency to generate a corresponding second coding medium, and releases the second coding medium; by identifying the second coding medium, a binding relationship between the second coding medium and the interacting party as the second releaser may be known.

In some examples, an interacting party with the entity person as the body has one or more identification information corresponding thereto; each identification information of the interacting party satisfies any one or any combination of the following:

corresponding identification information when the interacting party is performing any operation is used for binding an execution situation of the operation to the interacting party;

the interacting party, after superimposing the identification information of the interacting party to the information to be released to the outside, directly releases the information superimposed with said identification information; and the interacting party receiving the released information determines, by identifying the identification, the interacting party that provides the released information; and when the interacting party acts as a second releaser, after superimposing the identification information of the interacting party to the information to be released to the outside, provides the information superimposed with the identification information to the core administrator or the authorized code issuing agency to generate a corresponding second coding medium, and releases the second coding medium; by identifying the second coding medium, a binding relationship between the second coding medium and the interacting party as the second releaser may be known.

In some examples, the first releaser and an interacting party associated therewith constitute a first ad-hoc interactive network centered about the first releaser; the interacting party with the entity person as the body acting as a first accessing party identifies, through the sensing access device, the first coding medium released by the first releaser and is accessed to the first ad-hoc interactive network; and an interacting party with an entity person as the body further acts as a second releaser to release a second coding medium; another interacting party as a second accessing party identifies the second coding medium through another sensing access device equipped to realize association with the second releaser, thereby causing the second accessing party to access to a second ad-hoc interactive network, which is formed by the second releaser and an interacting party associated therewith and centered about the second releaser, and meanwhile access to the first ad-hoc interactive network, such that the second ad-hoc interactive network is integrated with the first ad-hoc interactive network.

The present disclosure provides an information processing network based on uniform code issuing, which may be adapted to implement the information processing method based on uniform code issuing and the functions described in respective examples. the information processing network comprises a plurality of interacting parties, including:

a core administrator that, based on a received code issuing request, autonomously generates a coding medium matching the code issuing request or authorizes, after verifying rights of a code issuing agency, the code issuing agency to generate a coding medium matching the code issuing request;

any interacting party as an issuer, which sends the code issuing request and provides information to the core administrator and obtains the coding medium that is generated by the core administrator or an authorized code issuing agency and matches the provided information;

any interacting party as an accessing party, which identifies, through a sensing access device equipped thereto, the coding medium released to at least one region identifiable by the accessing party, to obtain information matching the identified coding medium and further obtain information provided by the releaser of the identified coded information.

Preferably, any information provider or any coding medium releaser may form an ad hoc interactive network centered about itself, corresponding to voluntarily accessing the ad-hoc interactive network. Besides obtaining corresponding information, any information receiver or any accessing party identifying the coding medium may also be passively accessed to the above-mentioned ad-hoc interactive network.

Particularly, any interacting party, when acting as a releaser, an accessing party, a core administrator, a service agency, a policy releasing agency, a code issuing agency, and an attribute management agency in different circumstances, follow the method above and the corresponding features described in the examples of the method. Particularly, a sensing access device equipped to an interacting party acting as an accessing party may be implemented by the sensing access device described above.

In some examples, any interacting party includes essential parts and optional parts:

the essential parts include: a sending/receiving unit configured for interacting with other interacting party and for interacting with other units of a background server; and the optional parts include any one or any combination of the following:

a sensing access device;

a built-in or external database for storing various information data during an interaction process;

a decoding unit configured for decoding the coding medium obtained by the interacting party to obtain coded information;

a coded information parsing unit configured for parsing the obtained coded information to obtain information matching the coded information;

an input unit configured for inputting input information involved in interaction;

an exhibiting unit configured for outputting content identified from the coding medium and content involved in interaction;

a coding medium generating unit configured for generating the coding medium under authorization from the core administrator;

wherein the sending/receiving unit included in an interacting party as a releaser is configured for sending a code issuing request to the core administrator and receiving the generated coding medium, and is further configured for releasing the obtained coding medium to at least one region identifiable by the accessing party;

the sending/receiving unit included in an interacting party as a code issuing agency is configured for receiving an authorization sent from the core administrator to allow the code issuing agency to autonomously generate the coding medium, such that the coding medium generating unit of the code issuing agency generates the coding medium under the authorization from the core administrator;

the essential parts of an interacting party as a policy releasing mechanism further includes an access defining unit configured for formulating or updating a policy associated with the information provided by the releaser, and sending the policy to the core administrator through the sending/receiving unit of the policy releaser; and the sending/receiving unit of an interacting party as a core server is configured for receiving the code issuing request sent from the releaser or releasing the generated coding medium to the releaser or an interacting party appointed by the releaser; essential parts of the interacting party as the core server further include: a coding medium generating unit configured for generating a matching coding medium from the information provided by the releaser;

optional parts of the interacting party as the core server include any one or any combination of the following:

a verifying unit configured for verifying, based on the code issuing request from the releaser, whether a code issuing agency appointed by the code issuing request has rights for autonomously generating a coding medium; wherein when the appointed code issuing agency has rights for autonomously generating a coding medium, the sending/receiving unit of the interacting party as the core server sends, to the appointed code issuing agency, an authorization of allowing the code issuing agency to autonomously generate the coding medium; and a rule managing unit configured for formulating or updating the coding rules and the decoding rules matching the coding rules based on the policy provided by the policy releasing agency.

For example, when any interacting party is acting as a releaser, an accessing party, a core administrator, a service agency, a policy releasing agency, a code issuing agency, or an attribute management agency, etc., the parts configured thereto may be provided in the corresponding server or provided in a mobile terminal, a stationary terminal, or a wearable device (also including human body implants), etc.

In some examples, any interacting party has disclosure rights set with respect to the information received thereby and/or sent therefrom, the disclosure rights being configured for defining a plurality of conditions for receiving and/or sending information; wherein some conditions include attribute states of the any interacting party, or attribute states of other interacting party.

In a preferred example of the present disclosure, the present disclosure provides a "mobile terminal/wearable device" configured to be accessible to a "digital human being network." The digital human being network refers to a social network hierarchy where respective nodes under a specific motif include corresponding dynamic social statuses/social reputation indexes, and include social attitudes/open attitudes (for selecting which motif is received, selecting open to which friends (e.g., casual acquaintance, or allowing friends of friends, or allowing those friends with a certain level of social reputation index to access, irrespective of the acquaintance degree); another one of its main characteristics is a site (environment) access, where parameters related to the scene upon access are acquired and uploaded; the access manner may be various kinds of sensing access, e.g., optical instead of electrical (one-dimensional code, two-dimensional code, and multi-dimensional code, hidden two-dimensional code, etc.), acoustic wave, Bluetooth, brain wave, and various kinds of "digital signal propagation and reception" manners, which are implemented by a matching generating module and identification module.

In a preferred example of the present disclosure, human (entity person) behaviors may include "active code scanning access" and "passive code scanning access," i.e., making the access behavior voluntarily or interaction with other person that making the access behavior; "access" refers to a relevant action performed by identifying, based on corresponding rules, a medium coded with a certain set rule which is seen, heard, or received in the real world; an effect generated by the "access" does not purely embody the "object itself," but a "specific motif" generated under a specific "scene" wherein the specific motif may be predefined, or triggered based on a certain condition, e.g., including "moral quality index of social search of the accessing or accessed person," available for self-performing the "judgment," thereby generating a quantifiable "behavior generating a moral quality index change for the dissemination chain of the social network" or making "a behavior of changing the self-moral quality index."

For a digital human being network with the above characteristics, no "practical visual effect" will be generated if a monkey or a robot wears the sensing access device, because such monkeys or robots do not have a "moral quality index and social circle" that may generate different access effects based on environment, time, and user attributes, etc.; this is a fundamental difference between human and animals as well as robots.

The means of "sensing access" not only enables an entity person to have a digital human being attributes by "being equipped with a sensing access device," but also may solve the operation action features of the "digital human being"; besides, it is also embodied that "the device" has various kinds of "digital human being" features described above and in the embodiments below; or even when a "Nano organ/Nano chip" that may play a role of a sensing access device is implanted in a human body or a human brain, manufacturer attribute may be further attached, so as to be imparted with a "personalized attribute" to connect with respective interacting parties and implement attribute changes. For example, an apparatus provided by a manufacturer, i.e., the ECNU Affiliated Hospital, has "psychologically stable/emotional stable personality," and an apparatus provided by another manufacturer, i.e., Fudan Affiliated Hospital has an "intelligent personality," etc. This may be used to describe "personality attribute distinguishing in a semi-person semi-machine era formed by a large number of machine organs in replacement of human organs."

The digital human being may identify digitalized codes with a "module having a sensing access capability" to sensing access, e.g., by "scanning a two-dimensional code," an O2O mode from offline to online is implemented to access a cloud service background. By superimposing the unique ID (and various kinds of affiliated attribute information) of the digital human being per se to newly opened digital human being information, another new "digital human being information" having a same content but a different ID for identification may be generated; this action may be recorded by the background even it is not disseminated and thus belongs to "structured big data," which shows the world that it has exhibited "its own social attitude: having opened and read."

Based on superimposition of its own ID, the digital human being may "share" the new digital information "to its friend circle" or "point-to-point send it to friends," further expressing its attitude. This manner of communicating with other person accessed by sensing through the coded information "added with its own information and then sent out" constitutes a basis of the "value" of "human society."

That is, by identifying the digital human being ID superimposed in various information (particularly the information having been widely disseminated for multiple times), the digital human beings that execute each time of operation such as information sharing may be identified, and then respective levels of disseminators during the whole process may be traced. Moreover, the disseminators may be rewarded through the digitally quantifiable "price scale," i.e., a "digital currency" that may be practically circulated. Evolution of existing currencies such as bit coins is not based on "labor and value" in human society, whose "quantity" and "mining process" are only artificially defined; therefore, they cannot play a role of "digital currency." The digital currency referred to in the present disclosure is generated based on "surplus value in the circulation field," which belongs to "a value system in the circulation and sharing sector" and has a measurement standard of "being digitizable, being dividable, being traceable, and being quantifiable," and thus may become a "universal equivalent" to represent a value of any commodity.

It is just through this manner that the value of information dissemination may be cashed, thereby motivating people to participate with benefits, realizing a real socialized e-commerce. According to the applicants, the socialized e-commerce refers to a business mode where accurate tracing of the dissemination process is implemented through background processing with the online social network as an information propagation channel, which is a basis for disseminators to receive the rewards for forwarding, helping the releaser to gain incremental orders. In this business mode, what commodities to sell is not important, because creation of value is originated from the releaser's setting; the precondition is that he believes that the dissemination may bring him benefits and he would like to give a share of profits. The essence of the socialized e-commerce will not be touched with using the social network to transfer the focus onto the value created by the dissemination per se. Besides the typical commodities, the services that do not belong to traditional commercial retails and even the information per se may act as a body for dissemination in our socialized e-commerce mode, e.g., membership seeking, job recruitment, investment-inviting, etc. In the socialized e-commerce mode, a releaser, who is the final beneficiary for disseminating information to those who need, may voluntarily decide whether to pay the consideration for the dissemination behavior for making a deal based on his expectation of this mode. By identifying the ID of a disseminator, the attribute features corresponding to the disseminator, such as dynamic social status/social reputation index (which are adjusted based on his actions) may be known, acting as a basis for other person to determine the credibility degree of the information disseminated thereby or as a basis for setting his open attitude for receiving and sending information.

Information processing shall go through the procedures of obtaining, identifying, transmitting, processing, and storing. Scanning a digitalized coding medium such as a two-dimensional code with a mobile terminal such as a mobile phone is not only a simple action that may be readily performed by a person in the real world, but also an instruction for requesting the virtual world for obtaining an online resource represented by the two-dimensional code. A smart phone integrates a code reader, a communicator, a processor, and a display, which may not only capture the two-dimensional code to obtain and present the online information, but also may be further hooked to the online cloud service for subsequent operation interactions, corresponding to extending human organs and limbs into the virtual world.

A digitalized coding medium such as a two-dimensional code may be existent as an entity label of a merchant, a commodity, or a service. A plurality of two-dimensional codes labeling a certain entity resources in the reality constitute an offline real world, and information associated with these two-dimensional codes usually constitutes an online virtual world; the two-dimensional codes associate the scenes and individuals in the real world with the data in the virtual world. Besides, the two-dimensional code has enough information capacity (which may further cover coded information corresponding to execution instructions of a complex action), which becomes a key entering the virtual world in replacement of the webpage link.

An effective means of "sensing access" is visual and audio sense of the "wearable device equipped to a human, including implanted chip," "having a unique digital ID and may access in a digital human beingalized manner of a cloud background service accessed by sensing"; usually not including "analog access by matching a database through biometric identifications, such as fingerprint identification, facial recognition, etc."

A fundamental difference between the wearable device and human eyes is that unlike eyes, the wearable device needn't collect all light signals. As a bridge linking the real world and the virtual world, with only one function of obtaining the digitalized coding medium (e.g., scanning a two-dimensional code), the basic requirements will be met (i.e., implementing "sensing access" as mentioned above). Therefore, it is essential for a wearable device is to provide a unit module for obtaining a coding medium, e.g., installing a camera that may scan a two-dimensional code on an eyeglass device, which may cooperate with the eyes to cruise all around to quickly capture two-dimensional codes visible or invisible on the entity resources; the whole process may be done in 1 second. Subsequently, the two-dimensional code is transmitted to the bound (its own) mobile phone or other device for parsing; subsequent operations are executed on the mobile phone according to the procedures described above. This may improve the speed of sensing the virtual world to be comparable with usual visual sensing. Moreover, an APP (application) corresponding to the two-dimensional code is automatically opened through setting on the mobile phone, where the parsing result of the two-dimensional code will be further processed; by finding featured characteristics associated with the specific APP, the APP will be automatically opened or it will prompt to download the APP. With cooperation with APP merchants to obtain the parameters in the two-dimensional code, the parameters will be directly imported after opening the APP and a certain function page will be directed to, further shortening the processing process. Of course, with technological development, equipment such as a personal portable optical screen (optical touch screen), a brain wave holographic helmet, etc., which senses the information of digitalized codes in other manners than visual, will also become possible.

In the present disclosure, because all important code-sending procedures of the coding medium are uniformly managed by the core administrator; firstly, it may control the execution flows designed for respective parties; secondly, because when respective parties are executing their specific operations required by the procedures, their respective identification Ids which for example are unique are bound, correct execution of the procedures may be monitored.

DETAILED DESCRIPTION OF EMBODIMENTS

Hereinafter, the concept, specific structures, and achieved technical effects of the present disclosure will be further illustrated with reference to the accompanying drawings so as to sufficiently understand the objectives, features and effects of the present disclosure.

Embodiment 1

Figure 1:
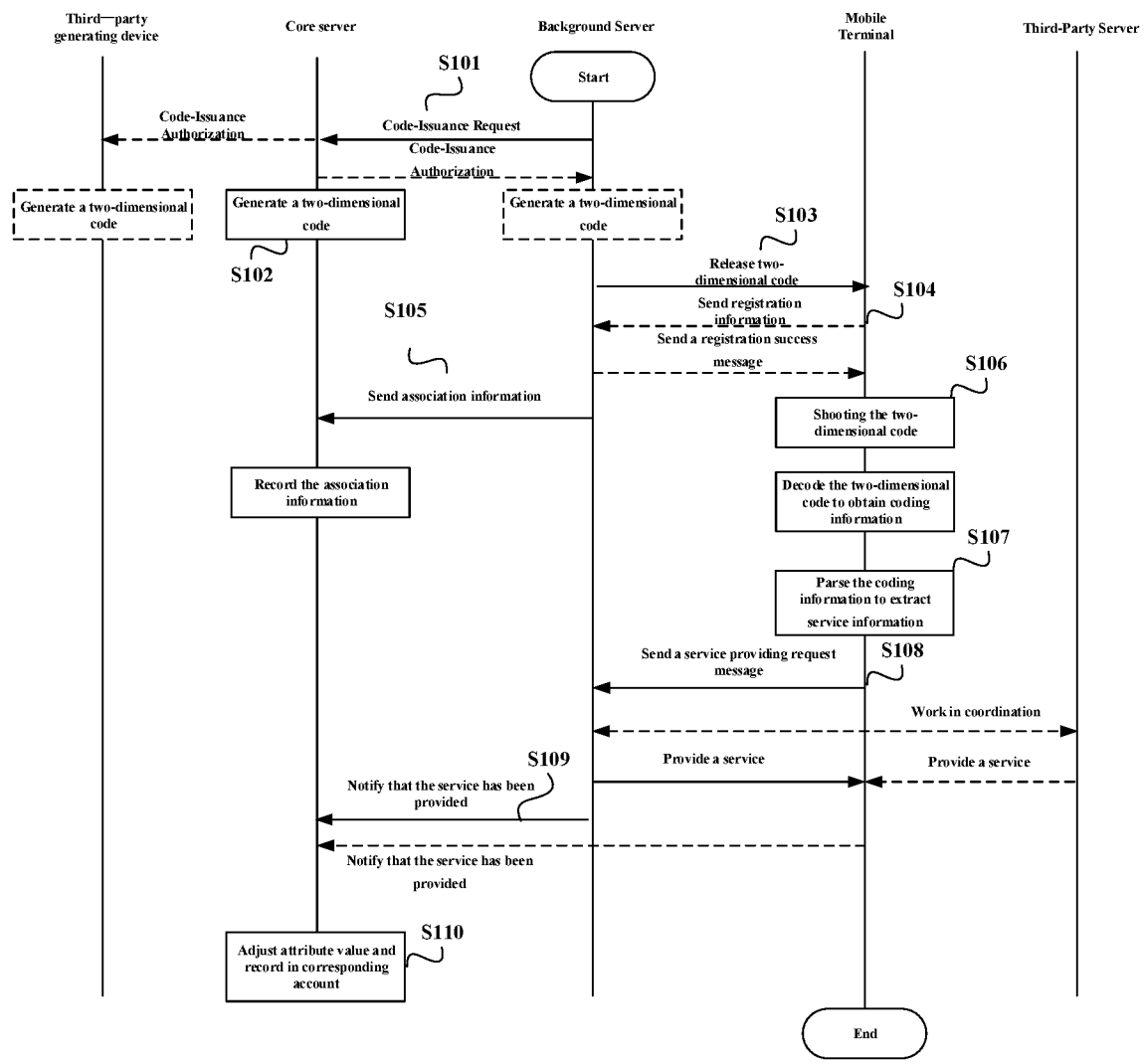
FIG. 1 is a flow diagram of an information processing method based on uniform code issuing in a first embodiment of the present disclosure.

Hereinafter, a plurality of examples of an information processing method based on uniform code issuing are provided, as shown in FIG. 1, which mainly involve interactions between a core server, a background server, and a mobile terminal; a third-party server is configured according to actual application scenarios.

In step S101, the background server sends a request to the core server to request for a two-dimensional code corresponding to a service provided by the background server.

In step S102, the core server receives the request and generates, based on the service provided by the background server, corresponding coded information from service-related information based on a predetermined coding rule, then generates a corresponding two-dimensional code from the coded information, and then sends the two-dimensional code to the background server.

In step S103, the background server releases the two-dimensional code to a place where a user of the mobile terminal is accessible. For example, the two-dimensional code may be released on an Internet webpage or on an application software, e.g., Weibo, WeChat, QQ, etc., which may also be released on a plurality of information platforms such as a sales catalog, a TV shopping screen, a building advertisement media, a poster, a real store wall, an exhibition fair, etc., or directly sent to the mobile terminal.

In step S104, the user becomes a registered user of the background server by registration on the mobile terminal; the mobile terminal sends registration information to the background server, the registration message at least including information that may uniquely identify the mobile terminal or uniquely identify the user (referred to as unique identification information).

The unique identification information for example may be the unique IMEI number or SIM card number of the mobile terminal, or a physical address of the mobile terminal interface, or the user's ID number, phone number, etc. The registration information may further include a username, a password, an address, interests and hobbies, QQ number, payment account, and other personal information, or other information required by the background server or core server.

In step S105, the background server stores the user's registration information and sends a registration success message to the mobile terminal; the background server or mobile terminal notify the core server such that the core server records the association information representing "the user becomes a registered user of the background server."

In step S106, the user identifies the two-dimensional code through the mobile terminal and decodes it to obtain coded information corresponding to the service information. For example, the two-dimensional code is shot by a camera provided in the mobile terminal and then decoded. The camera generally has 0.3 mega pixels or above, which may guarantee the definiteness of the two-dimensional code. When the camera targets at the two-dimensional code and the two-dimensional code is clear enough on the view-finding screen, the camera may automatically shoot the two-dimensional code.

In step S107, the mobile terminal parses the coded information, extracts the stored service information from the background server, and presents the information related to the provided service on the display screen of the mobile terminal for the user to view.

In step S108, the mobile terminal sends a service providing request to the background server to request the background server to provide the service. The service providing request at least includes information that may uniquely identify the mobile terminal or uniquely identify the user, the information being consistent or matched with the unique identification information included in the registration information to facilitate the background server to identify the mobile terminal or the user.

In step S109, the background server provides the corresponding service to the mobile terminal based on the content in the service providing request and notifies the core server. In another example, a condition that the service has been obtained may be notified by the mobile terminal to the core server.

In step S110, the core server sets accounts respectively corresponding to the background server and its registered user or the mobile terminal of the registered user, for computing one or more attributes of theirs. The background server, the registered user or its mobile terminal may notify the core server to record or adjust the attributes in their accounts with respect to any operation that is implemented by themselves and satisfies a preset condition.

In this example, the core server for example may perform attribute adjustment in the user's or its mobile terminal's account with respect to the user's operation in step S107 of extracting the service related information from the background server for viewing so as to decode and parse the two-dimensional code through the mobile terminal. For another example, the core server may perform attribute adjustment in the user's or its mobile terminal's account with respect to the user's operation of requesting and obtaining the service; or further perform attribute adjustment in the background server's account with respect to the background server's operation of providing the service. Because the core server records the association information between the background server and its registered user, it may perform corresponding adjustment of respective attributes with respect to their interactive operations based on notification by any party in step S109. Or, supposing the core server originally does not record the association information therebetween, it may also include information of all involved interacting parties (e.g., the background server and the user's mobile terminal) in the notification from one party to the core server, and then the core serve performs corresponding adjustment of respective attributes based on the information of the interacting parties in the notification.

In different application scenarios, change of one or some attributes (e.g., contribution degree or active degree) of the user account may be used to impact a change of other attribute (e.g., currency or credit balance) of the user; or, the user may obtain different services provided for different values from the background server based on different values of a certain attribute in the account. Respective parties may send a request to the core server to query attribute values of itself or relevant other parties (e.g., the background server may query the values of its own attributes or the attributes of its registered users, and the user may also query the values of its own attributes or the attributes of other registered users of the service-providing background server or; the rights of querying attribute information may be agreed in advance).

Based on different preset conditions, in different application scenarios of step S110, an operation that may be recorded by the core server for adjusting the attributes in the account may be an operation implemented by the background server or the registered user per se, or an interactive operation therebetween, or an interactive operation between themselves and the core server, the third-party server, other background server or other mobile terminal. Any party implementing or participating in the operation notifies the core server, so as to perform records adjustment in the corresponding account based on the implemented operation.

Which operations may be recorded or subjected to attribute adjustment, or which attributes are adjustable, or manners of adjusting the attributes corresponding to respective operations or the values adjusted, or the impact caused by attribute adjustment, or which party has rights of querying the attributes, etc., are all specifically prescribed in the preset condition. The preset condition may not be make known to the user or relevant parties; or notified to the user or relevant parties in advance or during the interaction process through various manners: for example, directly provided to the user when the user registers, or released together with the two-dimensional code, or directly encoded in the coded information of the two-dimensional code and then presented to the user when extracting the service-related information by decoding or parsing, etc.

Relevant steps in the embodiment may be varied to adapt different application scenarios: for example, in another example of generating the two-dimensional code (e.g., step S102), when the core server receives a request from the background server to request for obtaining the two-dimensional code, by reviewing the background server's two-dimensional code generation qualification (code-sending qualification), it sends a preset coding rule to the background server and authorizes the background server to autonomously generate the two-dimensional code.

The coding rule may be sent to the background server only after the core server receives the request for generating the two-dimensional code; or, the current coding rule may be obtained from the core server and saved in the background server when the background server registers an attribute recording account with the core server, and generates the two-dimensional code based on the saved coding rule after sending the request and receiving an authorization instruction from the core server to agree with it to autonomously generate the two-dimensional code; or, when sending the authorization instruction, the core server may simultaneously send the updated coding rule to the background server in replacement of the originally saved version, and then the background server generates the two-dimensional code based on the updated coding rule.

The coding rule is set to be read-only to the background server, i.e., the background server may generate, under authorization, the two-dimensional code according to the received coding rule, but cannot autonomously modify the coding rule. Operations of stipulating the coding rule, updating or releasing the coding rule to the party authorized to generate the two-dimensional code can only be executed by the core server. When the background server needs to change relevant matters during the service providing process (e.g., the type or content or set condition of the provided service, preset condition of attribute change, reward policy, etc.), change of the coding rule is notified to the core server before actual occurrence of the matter; then, the two-dimensional code that needs to be generated in subsequent operations may be generated according to the changed coding rule, which can only be decoded and parsed based on the mated updated decoding rule.

Or, in another example of generating the two-dimensional code (e.g., step S102), when receiving the request from the background server for generating the two-dimensional code, the core server may send the currently latest coding rule (which may be the preset coding rule or the updated coding rule) to a third-party generating device, and after authorizing the third-party generating device, directly sends or forwards the two-dimensional code to the background server. The third-party generating device cannot modify the coding rule either.

Besides, except the step 102 in which the background server requests for generating the two-dimensional code corresponding to the provided service, the background server or the mobile terminal may, in subsequent steps, request, with respect to the information that needs to be sent to respective external parties, the core server and obtains the two-dimensional code that is generated by the core server or by the party authorized thereby based on the currently latest coding rule and corresponds to the information to be sent, such that the respective parties identify the two-dimensional code based on the matching decoding rule to obtain the information sent from the background server or mobile terminal. For example, two-dimensional code corresponding to the registration request and the service providing request and the like sent from the mobile terminal to the background server, and the registration success message, service information, and even the specific service content provided as sent from the background to the mobile terminal, may all be requested to be generated by the core server or its authorized party, and then sent to a corresponding information recipient. Due to the high security nature of the two-dimensional code, by transmitting the information in the two-dimensional code, the security may still be guaranteed without ciphering and deciphering.

Supposing that the background server or the mobile terminal requests the core server for automatically generating the two-dimensional code and obtains the authorization from the core server at an early stage of a certain interactive process, the background server or the mobile terminal may encode the relevant information it notifies to the core server and generate the corresponding two-dimensional code to be sent to the core server.

Further supposing that the interactive information that needs to be sent to the outside by the background server or the mobile terminal at a certain time of the process corresponds to the currently ongoing operation (e.g., sending payment information to the outside at the payment phase), when the background server or the mobile terminal requests the core server to obtain the corresponding two-dimensional code or requests to obtain an authorization of autonomous code issuing, it corresponds to notifying the core server of its ongoing operation, thereby facilitating the core server to adjust the attributes in its account, without a need of additionally sending the notification message to the core server.

When generating any kind of two-dimensional code during the interactive process, a hyperlink may also be generated at the same time, such that the information contained in the hyperlink is identical to the information contained in the two-dimensional code. After obtaining the generated two-dimensional code and the corresponding hyperlink, the background server directly sends them to the mobile terminal. The hyperlink and the two-dimensional code may be displayed on a same page sent to the mobile terminal, respectively; or the hyperlink per se is invisible and attached to the two-dimensional code or attached to other media such as text, picture, video multi-media, etc. Then, the user may shoot the two-dimensional code or click the hyperlink (or click the two-dimensional code or propagation medium attached with the hyperlink) through the mobile terminal to extract the contained coded information and further parse it to obtain the information related to the provided service.

implementation sequence of some steps may not be limited by the implementation sequence described above. For example, the operation of step S104 of performing user registration, or the operation of step S105 in which the core server records the association information between the user and the background server, may be adjusted in different application scenarios, e.g., the operations of user registration and notifying the core server to record and register the association information may be performed before implementing any one of the steps S101~S103; for another example, while sending relevant request to the background server in step S107 or step S108, operations of user registration and notifying the core server to record may be performed.

Moreover, the user may send the registration information to the background server to become a registered user thereof in other manner without through the mobile terminal. For example, when receiving the service providing request or other request sent from the mobile terminal, the background server automatically identifies some unique identification information of the mobile terminal (e.g., unique IMEI number, SIM card number or physical address of the interface of the mobile terminal) for user registration. For example, the user directly provides the registration information by paper or mail to an operator of the background server for user registration.

In some examples, the user does not register with the background server, but obtains the service or feedback information provided by the background server by directly sending a request to the background server after identifying the two-dimensional code, and attribute recording or adjustment for the corresponding operation is made by the core server obtaining the notification.

Besides, the background server, the user or the mobile terminal of the user may register with the core server in a similar manner like the user registering with the background server, to become a registered user of the core server, such that the core server sets separate accounts for them to record the attributes. For another example, the core server may also requests the background server to send the unique identification information of the background server to verify its identity and determine whether it is an eligible background server; then, the core server may set to only provide services to eligible background servers (the services may be for example an autonomous code-sending authorization instruction of generating the two-dimensional code or sending the two-dimensional code, or for example recording of attribute changes, etc.)

Based on different types of the provided services (e.g., in step S109), the background server may separately provide services to the mobile terminal, or the background needs to cooperate with other background server or third-party server to provide services to the mobile terminal. For example, in the case of a content providing service, the background server may independently complete the content providing service if it has enough content information; in the case of a payment service, as long as the background server per se has the corresponding function, the payment transaction may be directly completed; otherwise, the background server may need to cooperate with other payment server, or a third-party server such as a bank settlement platform to complete the action of payment.

Or, based on different contents of the provided services, the object finally obtaining the service from the background server based on the service providing request sent by the mobile terminal might not be the mobile terminal, but the background server per se, or the third-party server, or the core server, or other background server, or other mobile terminal, etc.

When receiving the service providing request, the background server may first determine whether the set condition is satisfied, and only provides services to the mobile terminal when the condition is satisfied. Based on different application scenarios, this step is optional, not compulsory. The set condition may be an active condition (e.g., the user completes payment, or the value of a certain attribute of the user reaches the requirement, etc.) that may be satisfied after one of the core server, the background server, the user or the mobile terminal of the user implements a corresponding operation on their own or with cooperation between various parties, or may be an external passive condition (arriving at a certain time, date, etc.) that is not affected by the operations of various parties, or even a condition combining the active condition and the passive condition, etc.

Generally, unless otherwise indicated to exclude corresponding features in the following embodiments, relevant definitions, interactive procedures, and the features described in their varied examples in this embodiment (including, but not limited to, user registration, account opening, generating and releasing of various kinds of two-dimensional codes and/or corresponding hyperlinks, service providing, and attribute adjustment, etc.) may all be applied to subsequent other embodiments.

Embodiment 2

Figure 2:
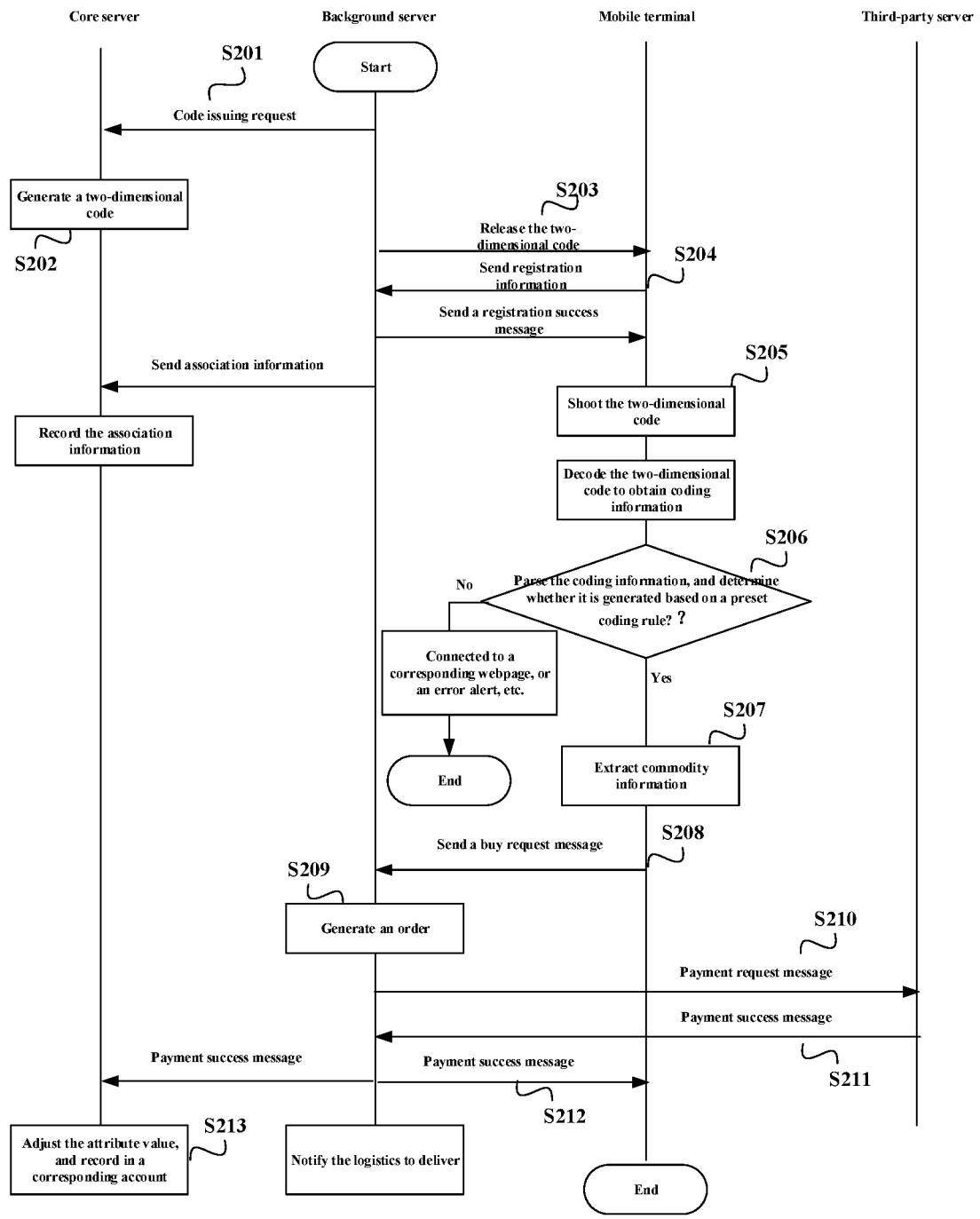
FIG. 2 is a flow diagram of an information processing method based on uniform code issuing in a second embodiment of the present disclosure.

Hereinafter, a plurality of examples of an information processing method based on uniform code issuing to implement paying to purchase commodities are provided, as shown in FIG. 2, which mainly involve interactions between a core server, a background server, and a mobile terminal; a third-party server is configured according to actual application scenarios.

In step S201, the background server provides a service of selling commodities; the background server sends a request to the core server to request for obtaining a two-dimensional code corresponding to a commodity in sale.

In step S202, the core server, or a background server or a third-party generating device authorized by the core server, encodes commodity information of the commodity based on a currently latest coding rule and generates the two-dimensional code corresponding to the commodity information.

The commodity information may include commodity-related information, such as commodity code, commodity group, regional GIS classification information, transaction price, sales organization, sales channel, payment manner, receiving bank account number, third-party receiving bank account number, and etc.

In step S203, the background server obtains the two-dimensional code of the commodity and releases it to various kinds of information platforms.

In step S204, a user of the mobile terminal registers to become a registered user of the background server; the background server stores the user's registration information and sends a registration success message to the mobile terminal; the core server records association information therebetween based on the notification from the mobile terminal or the background server, for subsequently performing attribute adjustment based on an eligible operation of the mobile terminal or background server.

In step S205, the mobile terminal shoots, through a camera therein, the two-dimensional code of the commodity, and decodes the shot two-dimensional code to obtain coded information corresponding to the commodity information.

In step S206, the mobile terminal decodes the coded information to determine whether the two-dimensional code is generated according to a preset coding rule; if so, it is indicated that the information therein corresponds to the commodity information provided by the background server, and then subsequent steps of the present method will be continued to execute. If the two-dimensional code is not generated according to the predetermined coding rule, the two-dimensional code possibly corresponds to a commodity or service provided by other merchants, and an error message will be presented as a prompt, or a corresponding webpage that may be hooked to the commodity or service of other merchant or a link corresponding to the webpage is provided to the mobile terminal; or after other set webpage is provided, subsequent steps of the method will not be continued to execute.

In step S207, commodity information is extracted from the background server based on the coded information and is displayed on a display screen of the mobile terminal for the user to view.

In step S208, if the user is satisfied with the commodity, he will send a purchase request message to the background server through the mobile terminal. The purchase request message includes unique identification information of the mobile terminal (e.g., one or more of telephone number, IMEI number of the mobile terminal, user name, and physical address of the interface of the mobile terminal) and may also include other user information. The purchase request message further includes transaction information, e.g., purchase quantity, payment manner, etc.

In step S209, the background server generates an order based on the received purchase request message.

In step S210, the background server sends a payment request message to a third-party payment server. The payment server may be a payment server of a bank, a payment server of a mobile operator, or a payment server of Alipay, etc.

In step S211, the payment server processes the payment to complete commodity payment, and then sends a payment success message to the background server.

In step S212, the background server sends a payment success message to the mobile terminal and displays it on the display screen of the mobile terminal to notify the user.

In step S213, the core server performs corresponding attribute adjustment in the account of the background server, the registered user, or a mobile terminal of the registered user based on the payment success message sent from the background server.

Particularly, another example of step S212 is that the payment server directly sends the payment success message to the mobile terminal. For example, another example of step S213 is that the mobile terminal or the payment server sends the payment success message to the core server, thereby notifying it to perform attribute adjustment based on the situation of transaction completed. For another example, after step S212, the background server may also communicate with a server of the manufacturer or warehouse or logistic company to notify them the delivery address of the user; or, the commodity is an electronic commodity (e.g., music, e-book) that has already been extracted to the background server to store; then, after successful payment, the background server directly sends the electronic commodity or a link to the electronic commodity to the user's mobile terminal or other mobile terminal appointed by the user.

Besides, supposing that the background server has a strong enough payment processing function, interaction with the third-party payment server may not be necessary; instead, the operation performed by the payment server is implemented by the background server per se or a plurality of functional modules in-built therein.

Or, in another embodiment, the procedures of performing steps S201~S209 are substantially identical to those in the embodiment above or in its varied example. Subsequent steps may be implemented as follows:

In step S210', the background server sends a payment request message to a third-party payment server; the core server forwards payment request information to the third-party payment server.

In step S211', the payment server processes the payment to complete commodity payment, and then sends a payment success message to the core server.

In step S212', the core server sends a payment success message to both of background server and the mobile terminal, respectively.

In step S213', the core server performs corresponding attribute recording and adjustment in the account of the background server, the registered user, or a mobile terminal of the registered user. Because the core server participates in a relevant interaction process of the payment transaction, it need not wait for other device to notify, but directly performs attribute adjustment.

Figure 3:
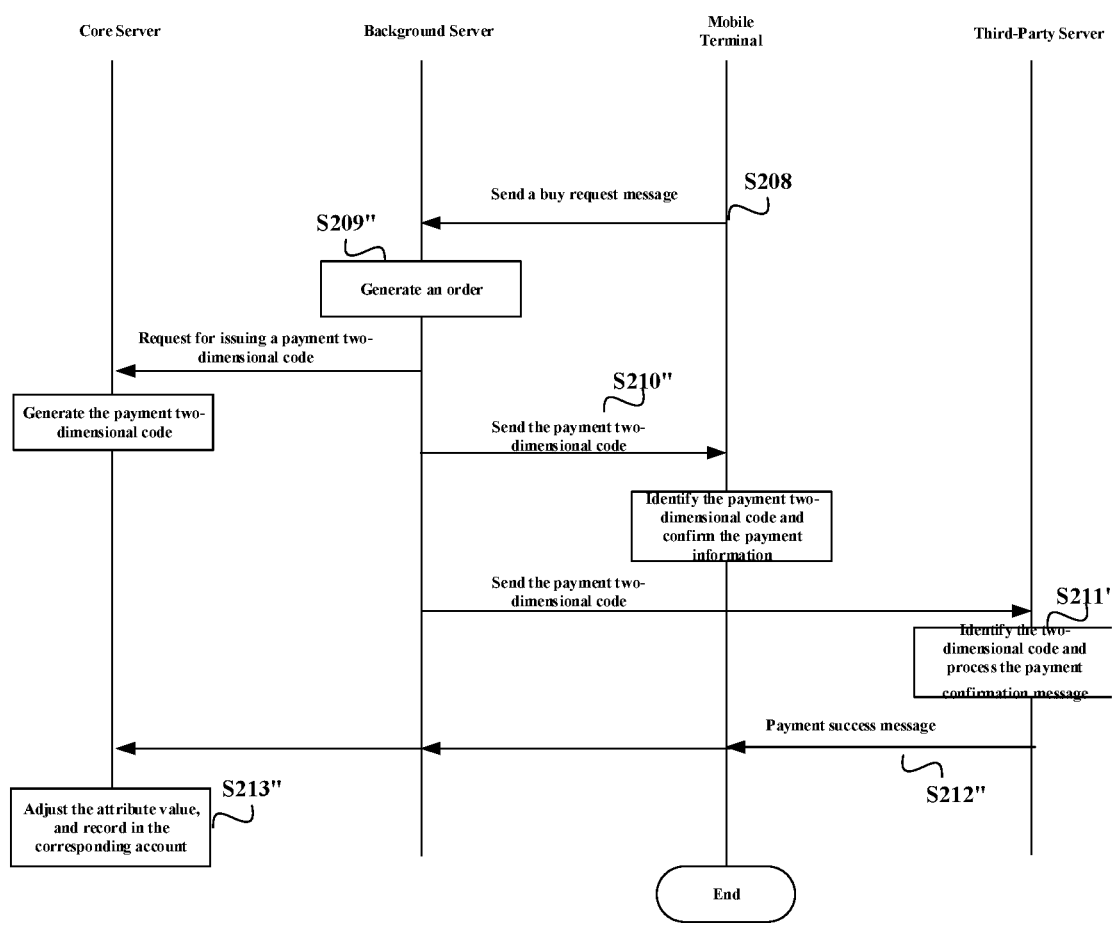
FIG. 3 is a partial flow diagram of another embodiment of the information processing method shown in FIG. 2.

Or, in another embodiment, the procedures of performing steps S201~S208 are substantially identical to those in the embodiment above or in its varied example. Subsequent steps may be implemented as follows, as shown in FIG. 3:

In step S209", the background server generates an order and requests the core server for obtaining a payment two-dimensional code or obtaining an authorization to autonomously generate the payment two-dimensional code; coded information of the payment two-dimensional code corresponds to the payment request message (for example, including a total payment amount, payment manner, account information of the user and account information of the merchant, etc.).

Figure 4:
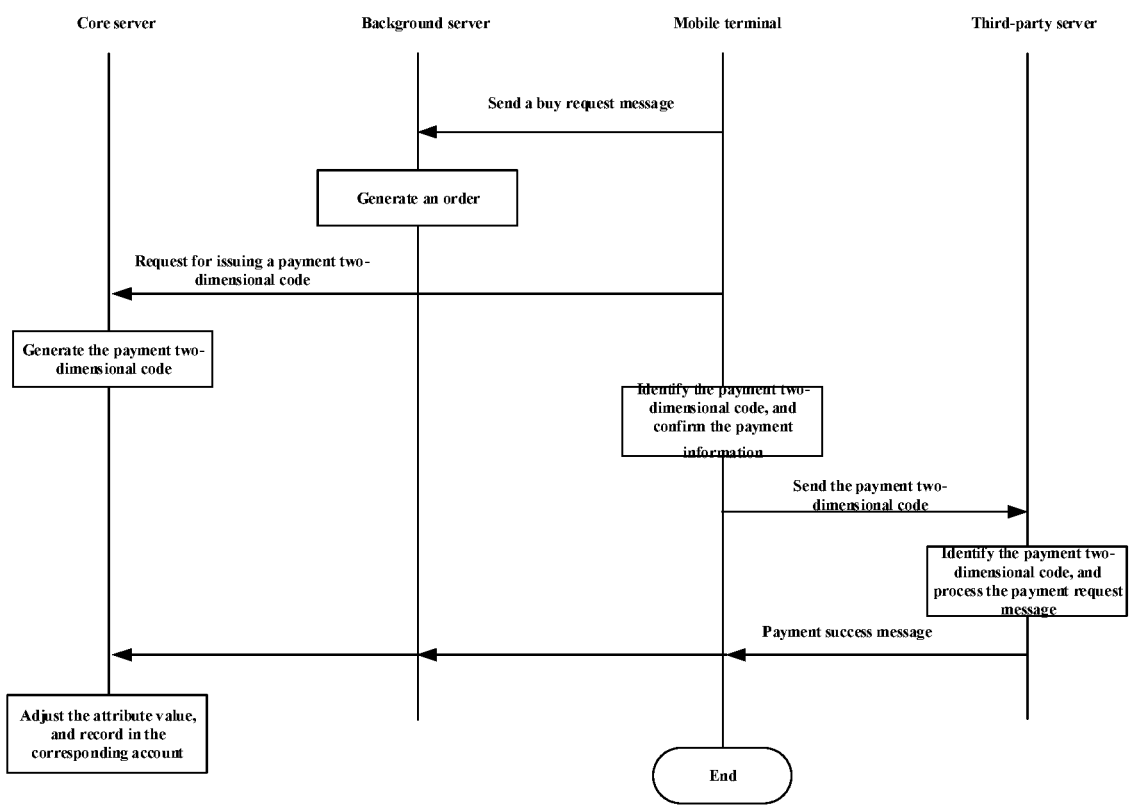
FIG. 4 is a partial flow diagram of a further embodiment of the information processing method shown in FIG. 2.

In step S210", the background server sends the payment two-dimensional code to the third-party payment server; or in another example, as shown in FIG. 4, the payment two-dimensional code is first sent to the mobile terminal for identification, and when receiving a confirmation instruction returned from the mobile terminal after checking the transaction information therein, the mobile terminal or background server sends the payment two-dimensional code to the payment server.

In steps S211" and S212", the payment server obtains a corresponding payment request message to perform an operation of payment processing after identifying the received payment two-dimensional code, completes payment of the commodity, and sends a payment success message to one or respective parties of the background server, the core server, and the mobile terminal.

In step S213', the core server performs corresponding attribute adjustment in the account of the background server, the registered user, or a mobile terminal of the registered user based on the payment success message sent from the payment server or the background server or the mobile terminal.

Or, such an embodiment may be further provided, where the procedures of steps S201~S207 are substantially consistent with the various embodiments above or their varied embodiments. In another example of step S208 of the method above, supposing that the user is satisfactory with the commodity, then he may directly send a purchase request message to the payment server through the mobile terminal. The purchase request message includes unique identification information of the mobile terminal and may also include other user information. The purchase request message further includes transaction information, e.g., purchase quantity, payment manner, payment collection information of the merchant, etc. Then, after receiving the purchase request message and completing relevant operations of commodity payment (e.g., transferring the payment from the user's capital account to the merchant's capital account), the payment server sends a payment success message to the background server, the core server, and the mobile terminal, such that the background server notifies the merchant or warehouse or logistic company to deliver, and the core server adjusts the attributes in respective accounts.

Further, the mobile terminal in this example may send a purchase request message in a payment two-dimensional form; to this end, the mobile terminal needs to request the core server for the payment two-dimensional code corresponding to the payment request message or for being authorized to autonomously generate the payment two-dimensional code.

Various implementation manners in this embodiment may provide a convenient e-commerce. The user is only required to access the two-dimensional code corresponding to the commodity information; the simple action of shooting may trigger a series of subsequent transactions, thereby implementing a full flow of a complex e-commerce. Due to the extremely distribution scope of the two-dimensional code and the mobile flexibility of the mobile terminal, the user may very conveniently purchase and pay anywhere and anytime. Moreover, it is only required to become a registered user of the background server to access two-dimensional purchase on various information platform. In this way, it may be avoided to repetitively submit personal information (particularly payment information) to respective purchase website, which avoids risks.

Various implementation manners of this embodiment provide a more secure payment method by sending, to the outside, various information needed for transaction management, such as information related to order and payment in a payment two-dimensional code form. Because the coded information corresponding to the information provided by the two-dimensional sending party, actual coded information in the two-dimensional code transmitted by respective parties, and decoded information of the two-dimensional code receiving party are matched to each other according to a same specific coding rule, as long as the three parties are not infected by the same virus, risks of information leakage such as the payment account number will not occur. In the present disclosure, particularly the code issuing (or code issuing authorization) and all coding rules of the two-dimensional code are uniformly managed by the core server, which may effectively avoid occurrence of issues of tampering or intercepting the information in the two-dimensional code by a hacker obtaining the same specific coding rule.

Embodiment 3

A plurality of examples of an information processing method based on uniform code issuing are provided in this embodiment, which mainly involve interactions between a core server, a background server, and a mobile terminal having a specific physical world peculiarity when accessing an interactive process; other third-party server is configured according to actual application scenarios.

The physical world peculiarities of the mobile terminal when interacting with various other parties may refer to any one or any combination of specific time, specific location, specific environment, and specific user identity, and not limited to these mentioned peculiarities; the physical world peculiarities are decided according to a policy set by the background server dependent on actual application scenarios and are generally mutually associated with a service provided by the background server. That is, the background server will provide different pertinent services for different physical world peculiarities. The background sends the policy including association information between the physical world peculiarities and the services to the core server in advance or during the interactive process, such that the core server prepares or updates a coding rule for generating a two-dimensional code based on the policy; the core server may also use the physical world peculiarities involved in the policy as one of reference basis for adjusting the attributes of respective parties during the interaction.

The background server obtains the two-dimensional code generated based o the coding rule including the policy and releases it. The user identifies the two-dimensional code for decoding and parsing through the mobile terminal and sends information about the peculiarities of the physical world where the user or mobile terminal is currently located to the background server. The peculiarity-related information may be separately sent to the background or may be attached to any other kind of interactive information sent by the mobile terminal to the background (e.g., the sent registration information, a request for querying service information corresponding to the two-dimensional code, a service providing request) and is then sent together to the background server; or, some information in the peculiarity related information needn't be voluntarily sent by the mobile terminal, but may be obtained by the background server from other information interacted between it and the mobile terminal, or obtained from the third party; specifically, how to send may be determined based on the policy set by the background server.

In different examples, the "current" in the "peculiarities of the physical world currently located" may refer to the time of identifying the two-dimensional code, or the time of sending the peculiarity information or other interactive information sent to the background server through the mobile terminal or other way, or any other time prescribed by the policy. To facilitate understanding, some examples of the "peculiarities of the physical world currently located" are provided below: for example, the mobile terminal sends the time of shooting or decoding or parsing the two-dimensional code to the background server when identifying the two-dimensional code; or location information of a real location (e.g., a store, an advertising board) or a virtual location (e.g., a media advertisement, a webpage) when identifying the two-dimensional code; or, an inherent characteristic of the user or its mobile terminal per se or a changing feature that may be changed somewhat by executing a corresponding operation (e.g., a certain digit of the phone number of the mobile terminal satisfies a set value, or the user reaches a certain VIP level); or external factors that cannot be changed by the user per se or the server (e.g., ambient temperature), etc.

When the background server receives information related to the mobile terminal's "peculiarities of the physical world currently located," corresponding special services are provided to the user based on the peculiarities such as the time, location, environment or user identity or a combination thereof as included in the information. For another example, an example of combining of the peculiarities is provided below: the background may require that service should only be provided when the peculiarities of the mobile terminal performing two associated operations meet a preset condition, e.g., the commodity to sell is provided to the mobile terminal only when the location where the mobile terminal scans the two-dimensional code is consistent with the location of sending a commodity purchase request, and an interval between the time of scanning the two-dimensional code and the time of payment satisfies a set threshold.

Besides, the rules set by the core server for attribute adjustment may also differ based on the difference of the "peculiarities of the physical world currently located." That is, the core server makes a matching adjustment to the attributes in respective parties' accounts based on the peculiarity related information sent by the mobile terminal or forwarded by the background server.

Besides, respective parties may send any one of the peculiarity related information in a two-dimensional form, i.e., the information sending party requests the core server for code issuing and obtains the two-dimensional code corresponding to the peculiarity related information generated by the core server or the party authorized thereby.

Figure 5:
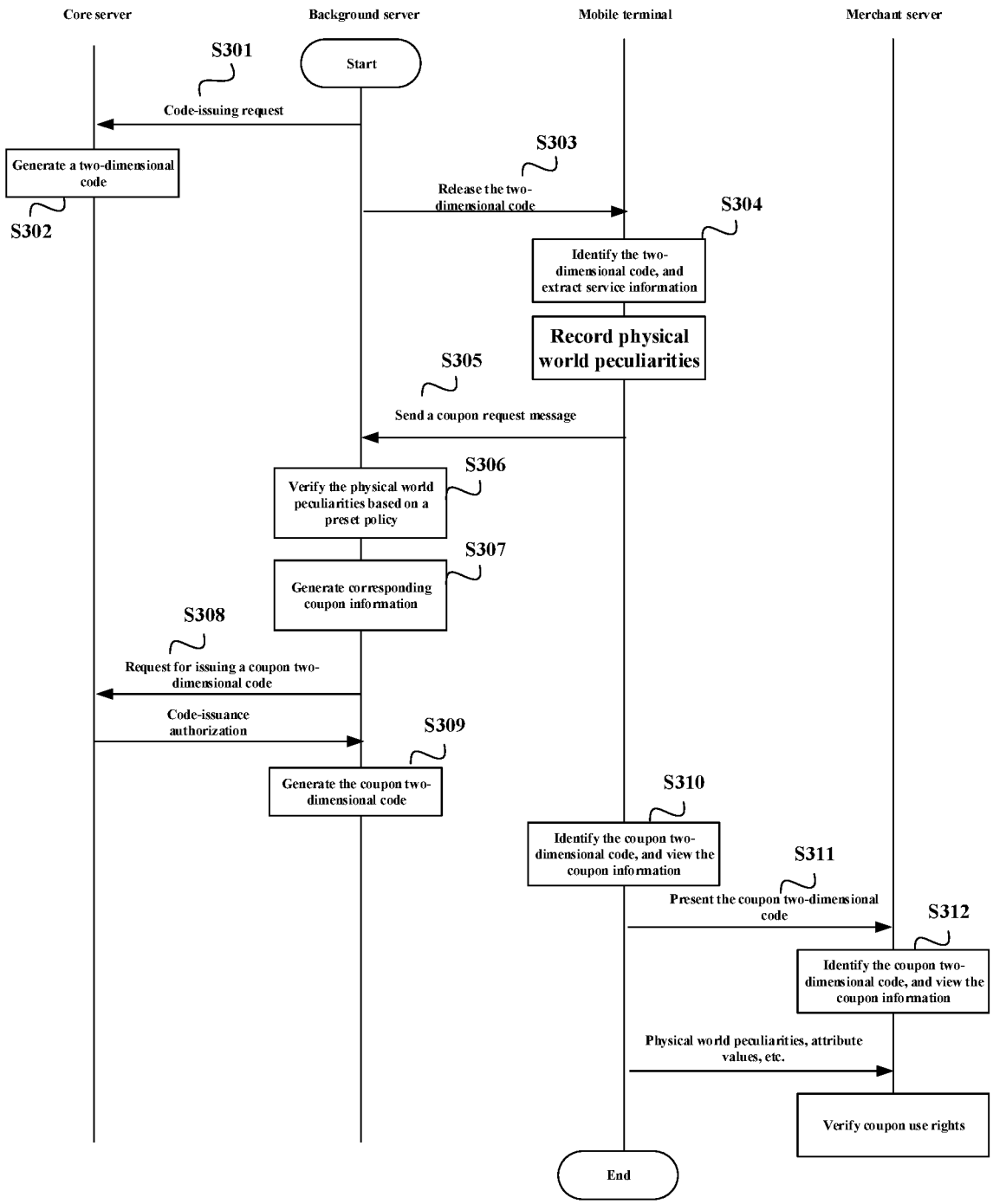
FIG. 5 is a flow diagram of an information processing method based on uniform code issuing in a third embodiment of the present disclosure.

Hereinafter, a specific example of obtaining a corresponding coupon based on a specific physical world peculiarity is provided. As shown in FIG. 5, in this example, it is supposed that the background server provides different discounts for a commodity sold by a merchant based on different physical world peculiarity and provides a coupon with the corresponding discount to the user.

In step S301, the background server sends a request to the core server to request for a two-dimensional code corresponding to a service provided by the background server.

To this end, the background server may send the association information (policy) between different services provided and different peculiarities, independently or together with the request, to the core server, such that the core server prepares or updates the coding rule required when generating the two-dimensional code.

In step S302, the core server (or a background server or a third-party generating device authorized by the core server) generates a two-dimensional code needed by the background server based on a currently latest coding rule, the coded information of the two-dimensional code corresponding to the service matching the corresponding peculiarity provided by the background server.

In step S303, the background server obtains the two-dimensional code and releases it to various kinds of information platforms.

In step S304, the mobile terminal identifies the two-dimensional code and records the system displayed on the mobile terminal when identifying the two-dimensional code as identification time.

In step S305, the mobile terminal sends request information for obtaining the coupon to the background server based on the information identified from the two-dimensional code, the request information also including the identification time of the mobile terminal.

In step S306, the background server receives the request information, and compares the identification time of the mobile terminal with the identification time prescribed in the policy preset at the background server; for example, it is prescribed that 20% and 10% discount coupons are provided respectively for the identification time before 8:00 am and 9:00 am, and no coupon is provided for the identification time after 9:00 am.

In step S307, the background server generates a coupon information with a corresponding discount based on the comparison result.

In step S308, the background server adds the coupon information with the corresponding discount to the two-dimensional generation request sent by the background server to the core server, requesting for obtaining a coupon two-dimensional code corresponding to the coupon information.

In step S309, the core server (or a background server or a third-party generating device authorized by the core server) generates the desired coupon two-dimensional code based on the currently latest coding rule.

In step S310, the mobile terminal receives the coupon two-dimensional code directly sent by the core server or forwarded by the background server and identifies the coupon two-dimensional code to extract the coupon information including the corresponding discount, and presents it to the user for viewing.

In step S311, the coupon two-dimensional code may be saved in the mobile terminal; when the user goes to the merchant to buy, the saved coupon two-dimensional code is read through the mobile terminal and presented to the merchant through the screen of the mobile terminal.

In step S312, the merchant identifies the coupon two-dimensional code on the mobile terminal through a two-dimensional scanner, another mobile terminal, or any other two-dimensional identifying device with a similar function to obtain the corresponding discount in the coupon information, testifying the authenticity of the coupon.

The operations of paying after obtaining the coupon with the corresponding discount may be implemented with reference to relevant description in Embodiment 2 or other prior arts, which will not be detailed here.

Supposing the user of the mobile terminal does not go to a real store to buy and it is inconvenient for the merchant to scan and identify the coupon two-dimensional code face to face, in steps S311'~S312' of another example, the user may send the coupon two-dimensional code to the merchant so as to be identified by the merchant's two-dimensional identifying device.

It is also possible that the merchant simultaneously verifies the use rights of the coupon two-dimensional code, and only a user having corresponding rights can get the corresponding discount; to this end, when sending the coupon two-dimensional code, the user may simultaneously send the user information (e.g., including the unique identification information of the user or its mobile terminal, or including the peculiarities of the physical world where the user's mobile terminal is located when sending the coupon two-dimensional code, and attribute value of the mobile terminal user, etc.) together to the background server for verification.

Preferably, information including the user information, the coupon information parsed from the coupon two-dimensional code, and other needed information, may be sent to the merchant in a two-dimensional form, which may be further implemented based on the following process:

In step S313', the user requests the core server to obtain a discount two-dimensional code through the mobile terminal, such that the coded information of the discount two-dimensional code includes the user information and the coupon information parsed from the coupon two-dimensional code. The corresponding discount two-dimensional code is generated by the core server or its authorized party (authorized background server, third-party generating device or mobile terminal) based on the currently latest coding rule. Particularly, parsing of the coupon information may be performed by the mobile terminal, or obtained after parsing, by the core server, the coupon two-dimensional code sent by the mobile terminal thereto.

Besides, in another example, relevant operations of generating the discount two-dimensional code may be combined with the example in above Embodiment 2 where the mobile terminal sends a purchase request message in the payment two-dimensional code form, e.g., when the mobile terminal sends the purchase request message to the core server, it also sends the coupon information parsed out and the user information to the core server, such that the generated payment two-dimensional code also includes the coupon information besides necessary information for completing the transaction; then, when the merchant identifies the payment two-dimensional code sent from the mobile terminal, it may settle the user consumption using the discount corresponding to the coupon information, thereby completing commodity sale.

Supposing that in another embodiment, the procedures of performing other steps are substantially identical to the embodiment above or its varied examples, steps S304' ~S307' are implemented based on the following procedures: the mobile terminal identifies the released two-dimensional code and sends request information for obtaining the coupon to the background server based on the information identified in the two-dimensional code. The background server receives the request information, compares the sending time (receiving time) of the request information with the time prescribed in the policy preset at the background server, and provides the coupon information with the corresponding discount; for example, it is prescribed that 20% and 10% discount coupons are provided respectively for the identification time before 8:00 am and 9:00 am, and no coupon is provided for the identification time after 9:00 am.

Supposing that in another embodiment, the procedures of performing other steps are substantially identical to the embodiment above or its varied examples, steps S304" ~S307" are implemented based on the following procedures: the mobile terminal identifies the released two-dimensional code, obtains current location information of the mobile terminal through a built-in positioning module or other LBS way (LBS: Location Based Service), and attach the location information to the request information sent to the background server for obtaining the coupon. The background server receives the request information, and compared the location information therein with the location information prescribed in the policy at the background server and provides coupon information with a corresponding discount; for example, it is prescribed that coupon is provided when the location information indicates that the mobile terminal is in a tariff-free zone when identifying or sending the purchase request, while no coupon is provided when the location information indicates that the mobile terminal is not in the tariff-free zone.

In another example, steps S304'" ~S307'" are implemented based on the following procedures: the mobile terminal identifies the released two-dimensional code and sends request information for obtaining the coupon to the background server based on the information identified in the two-dimensional code. The background receives the request information, e.g., based on the base station used when the mobile terminal sends the request information, obtains, from a third party, the time or location when the mobile terminal sends the request information through interaction between the background server and the base station, such that the background server performs comparison and determination based on the time or location information, so as to provide corresponding coupon.

Embodiment 4

Figure 6:
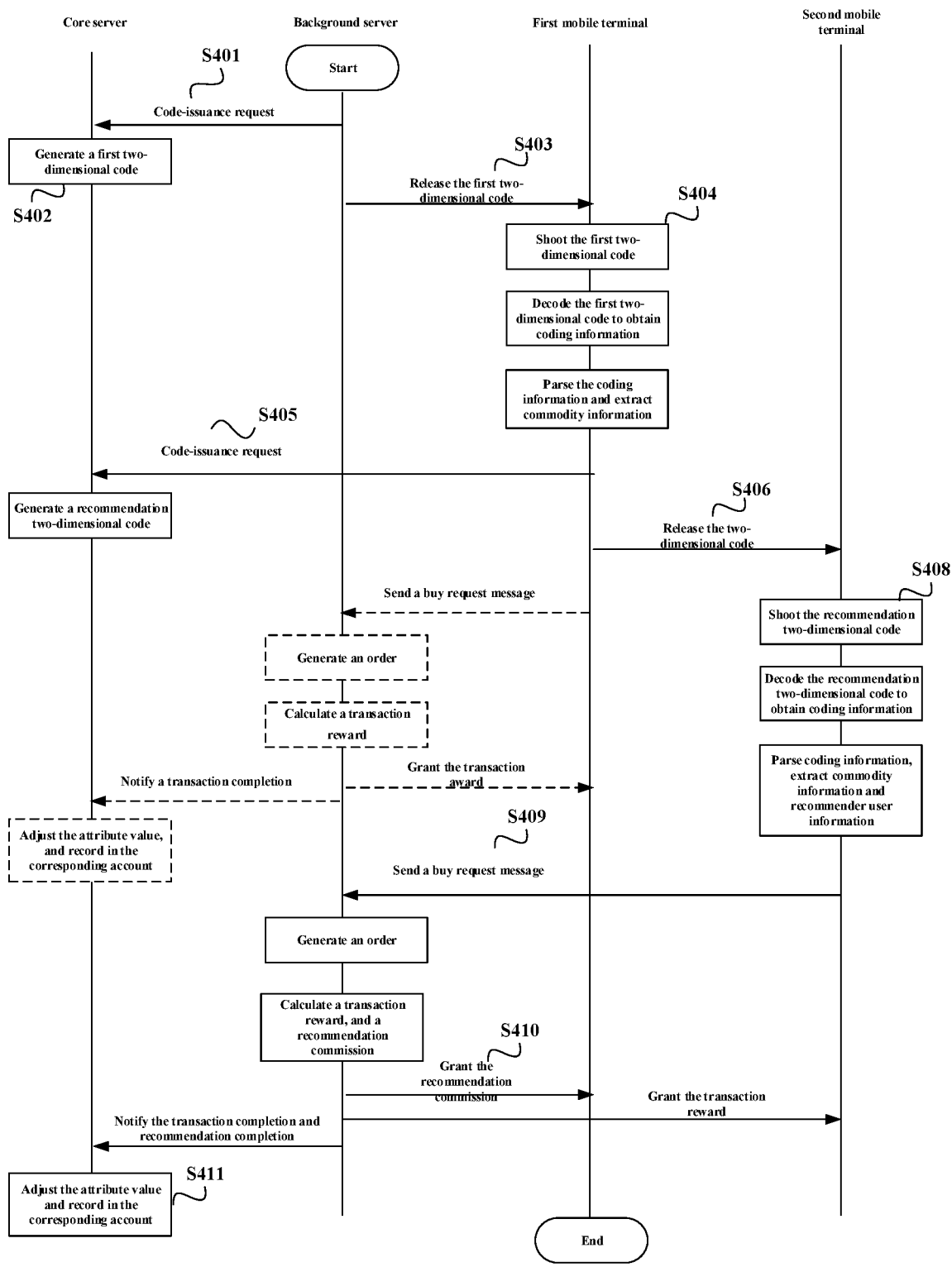
FIG. 6 is a flow diagram of an information processing method based on uniform code issuing in a fourth embodiment of the present disclosure.

A plurality of examples of an information processing method based on uniform code issuing are provided, as shown in FIG. 6, which mainly involve interactions between a core server, a background server, and at least two mobile terminals to thereby implement commodity recommendation; other mobile terminal and a third-party server may be configured according to actual application scenarios.

In step S401, the background server provides a service of selling commodities; the background server sends a request to the core server to request for obtaining a two-dimensional code corresponding to a commodity in sale.

In step S402, the core server, or a background server or a third-party generating device authorized by the core server, encodes commodity information of the commodity based on a currently latest coding rule and generates a first two-dimensional code corresponding to the commodity information.

In step S403, the background server obtains the first two-dimensional code of the commodity and releases it to various kinds of information platforms.

In step S405, the first mobile terminal shoots, through a camera therein, the first two-dimensional code, and decodes the shot first two-dimensional code to obtain coded information corresponding to the commodity information, and may extract the commodity information from the background server based on the coded information and display it on the display screen of the mobile terminal, for the user to view.

In step S405, the first mobile terminal as a commodity recommending party sends a request to the core server, requesting the core server or a party authorized thereby (e.g., a background server, a third-party generating device or the first mobile terminal, authorized by the core server) to generate a recommendation two-dimensional code (second two-dimensional code) based on the currently latest coding rule, such that the content corresponding to the coded information of the recommendation two-dimensional code not only includes information about the commodity in sale at the background server, but also includes user information of the first mobile terminal (for example, including the unique identification of the first mobile terminal), or may further include any other desired information (e.g., appraisals on the commodity by the first mobile terminal user, physical world peculiarities of the first mobile terminal user, attribute value of the first mobile terminal user, etc.); therefore, the situation of the first mobile terminal as a recommending party has been closely related to the recommendation two-dimensional code, which, when needed, may be known to various parties identifying the recommendation two-dimensional code.

To this end, the first mobile terminal may send the commodity information obtained by parsing, by itself, the first two-dimensional code, individually or together with the interactive information such as the code-sending request above, to the core server; or, the first mobile terminal directly sends the first two-dimensional code to the core server, such that the core server or a device appointed thereby obtains the commodity information after parsing the first two-dimensional code for generating the recommendation two-dimensional code. The user information of the first mobile terminal may be provided by the first mobile terminal, independently or together with other interactive information, to the core server before the interaction or during the interaction process; or, the user information of the first mobile terminal may be obtained by the core server from other information about the interaction with the first mobile terminal, or from the background server with which the first mobile terminal is registered, or from any other third-party server.

In step S406, the first mobile terminal obtains the generated recommendation two-dimensional code and releases it to a place accessible to a user of the second mobile terminal, i.e., the user of the first mobile terminal performs commodity recommendation to the user of the second mobile terminal.

For example, the first mobile terminal (or the core server or the background server) releases the recommendation two-dimensional code to various information platforms; or, the first mobile terminal sends the recommendation two-dimensional code, or a page or other media (picture, multimedia, etc.) including the recommendation two-dimensional code, directly to the second mobile terminal via application tools of various social networks; or, the first mobile terminal displays the recommendation two-dimensional code on its own screen, available for the camera of the second mobile terminal to directly shoot and scan.

In step S407, the second mobile terminal identifies the recommendation code and obtains therefrom the coded information corresponding to the commodity information and the coded information corresponding to the user information of the first mobile terminal.

In step S408, the second mobile terminal extracts the commodity information from the background server based on the coded information and displays the commodity information on a display screen of the second mobile terminal for the user to view. Whether to simultaneously display the user information of the first mobile terminal or other information provided thereby (e.g., appraisal information) is chosen according to needs.

In step S409, if the user of the second mobile terminal is satisfied with the commodity recommended by the user of the first mobile terminal, he will send a purchase request message to the background server through the second mobile terminal. Relevant operations of the background server completing commodity sale may be implemented through the procedures described in the various foregoing embodiments.

The background server, when the commodity is sold, may know the purchasing party of the commodity is the second mobile terminal and the recommending party of the commodity is the first mobile terminal. This example does not limit the specific manner for the background server to obtain the user information of the first mobile terminal associated with the recommendation two-dimensional code, e.g., whether the second terminal sends the user information of the first mobile terminal parsed out thereby from the recommendation two-dimensional code, independently or together with the purchase request information, to the background server; or, the background server receives the recommendation two-dimensional code and autonomously parses it to obtain the user information of the first mobile terminal; or, the background server obtains the user information of the first mobile terminal that requests, when processing the purchase request information, for generating the recommendation two-dimensional code from the information residing at the core server due to querying the core server for generating the recommendation two-dimensional code; or, to obtain the recommendation two-dimensional code, the first mobile terminal provides the user information to the core server, and the first mobile terminal or the core server simultaneously provides the user information of the first mobile terminal to the background server.

In step S410, based on the fact that the first mobile terminal user recommends the commodity to other user, the background server calculates a recommendation commission based on a preset commission rule, sends a commission message to the first mobile terminal, and displays it on the display screen of the first mobile terminal to notify it to the user.

In step S411, the core server adjusts corresponding attributes in the account corresponding to the first mobile terminal or its user (and/or the background server, the second mobile terminal or its user) based on the fact that the first mobile terminal user recommends the commodity to other users. The attribute adjustment operation implemented by the second core server as to the deal being made between the second mobile terminal and the background server may refer to the description in the foregoing embodiments.

As another example, the specific operation of the background server calculating the recommendation commission for the first mobile terminal may be implemented after step S411 of completing the attribute adjustment of the first mobile terminal; for example, the background server queries from the core server that the first mobile terminal or its user is practicing recommendation and obtains the adjusted attribute state, and then calculates the recommendation commission for the first mobile terminal based on the latest attribute state.

Based on different commission rules as set, the background may grant the commission to the first mobile terminal after the second mobile terminal actually completes the purchase transaction according to the recommendation; or the background server will grant the commission to the first mobile terminal as long as the first mobile terminal implements the recommendation operation (e.g., the first mobile terminal sends the recommendation two-dimensional code and meanwhile notifies the background server; or when the second mobile terminal identifies the recommendation two-dimensional code and extracts commodity information for viewing, the background server knows that the first mobile terminal implements the recommendation operation).

Figure 7:
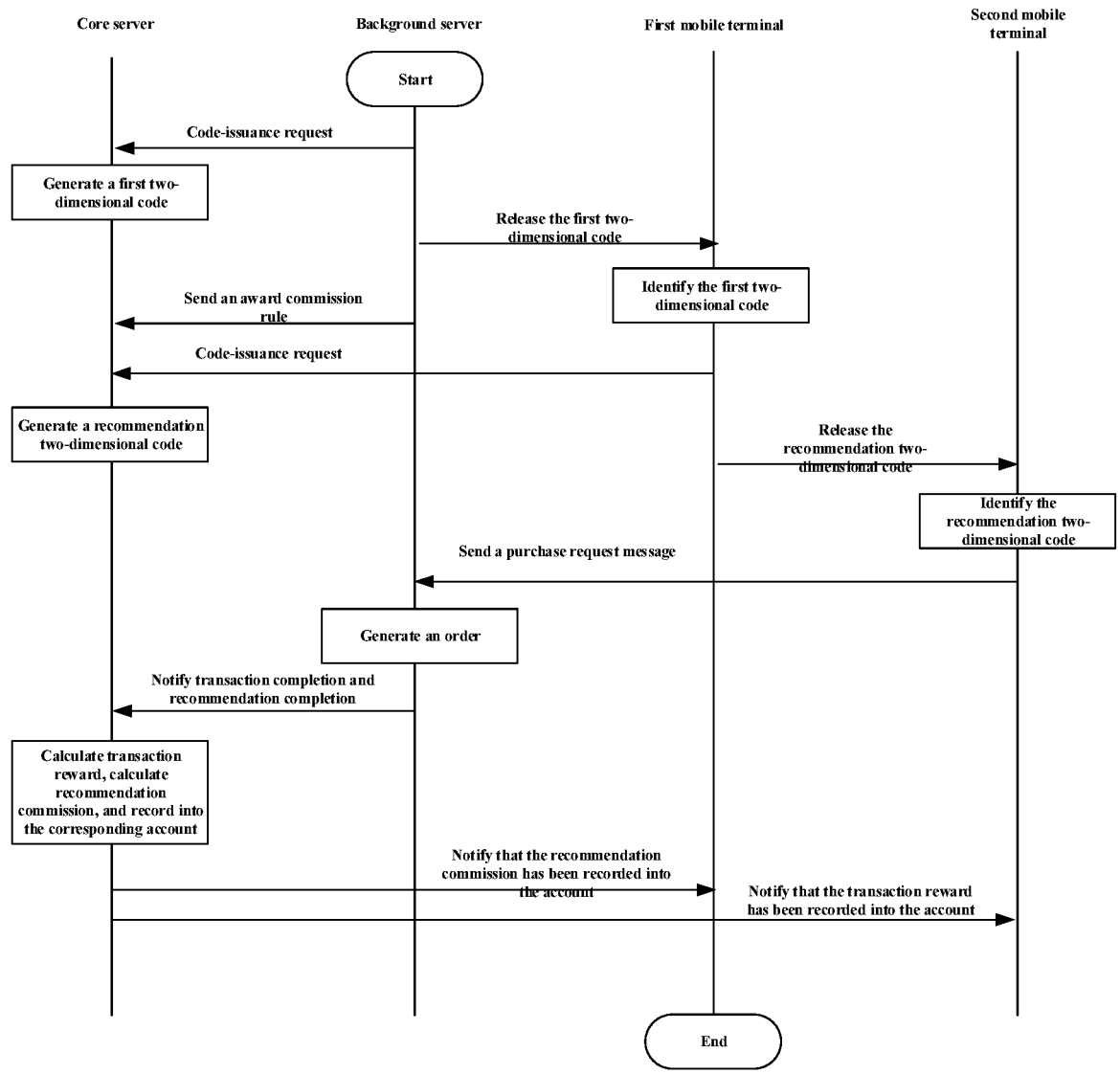
FIG. 7 is a partial flow diagram of another embodiment of the information processing method shown in FIG. 6.

As shown in FIG. 7, the first mobile terminal, by identifying the first two-dimensional code or the recommendation two-dimensional code, and the second mobile terminal, by identifying the first two-dimensional code or the recommendation two-dimensional code, may interact with the background server to complete the commodity purchase deal, and obtains the transaction rewards granted by the background server based on the reward rules; the core server receiving the notification performs corresponding attribute value adjustment.

Or, the background serve has already sent the rules for reward and commission to the core server (e.g., when requesting for generating the first two-dimensional code, or separately sending); then, based on the notification of transaction completion and/or recommendation operation implementation sent by the background server (or the first mobile terminal/second mobile terminal) to the core server, the core server calculates the corresponding transaction reward/recommendation commission, and grants them to the corresponding users. The forms of transaction reward or recommendation commission are not limited, which may be in the form of digital currency or real currency or attribute value adjustment or any other agreed form; the transaction reward or recommendation commission may act as one attribute of the user, which is directly adjusted by the core server in the user account and notified to the corresponding users.

The present embodiment is not limited to only one recommending party or only generating the recommendation two-dimensional code once or only performing one-to-one recommendation. Dependent on actual different application scenarios, there may be a plurality of recommending parties, each of which may generate new recommendation two-dimensional codes for multiple times; after implementing the recommendation or success of the commodity purchase, the background server calculates the commissions for respective recommending parties or respective times of recommendation based on a preset commission rule, and the core server correspondingly performs attribute adjustment. In different examples, based on different rules, it may be set that the commission for each of multiple times of recommendation is identical, or further taking the recommendation times as a reference item (the times are superimposed in the recommendation two-dimensional code or recorded by the core server), so as to provide relatively more commission to the next recommendation of the recommending party that recommends more times, etc.

Suppose there are three mobile terminals, wherein the first mobile terminal requests the core server to generate a recommendation two-dimensional code to be sent to the second mobile terminal and the third mobile terminal, respectively; the second and third mobile terminals have different physical world peculiarities when identifying the recommendation two-dimensional code and thus obtain different services from the background server, and based on the preset commission rules, the background server may grant different commissions to the first terminal in consideration of the situation that the first mobile terminal recommends to the second and third mobile terminals and finally provides different services, and the core server provides attribute adjustments with different values. Or, the peculiarities of the first mobile terminal when sending the recommendation two-dimensional code to the second mobile terminal are different from the peculiarities thereof when sending the recommendation two-dimensional codes to the third mobile terminal, then on this basis, the background server may provide different commissions to the first mobile terminal, and the core server provides attribute adjustment with different values. Or, the user information provided when the first mobile terminal requests the core server for generating the first recommendation two-dimensional code includes one peculiarity of the first mobile terminal, and the user information provided when requesting for generating the second recommendation two-dimensional code includes another peculiarity of the first mobile terminal, wherein the first recommendation two-dimensional code is sent to the second mobile terminal, and the second recommendation two-dimensional code is sent to the third mobile terminal; then on this basis, the background server may provide different services corresponding to different peculiarities to the second and third mobile terminals, and may also provide different commissions corresponding to different peculiarities to the first mobile terminal; and the core server provides attribute adjustment with different values. The various embodiments above may be further extended to a scenario where one recommending party (referring to the first mobile terminal) performs multi-party/multi-time recommendations to more than three users.

Further supposing another scenario with three mobile terminals, the first mobile requests the core server for generating the first recommendation two-dimensional code, including coded information corresponding to the commodity information and the user information of the first mobile terminal user, and the first mobile terminal as a first level of recommending party sends the first recommendation two-dimensional code to the second mobile terminal. The second mobile terminal identifies the first recommendation two-dimensional code to obtain the corresponding relevant information mentioned above, requests the core server for generating a second recommendation two-dimensional code, including coded information corresponding to the commodity information and the user information of the first mobile terminal user and the second mobile terminal user; and the second mobile terminal as a second level of recommending party sends the second recommendation two-dimensional code to the third mobile terminal. The third mobile terminal identifies the second recommendation two-dimensional code to obtain the corresponding relevant information as mentioned above (including the commodity information and the user information of the first and the second mobile terminals), and finally interacts with the background server to complete the transaction. The background server grants, in consideration of the respective recommendation operations implemented by the first and second mobile terminals, different commissions matching their recommendation levels; and supposing the second mobile terminal further interacts with the background server based on the first recommendation two-dimensional code to complete the transaction, then the first mobile terminal may not only obtain the commission regarding its direct recommendation to the second mobile terminal, but also may obtain the commission regarding its indirect recommendation to the third mobile terminal. Moreover, each level of recommendation two-dimensional code may refer to the foregoing operation for multi-party/multi-time recommendations.

Of course, because the core server has records of user information regarding the requests for generating each level of two-dimensional codes, and the background server and/or the core server also have records for each step of the transaction process, the transaction objects, and recommending parties, the recommendation two-dimensional codes may only include the information of the recommending parties for direct recommendation (e.g., the second recommendation code may only include commodity information and the user information of the second mobile terminal, without the user information for the first mobile terminal); or even the recommendation two-dimensional codes may not include information regarding the recommending parties; instead, the background server knows the user information of the each level of recommending party corresponding to the recommendation two-dimensional code based on its own records or based on the records at the core server, such that the background server directly grants commissions to the recommending parties of direction recommendation (e.g., the second mobile terminal), or grants commissions to recommending parties of both direct recommendation and indirect recommendation (e.g., the first and second mobile terminals) based on the preset commission rules.

Various embodiments above may be further extended to a scenario with multi-level recommending parties, namely, each user knowing the service-related information provided by the background server (e.g., obtaining the service information by ways of knowing from the background server, or knowing by scanning the two-dimensional node from the information releasing platform, or knowing from recommendation by other users) may interact with the background server to obtain services, or acts as a recommending party to request, through the mobile terminal, the core server for generating a recommendation two-dimensional code which superimposes the user information of the recommending party per se onto the service information, and releases the superimposed recommendation two-dimensional code to the external. The user receiving the recommendation two-dimensional code may interact with the background server to obtain the service based on the service information therein, or acts as a next level of recommending part to request the core server to generate a next-level recommendation two-dimensional code which superimposes at least the user information of the next-level recommending party per se onto the service information, and releases the superimposed recommendation two-dimensional code to the external for recommendation. Then, for example, respective parties of generating respective levels of recommendation two-dimensional codes, respective parties releasing the respective levels of recommendation two-dimensional codes, respective parties identifying the respective levels of recommendation two-dimensional codes, and respective parties interacting with the identifying parties, may all know, where needed, the situations of respective users acting as a certain level of recommending party; if needed, they may also know for example the information of the preceding level of direct recommending user or the information of several preceding levels of recommending users based on the content included in the recommendation two-dimensional code or the contents recorded when querying the core server or the background server, so as to facilitate the background server to grant corresponding commissions to each level of recommending parties. The background server may set corresponding percentages so as to allocate the commissions to multiple levels of recommending parties involved in a successful transaction by percentages.

The core server may know, based on a similar method of commission granting by the background server, the user information of each recommending party in multiple times of recommendations or multiple levels of recommendations, the recommendation operation implemented thereby, whether the transaction is successful after the direct or indirect recommendation, and corresponding attribute adjustment made by the core server in the accounts of respective recommending parties or respective interacting parties; the core server may set different weight indexes (corresponding examples will be specifically described hereinafter) for recommendation levels of respective parties, different recommendation operations, recommendation times, whether the transaction is successful, times of purchase after successful recommendation, and various other situations, and perform matching attribute adjustments based on weight indexes; the adjusted attribute states may further become one reference basis for the background server to grant commissions for this time or for next time.

A plurality of methods according to this embodiment may provide a new sales channel for all-people direct sale and statistical parsing of corresponding sales conditions. Any person, e.g., a start endorsing a commodity, a Weibo administrator, or an ordinary person who browses a webpage and finds a commodity, may perform recommendation only by identifying, through his/her own mobile terminal or other smart devices, a one-time generated two-dimensional code for the commodity, generating a secondary two-dimensional code through the core server or a party authorized by the core server, and then widely releasing the secondarily generated two-dimensional code. For another example, various kinds of information releasing platforms that release the two-dimensional code or other background server or a third-party server, may also act as a recommending party in a certain level thereof, to request for generating a secondary two-dimensional code and then release it to obtain recommendation commissions. Any generated recommendation two-dimensional code is at least superimposed (or at least corresponding to in the storage records of the background server or core server) with the user information of a recommending party so as to uniquely bind and correspond the recommendation two-dimensional code to the user of the recommending party or his/her mobile terminal. Therefore, after the commodity is purchased by other person, user information of the recommending party will be extracted for each time of purchase for calculating the commissions granted to the recommending party and facilitating corresponding to attribute adjustment.

Embodiment 5

In this embodiment, a plurality of examples of an information processing method based on uniform code issuing are provided, which mainly involves a core server, a first background server providing services related commodity sale, a second background serve providing services related to a social network platform, a mobile terminal of a first user, and one or more other user's mobile terminal in the social network platform, interactions between the above implement a solution of SNS (social network service) search; other mobile terminal, other background server, and other third-party server may be configured according to actual application scenarios.

The first background server requests, as to the commodity it sells, the core server to obtain a promotion two-dimensional code corresponding to the commodity information and then releases the promotion two-dimensional code (procedures of generating and releasing the promotion two-dimensional code may refer to the descriptions in the above various embodiments).

The first user is a registered user of the second background server, such that the first user may use social network platform-related services provided by the second background server for information interaction with other registered users of the second background server. Each user in the social network platform may further establish one or more friend circles, and thus may group other users in the friends circles to perform a more private and pertinent communication interaction.

The first user identifies the promotion two-dimensional code through the mobile terminal to extract corresponding commodity information for viewing and wishes to further obtain other users' appraisals on the commodity. To this end, the mobile terminal of the first user sends an SNS search request to the second background server, and the first user submits a topic (e.g., including the name and model and the like of the commodity to be searched) to the second background server through the SNS search request, asking the second background server to perform SNS search in the social network platform.

The second server receives the SNS search request and searches at least in the information released by other users through the social network platform based on keywords extracted from the topic, sorts the found SNS search results and pushes the results to the mobile terminal of the first user. The SNS search results are displayed on the mobile terminal screen of the first user such that the first user has a further understanding of the condition of the commodity; then, the first user may interact with the first background server based on the promotion two-dimensional code and complete the transaction to obtain the commodity sold at the first background server (similar process of interacting with the first background server may refer to the descriptions in the above various embodiments).

In this example, there is no limitation on the information that is released by other users (for ease of depiction, referred to as peer users) of the second background server through the social network platform and available for SNS search: which may be the contents promptly posted by peer users in reply to this topic, or the contents originally posted by peer users and residing on the social network platform or the contents stored by the second background server: for example, contents previously posted by peer users in reply to other similar topics, or contents posted by peer users on their personal home page of the social network platform, or messages posted on home pages of other person, or contents directly sent by peer users to others through the social network platform.

Respective user (when acting as a peer user) may send a message to the second background server to set rights for the open degree or disclosure scope of various information released by the user: for example, deciding whether to allow using certain information released thereby for SNS search; or, deciding that certain information released thereby is only found for SNS search within a set scope, while cannot be found beyond the set scope. There is no limitation on the form of the set scope. The following examples are provided for reference: for example, limiting the survival time of the released information, such that only the released information within the survival time may be found through SNS search; for another example, limiting the identity, or a value of a certain attribute, or a physical world peculiarity of the user that issues an SNS search request, or limiting the search open only to users a certain attribute value of whom reaches a specific level or a specific scope, or only to associated users (e.g., users within the friend circle, users previously having interactions), or only to users that issue the SNS search request from a certain location through a certain device, while not open to other users issuing the SNS search request; for another example, limiting the contents of the topics for SNS search, such that the released contents are open only to some topics for SNS search, while not open for other topics, etc.

Respective users of the second background server (when acting as the first user initiating an SNS search request) may also set rights for the scope it wishes to search or the search results it wishes to receive, e.g., limiting the time of information release, or only taking the information released within a certain period (e.g., within one month, one year, etc.) as the search source, which may help to exclude too old information; for another example, limiting the identity, or attribute value, or physical world peculiarity of a peer user who releases information, and only taking the following as the search source: the contents released by an associated user, or a peer user whose attribute value reaches a certain level, or the contents released only from a certain location or through a certain device, or the contents released by only peer users who satisfy a preset condition (e.g., a user providing a voucher to the background server to prove that he has actually purchased the commodity), so as not to search from the contents released by other users.

setting of the rights above do not affect normal use and dissemination of the information released by users on the social network platform. The second background server rules out the search sources or search results that do not meet the preset scope based on the rights. The operation of the second background server sorting the SNS search results may refer to providing SNS search results to the first user based on matching degrees of keywords, or in the case of having no completely matching keywords, further obtaining similar keywords by association to perform SNS search and then pushing the results to the first user (e.g., when matching contents cannot be found based on commodity name and model, automatically searching based on manufacturer name and similar model of the commodity), or if the matching contents cannot be found in the social network platform, searching with a larger scope in the Internet, etc.

The first user may become a registered user of the social network platform of the second background server prior to interaction or during the interaction process based on the manners described above in the various embodiments to thereby send an SNS search request to the second background server; supposing that the first user is a registered user for a plurality of social network platforms, respectively, it may select either logging on any one thereof or logging on the plurality of social network platforms, respectively, to send the SNS search request to the corresponding background server, through the mobile terminal.

In some other examples, the coded information of a link address for the second background server to receive the SNS search request may be further included in the promotion two-dimensional code corresponding to the commodity information released by the first background server; then, the mobile terminal of the first user may know the link address after identifying the promotion two-dimensional code, and the SNS search request sent will also be directly redirected to the link address, such that the first background appoints a specific social network platform which receives the SNS search request, namely, the operation of the first user sending the SNS search request is bound to the social network platform of the second background server; this may effectively prevent the first users from turning to other social network platforms when the first background server and the second background server belong to the same operator.

In another example, the first user obtains the commodity information (and/or receives the link address information of the SNS search request) not by identifying the promotion two-dimensional code released by the first background server; instead, it obtains the relevant information by identifying the recommendation two-dimensional code released by other users thereto, where information of the recommending user is further superimposed, based on the commodity information, in the recommendation two-dimensional code generated by the core server at the request of the recommending user. Further supposing that the recommendation user may be a registered user of the social network platform of the second background server and sends the recommendation two-dimensional code to the first user based on the social network platform, then the recommendation two-dimensional code received by the first user may also include corresponding coded information of the link address of the second background server for receiving the SNS search request, so as to designate that searching with respect to the SNS search request from the first user received by the second background server is performed on the social network platform of the second background server. The coded information of the link address may be added when the recommending user requests the core server to generate the recommendation two-dimensional code, or may be added when the second background server requests the core server to further impose the link address based on the coded information included in the first recommendation two-dimensional code to form the second recommendation code, for the social network platform to complete the recommendation two-dimensional code forwarding operation, which thereby prevents loss of the first user to other social network platforms.

In different application scenarios, a background server with more powerful functions may be provided, which may simultaneously cover the commodity-selling services of the first background server and the services of the second background server of maintaining the social network platform and implementing SNS search. Or, upon receiving the SNS search request from the first user, the second background server forwards it to the third-party server to perform a specific search operation; and then the second background server obtains the results of SNS search from the third-party server and pushes them to the first user.

Besides, the core server knows relevant operations of respective parties during the SNS search process, and performs corresponding attribute adjustment in the accounts of such as the second background server that completes the SNS search, the first user that initiates the SNS search request, the peer user the information released by whom is adopted by the SNS search, and the recommending user that releases the recommendation two-dimensional code, etc. The first background server and/or the second background server may provide more pertinent services (e.g., enjoying a larger discount when providing services, or promoting the user's level in the social network platform) based on the user's attribute state. The attribute state of a certain user may also be one basis for other person sets reception rights with respect to the contents released by the certain user upon SNS search, or for the second background server adopts the contents released by the certain user as effective SNS search results.

Figure 8:
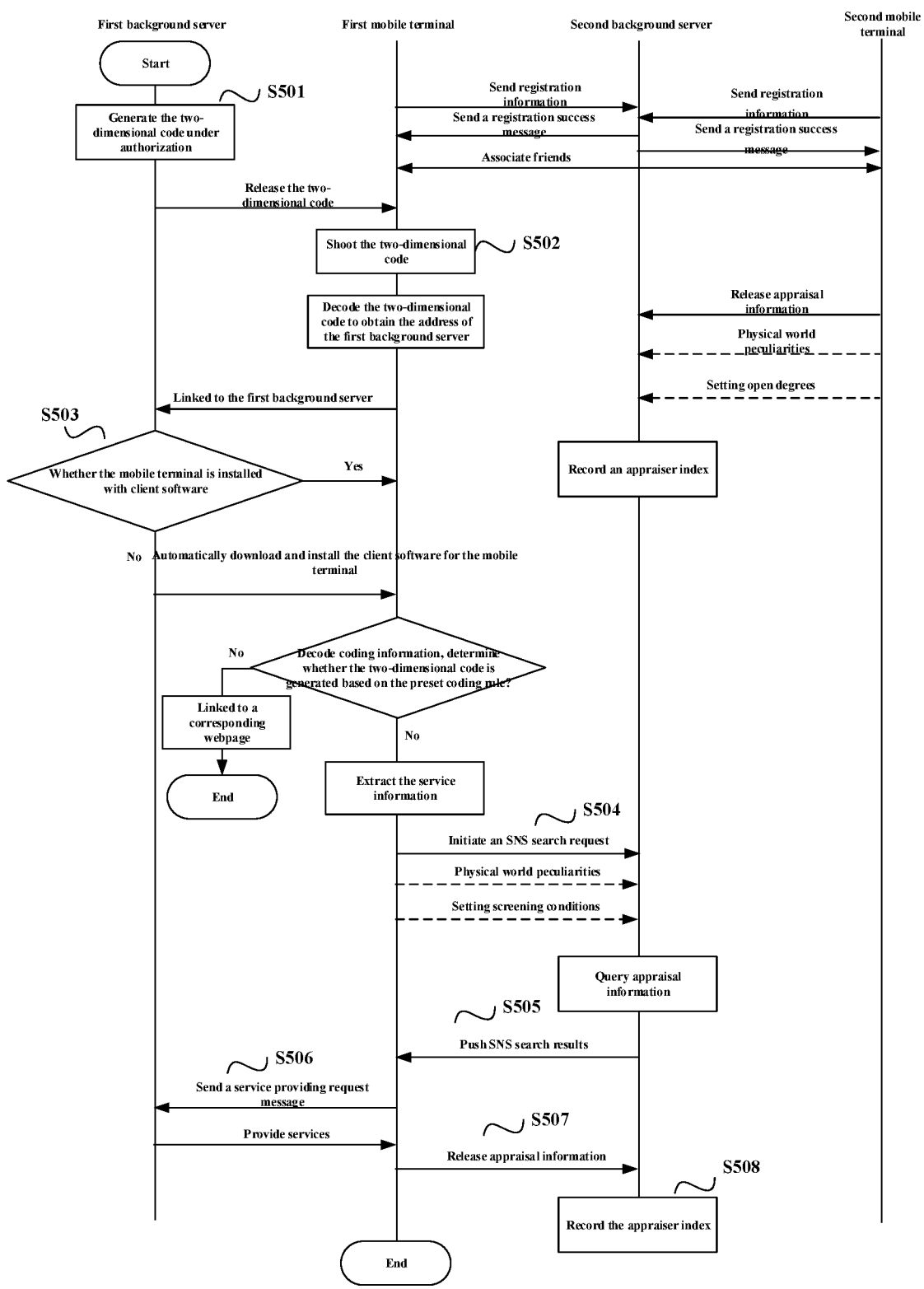
FIG. 8 is a flow diagram of an information processing method based on uniform code issuing in a fifth embodiment of the present disclosure.

The process of the embodiment will be illustrated through a specific example of ordering at a restaurant, as shown in FIG. 8:

In step S501, a customer enters a restaurant; autonomously or reminded by a waiter, the consumer uses a mobile phone to identify the two-dimensional code on a table, where coded information corresponding to the two-dimensional code includes information of the first background server and a request instruction for initiating an SNS search query. The two-dimensional code is generated by the core server or a party authorized thereby according to a set coding rule.

In step 502, the consumer opens the camera in the mobile phone to shoot the two-dimensional code and obtains the address and relevant parameters of the first background server through a decoder and an encoded information parsing unit in the mobile phone hardware entity, to thereby access the first background server.

In step S503, it may be determined whether a decoding client software corresponding to the coding rule of the two-dimensional code is installed in the mobile phone; if the software is not installed, the decoding client software is downloaded and installed; then, the parameters included in the parsed two-dimensional code are imported in the automatically booted client software; if the software has been installed, the parameters included in the parsed two-dimensional code are directly imported in the automatically booted client software; or the service corresponding to the two-dimensional code is directly identified; if it is the two-dimensional code corresponding to the service provided by the first background server, the mobile phone will be hooked to a set webpage or hooked to no webpage (it may be the case that only ERROR information is prompted on the screen, notifying the user that a wrong two-dimensional code is scanned, please scan a correct two-dimensional code, etc.). In different application scenarios, this step may be optional.

In step S504, the menu of the restaurant is presented on the mobile phone (the client software opened) of the consumer, the menu being coded, read and presented according to the set coding rule of the two-dimensional code. A request for SNS search query may be initiated for each dish in the menu, that is, requesting the second background server to query, in the friend circle of the consumer's social network platform, whether there are friends who have appraised the dish quality of the menu/the restaurant; supposing searching in the search scope set by the consumer, if no appraisals have been posted in the first tier of friend circle (i.e., friends directly associated with the consumer), then the search goes to the second tier of friend circle (friends of the consumer's friends) to search whether there are friends having posted appraisals; so on and so forth, search is conducted in a plurality of tiers of friend circles to obtain appraisals.

In step S505, when sending the found appraisals to the consumer's mobile phone, the second background server may also notify the consumer of a "appraiser index" of the appraisal poster such that the consumer has an understanding of the credibility degree of the appraisal.

As a user attribute, the "appraiser index" may be given, through calculation, by the core server or the second background server based on the appraiser's relevant operations or other attributes, and recorded in the account of the appraisal poster. Dependent on different setting policies or rules, the operation of calculating the "appraiser index" may have a plurality of manners or a combination of a plurality of manners: for example, the times of extracting menus or ordering from the first background server when the appraisal poster scans two-dimensional codes represents the times for him to patronize the restaurant or the times of successful consumption; it may be set that more times may correspond to getting a higher index value; for another example, it may be set that the more times the appraisals posted by the appraiser in similar topics are adopted as valid SNS search results, the higher index value he gets correspondingly, etc.

Preferably, the appraising operation may be limited or the SNS search results may be screened based on LBS (location-based services) or other physical world peculiarities. For example, the appraisals can only be made after the client software on the appraiser's mobile phone has scanned the two-dimensional code in the restaurant or successfully ordered based on the two-dimensional code (for example, when the mobile phone of the appraiser is interacting with the corresponding background server, the location information of the mobile phone or the voucher of successful deal are also sent to determine whether the prescribed requirements for appraisals are met). Further, the appraisal may be associated with the appraiser's mobile phone, thereby avoiding mass invalid appraisals. The appraisal may be found by corresponding SNS search based on the appraiser's index and his settings about the open degree and scope for the appraisal; meanwhile, the appraisal released by the appraiser may reside on the personal home page or friend circle of the appraiser and may be disseminated based on the original means of the social network platform.

In step S506, after referring to the appraisals, the consumer may order the preferred dishes on the menu and send order information to the waiter's mobile phone/the restaurant's service terminal device associated with the two-dimensional code, including the dishes ordered, desk number, time, etc.; the waiter's mobile phone/the restaurant's service terminal device directly receives the order information or receives the order information forwarded by the first background server through the client software or an SMS message or other way, to provide corresponding services to the consumer.

Preferably, the menu presented on the consumer's mobile phone may also include a link to obtain a coupon, and after the link is clicked, a coupon two-dimensional code including coupon information is sent to the consumer's mobile phone. Further, when sending the request for obtaining the coupon two-dimensional code, the consumer's mobile phone provides the current time and address, and then the generated coupon two-dimensional code includes discounts corresponding to the requested time and address; the client software in the waiter's mobile phone scans and verifies the coupon two-dimensional code in the consumer's mobile phone, such that the consumer may consume using the discount provided by the coupon. Of course, the manner of getting the coupon is not limited thereto, which is not limited in the present disclosure.

In step S507, the consumer may, as a new appraiser, post a appraisal under a menu presented through the client software in the mobile phone or post the appraisal on the friend circle or other page on the social platform, and may set the open degree and scope for the appraisal, and determine whether the appraisal may be presented by the second background server to other users initiating the SNS search request.

In step S508, the second background server calculates a corresponding appraiser index for the consumer posting the appraisal, as a reference for adopting the appraisal as a valid SNS search result or as a reference for granting rewards to the consumer.

This embodiment enables the SNS search and quantified recommendation with respect to the consumer's understanding of the merchant's menu. Further, the requesting party for the SNS search may have a detailed understanding regarding the services provided by the merchant from the contents posted in the friend circle; while the appraiser posting the appraisals may not only express his own preferences, but also may help friends through the social network platform, and meanwhile get rewards from the merchant, which is finally embodied on the adjustment of various attribute values such as his personal appraiser index.

Embodiment 6

This embodiment provides a plurality of examples of an information processing method based on uniform code issuing to implement a solution of SNS (Social Network Service) help seeking, wherein configurations of a core server, a first background server, a second background server, a first user's mobile terminal, and a peer user's mobile terminal as involved, may refer to Embodiment 5, and various features described in Embodiment may be applied to this embodiment, vice versa; besides, the operations of the SNS help seeking and the SNS search initiated by the users do not conflict. Other mobile terminals, other background servers, and other third-party servers may be configured based on actual applications.

The first background server requests, as to the commodity it sells, the core server to obtain a promotion two-dimensional code corresponding to the commodity information and then releases the promotion two-dimensional code. The first user is a registered user of the second background server, such that the first user may use social network platform-related services provided by the second background server for information interaction with other registered users of the second background server or the friends in his friend circle.

The first user identifies the promotion two-dimensional code corresponding to the commodity information through the mobile terminal to extract corresponding commodity information for viewing and wishes to further obtain the appraisals on the commodity posted by users (particularly the friends in his friend circle) in the social network platform. To this end, the mobile terminal of the first user sends an SNS help seeking request to the second background server, i.e., submitting a topic (e.g., including the name and model and the like of the commodity to be searched, and notes that the user needs to know) to the second background server through the SNS help seeking request, inviting users (for ease of depiction, referred to as peer users) in the social network platform who receive the topic forwarded by the second background server to reply to the topic. The coded information of the promotion two-dimensional code released by the first background server may further includes a link address of the second background server appointed to receive the SNS help seeking request, such that the first user directly sends the SNS help seeking request to the appointed second background server.

The appraisal information provided by a peer user receiving the topic with respect to the involved commodity may be searched on its own, and may also be directly sent to the first user through various dissemination manners (private messages, left messages, SMS messages, etc.) or posted on the page of the first user, or superimposed by the second background server to its returned information with respect to the SNS help seeking request and forwarded to the first user. A result of the SNS help seeking is displayed on the mobile terminal screen of the first user, such that the first user has a further understanding of the conditions of the commodity. Afterwards, the first user may interact with the first background server based on the promotion two-dimensional code and completes the transaction to obtain the commodity sold at the first background server. The second background server or the core server calculates a value of a corresponding attribute such as a appraiser value for a peer user replying to the topic, and records the value in the account of the peer user; the first background server or the second background server may query the index to grant a corresponding reward, e.g., granting a recommendation commission.

Particularly, respective user (when acting as the first user initiating the SNS help seeking) may also send a message to the second background server to set rights for the open degree and scope of the help seeking so as to limit the identity and physical world peculiarities and the like of the users intended to reply to the topic: asking the second background server to send, after querying the corresponding user states, the topic of SNS help seeking, to all users in an online state, or only send, after querying the user's friend association conditions, the topic to friends in the first and second tiers of friend circles, or only send, after comparing location information, the topic to users with a distance from the initiator's actual geographical position not exceeding a set distance. Moreover, the user may also set rights to the contents and physical world peculiarities when replying to the topic fed back from the second background server, e.g., screening the replies with some keywords, screening the replies sent later than a certain time, etc. The second background server will then rule out the reply results beyond the scope of the set rights.

Besides, respective user (when acting as a peer user) may send a message to the second background server to set rights for the open degree or open scope as to whether the user is willing to receive the SNS help seeking request initiated by other persons: for example, allowing or screening all SNS help seeking requests, or only receiving the SNS help seeking requests initiated by associated users (e.g., the friends in his friend circle or friends in his second tier of friend circle, or users having interactions). The user may limit, by setting rights, the identity, or a value of a certain attribute, or a physical world peculiarity of the user initiating the SNS help seeking request, and may also limit the content of the topic of SNS help seeking and the physical world peculiarities involved upon initiation, so as to receive the SNS help seeking request satisfying the set rights. The second background server will then rule out the help seeking requests beyond the scope of the set rights. If necessary, the user may also ask the second background server to also send relevant auxiliary information (e.g., user information of the topic initiator, physical world peculiarities involved with the topic or its initiator) when sending the topic of the SNS help seeking request thereto; the user views the auxiliary information to determine whether it is necessary to reply to the received SNS help seeking.

A peer user replying to the topic may act as a referral to ask the core server or a party authorized by the core server to generate a recommendation two-dimensional code with coded information including such as commodity information, user information of the peer user, and his appraisals on the commodity, and send the recommendation two-dimensional code to the first user as a reply to the topic, or release it to other users for commodity recommendation (relevant examples of commodity recommendation may refer to depictions in the various embodiments above).

In another example, the first user obtains the corresponding commodity information and referral information by identifying the recommendation two-dimensional code released thereto by other person. The first user may directly send the SNS help seeking request to the referral based on the recommendation two-dimensional code; then the recommendation two-dimensional code may further include a link address for the second background server of the social network platform where the referral is located to receive the SNS help seeking request. The SNS help seeking request received by the second background server further includes identification information of the referral, so as to accurately send the request to the corresponding referral to reply.

The core server knows relevant operations of respective parties during the SNS help seeking process, and performs corresponding attribute adjustment in the accounts of such as the second background server that completes the SNS help seeking, the first user that initiates the SNS help seeking request, the peer user replying to the SNS help seeking, and the recommending user that releases the recommendation two-dimensional code, etc. The first background server and/or the second background server may provide more pertinent services (e.g., providing a larger discount when services are provided, providing awarded commissions or promoting the user's level in the social network platform) based on the user's attribute state. Further, an attribute state of a certain user may also be a reference basis for setting rights when initiating or receiving the SNS help seeking.

Figure 9:
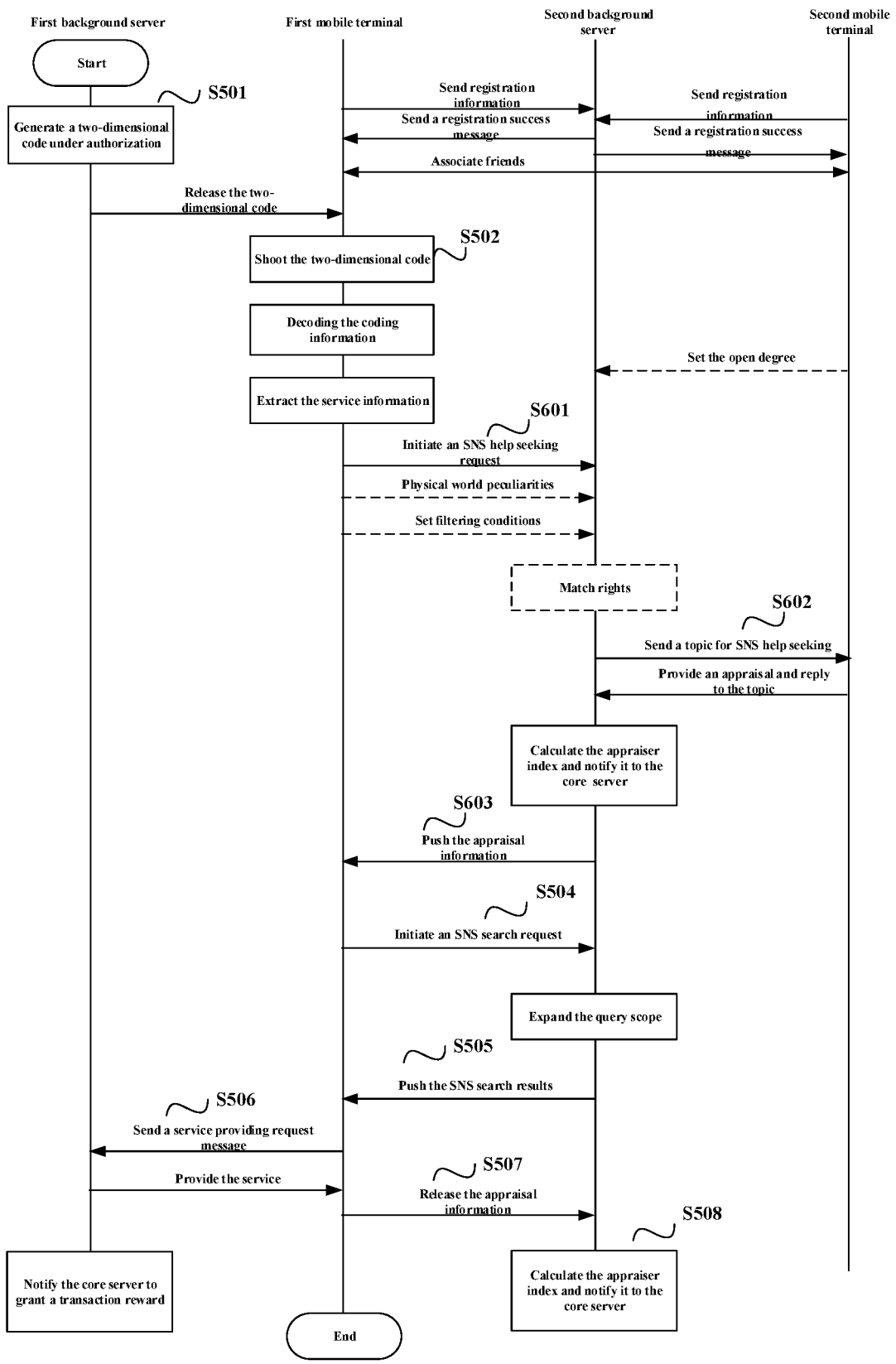
FIG. 9 is a flow diagram of an information processing method based on uniform code issuing in a sixth embodiment of the present disclosure.

As shown in FIG. 9, the process of the embodiment will be illustrated with another specific example of ordering from a restaurant. After performing operations similar to steps S501~S503, in step S601, the menu of the restaurant may be presented through the mobile phone of the first user, the menu being coded, read, and presented according to a set coding rule for two-dimensional codes The SNS help seeking request may be initiated for each dish in the menu, i.e., requesting the background server to invite friends, of the consumer in the first to second tiers of friend circles on the social network platform, to post appraisals on the dish quality of the menu/the restaurant. In step S602, the peer user receiving the SNS help seeking request obtains the restaurant or dishes involved in the topic, further query the information of the initiating user presented thereto by the background server to verify the identity of the peer user, and the peer user, after providing the appraisal information about the corresponding restaurant or dishes, sends the appraisal information to the background server. In step S603, the background server forwards the appraisals replied by the peer user to the mobile phone of the consumer (initiating user) and meanwhile notifies the consumer of the peer user's "appraiser index" or other attributes allowed to be open by the peer user, for the consumer's reference.

Afterwards, the consumer may order according to the operation in step S506 and posts his appraisals according to the operation of step S507 for other persons to query and use when initiating the SNS search, or sends a recommendation two-dimensional code including the information of the restaurant/dishes, the information of the consumer as a referral, to recommend to other persons, or as described in step S508, the background server or the core server adjusts and records the corresponding indexes of the consumer and its peer user. For example, the background server may also record conditions that the consumer has scanned the two-dimensional code at the restaurant or completed the transaction, such that when other users initiate a request for SNS search or SNS help seeking later, the consumer's appraisals will be searched in priority, or an invitation for replying to the topic is initiated to the consumer in priority.

The request for SNS search or the request for SNS help seeking submitted by the mobile terminal of the consumer to the social network platform may be implemented in coordination. For example, the consumer may first perform operations similar to steps S501~S505 to present, on the mobile phone of the consumer, the appraisal result returned after performing SNS search with respect to a certain dish, and the appraiser index of the appraisal poster. Then, the consumer may select several appraisers with the highest appraiser indexes, and further sends an SNS help seeking request to the background server, requesting the background server to send a topic to these selected appraisers to invite them to introduce a certain dish in detail. The appraisers receiving the invitation may post appraisals on this topic and reply to the consumer, or screen the invitation based on the rights they set. Similarly, the consumer may set corresponding keywords in the appraisal results returned from the SNS help seeking to form a new topic, requesting the background server to perform SNS search in a larger scope of user population based on the new topic.

Besides, in another example, supposing that when the consumer presents the menu through a specific client software in the mobile terminal and initiates an SNS search and/or an SNS help seeking request or an ordering request with respect to a certain dish, a party (e.g., other user/a background server of the social network/the service terminal device of the restaurant, etc.) receiving the corresponding request knows the consumer's interest in the dish and then further pushes other commodity or service related to the dish to the consumer, e.g., if the dish of interest is fatty meat, pushes him an insurance for fatty liver diseases; the pushed content is correspondingly matched according to some physical world peculiarities or a combination of the peculiarities of the consumer. The consumer may buy an insurance based on the pushed message or recommend the insurance-related content to other users, and is awarded for the recommendation based on a condition that any level of person to whom the insurance is recommended in the dissemination chain successfully buys the insurance, which is embodied to adjustment of the recommendation index of the consumer.

Embodiment 7

Figure 10:
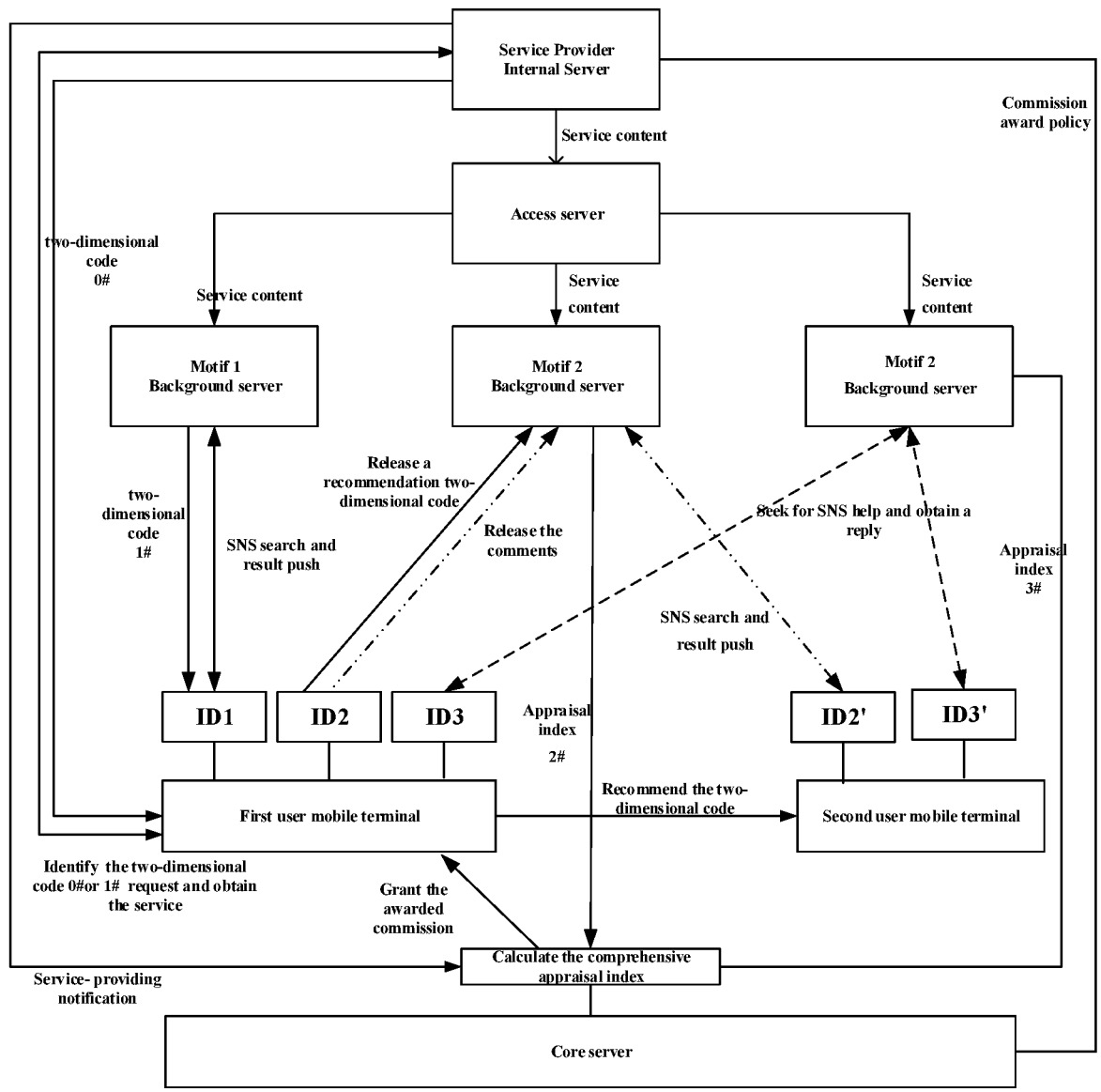
FIG. 10 is a structural schematic diagram of an information processing network based on uniform code issuing in a seventh embodiment of the present disclosure.

A plurality of examples of an information processing method based on uniform code issuing are provided in this embodiment, as shown in FIG. 10, which mainly involve interactions between a core server, a plurality of background servers respectively having a different motif, and a mobile terminal of a user having a plurality of identities (IDs); other mobile terminal and other third-party server may be configured according to actual application scenarios. The interaction mentioned in the above or the following other examples may refer to an interaction between one of the plurality of background server in this embodiment and/or the user or one of a plurality of IDs of the mobile terminal.

The user registers to become a registered user of the background server for a corresponding motif using one or more IDs; one mobile terminal of the user may only correspond to one ID of the user, and may also correspond to a plurality of Ids of the user and may implement switching between these Ids as needed; one ID of the user may also log on different mobile terminals to implement interaction with a corresponding background server. The process in which the user, with any ID, interacts with the background for any corresponding motif through the mobile terminal may refer to the descriptions in various embodiments above.

Hereinafter, illustration will be made with an example where the core server correspondingly sets an attribute account for each user (for example, it may be required to register with the core server with a real name or a unique ID such as the ID number, such that each user only has a corresponding one attribute account; but it is not limited that in other examples, one user may have a plurality of corresponding attribute accounts). An attribute account correspondingly includes a plurality of attributes, wherein each attribute in some attributes correspondingly includes a plurality of topic items which correspond to a plurality of topics; the core server knows that one or more IDs of the user or one or more Ids are respectively associated with a plurality of topics (e.g., the user or the corresponding background server notifies the association to the core server), such that the core server may adjust the attribute value under the corresponding topic item in the attribute account with respect to the operation that is performed by the user with a certain ID and meets a set attribute adjustment condition (this may refer to the various embodiments above, for example, including, but not limited to, interactive operations with a background server for a corresponding topic, and/or a recommendation operation of generating a recommendation two-dimensional code superimposed with the user ID and recommending to other persons, an operation of replying to the SNS search request or SNS help seeking request, etc.). The core server may set corresponding weight indexes for different topic items (corresponding to different topics) to calculate matching attribute adjustment values. For example, for the same kind of operations performed by the user under different motifs with a certain ID, the core server may obtain different values for adjusting the corresponding attributes after calculating based on the weight index of the topic.

In some other examples, besides for different motifs, corresponding weight indexes may also be set for other matters, e.g., corresponding weight indexes may be set for different operations performed by the user, or corresponding weight indexes may be set for different physical world peculiarities when the user performs the same kind of operations. Attribute values may be separately calculated based on the weight index of a matter: for example, adjustment values for corresponding attributes may be obtained after calculating different operations of the user under the same motif based on the weight indexes set for the operations. Attribute values calculated based on the weight indexes of a plurality of matters may also be calculated in combination: for example, a certain operation of the user may be first calculated based on a first weight index corresponding to the different operations, then calculated based on a second weight index corresponding to the physical world peculiarities when performing the operation, and then calculated based on a third weight index corresponding to different motifs with respect to the motif corresponding to the user ID performing the operation, and finally obtaining the adjustment value of the corresponding attribute.

Hereinafter, a specific example will be provided to illustrate the solution of this embodiment: setting that a user DM1 has a plurality of Ids based on a plurality of specific motifs, e.g., WeChat ID=WECHAT1, WeiboID=WEIBO1, and MOMOID=MOMO1. WeChat, Weibo, and MoMo maintain different social network platforms through their respective background servers, corresponding to three different motifs having an SMS release and dissemination functions in this example; they generate, through a core server or an authorized party, two-dimensional codes corresponding to their respective motifs and release them on their respective cooperative platforms.

In different application scenarios, the two-dimensional code of respective motif may correspond to different service contents; or, the two-dimensional code of respective motif may correspond to a same service content, but meanwhile further covers respective features of different motifs, e.g., having different coding manners, such that the dimensional code of a certain motif can only be identified by software matching the motif so as to extract the included service content. The same service content (commodity information/promotion content) corresponding to respective motif may be provided by a third party independent of these motifs.

The user DM1 identifies corresponding two-dimensional codes using different Ids, respectively, and perform a plurality of actions at a corresponding O2O scenario (e.g., a specific time point, a specific physical location, or other elements of the physical world peculiarities or combinations thereof; the conditions are specifically defined in advance by the background server) for example with the ID of motif 1, i.e., WECHAT1:

(Wechat-Activity 1, Wechat-Activity2 . . . Wechat-ActivityN);

A plurality of further actions are completed with the ID of motif 2, i.e., WEIBO1:

(Weibot-Activity 1, Weibo-Activity2 . . . Weibo-ActivityN);

A plurality of other actions are completed with the ID of motif 3, i.e., MOMO1:

(Momot-Activity 1, Momo-Activity2 . . . Momo-ActivityN).

To this end, the user DM1 obtains the following comprehensive appraisal index:
Index1=F(F1(Wechat-Activity1, Wechat-Activity2 . . . Wechat-ActivityN, O2O), F2(Weibot-Activity 1, Weibo-Activity2 . . . Weibo-ActivityN, O2O), F3(Momot-Activity1, Momo-Activity2 . . . Momo-ActivityN, O2O), . . . . FN( . . . )).

Assessment of the comprehensive appraisal index (defined as a function F series) is performed according to uniform rule and/or protocol. The set rule and/or protocol for example determines which actions of the user under respective motifs may be appraised, or whether these actions have different weight indexes; and whether the appraisal refers to different O2O scenarios or weight indexes corresponding to different O2O scenarios when corresponding actions are completed, etc. For example, in different application scenarios, actions that may be appraised under respective motifs may be set identical or not identical, and these actions may be set to have different weight indexes. To obtain the appraisal, the actions implemented by the user under respective motifs may be identical or different; the user may obtain an appraisal index under a motif when completing all set actions for the motif, and obtain an appraisal index under another motif when completing some actions of all set actions for said another motif. The O2O scene when completing the actions may be further used as one basis for reference when the background server and/or core server of respective motif performs appraisal.

Particularly, the background server of motif 1 appraises the actions under the motif through function F1, the background server of motif 2 appraises the actions under the motif through function F2, so on and so forth for the appraisal cases with more motifs; finally, the core server or a background server appointed thereby, and the third-party server performs comprehensive calculation to the appraisal indexes obtained under all motifs through the function F. Particularly, the background server of respective motif may know a complete appraisal rule (i.e., all functions F (F1~Fn) in the whole series), or should at least know part of appraisal rules corresponding to the motif (i.e., at least including a function FN, N corresponding to the motif); the core server may know a complete appraisal rule (i.e., all functions F (F1~Fn) in the whole series), or should at least know the rule used for final comprehensive appraisal (i.e., at least including a function F).

The rules as the basis for appraisal by the background server of respective motif may be prepared by respective background server, respectively, and if necessary, they may be informed to other background server, core server, service provider or user. Or, in another example, the rules as the basis for appraisal by the background server of respective motif may also be prepared by the core server and informed to respective background server, respectively, and if necessary, may be make known to the user. Or, in a further example, the rules as the basis for appraisal by the background server of respective motif may also be prepared by another third-party (e.g., a merchant as a service providing party or a reward granting party) independent of respective background server (corresponding to the social platform of respective motif), and is informed to the respective background server, and if necessary, informed to the core server or made known to the user.

Similarly, the rule based on which the core server makes the final appraisal may be formulated by the core server, or may be formulated by the third party and notified to the core server; where necessary, the rule may be informed to respective background servers or to the user. Besides, the background server of respective motif also has its own attribute account at the core server; the core server may appraise the respective background server and calculates its appraisal index after it has completed the action set by the rule; the weight parameters for different actions and/or the appraisal index involved with various actions may be referenced.

Moreover, in some examples, the core server may set corresponding weight indexes for the appraisal index of respective background server; then, after receiving the appraisal index of the user under respective motif as sent from the background server, the core server may further refer to the appraisal index of the background server per se of respective motif when comprehensively appraising the user, so as to obtain the final appraisal index of the user under a certain attribute after calculating the corresponding weight index. The attribute involved in calculating the user's comprehensive appraisal index may be identical to or different from the attribute of the background server referenced upon calculation. For example, when comprehensively appraising the user's credit level, credits or amount of digital currency, the core server appraises or sets corresponding weight index with reference to the credit level of the background server.

The appraisal index of the user for a certain attribute under a certain motif may act as one of reference basis for appraising other attributes under the motif; the comprehensive appraisal index obtained by the user under a certain attribute may also act as one of the reference basis when appraising other attributes. The comprehensive appraisal index of an attribute of the user or one of its IDs is recorded by the core server under the user's attribute account; the comprehensive appraisal index may be directly displayed digitally, available for respective parties to view when needed, such as the user himself, other users, background servers, third-party servers, etc., such that parties may understand the situation of the user, which may serve as one of the basis for reference when considering, for example, the setting of rights on whether adopt the user's reply information. Of course, the user or core server may also limit which interacting parties are allowed to view the user's comprehensive appraisal index and/or its appraisal index obtained under respective motif.

Of course, in the case that the background server of a certain motif knows that the same user has a plurality of Ids, the background server may first appraise the actions performed by respective Ids, respectively, and then calculates a uniform appraisal index of the user under the motif with respect to the weight indexes of different Ids (e.g., setting the weight index with reference to a certain attribute value of each ID (e.g., user level, active degree, etc.)), and then sends the uniform appraisal index to the core server for comprehensive appraisal. Or, in another example, when the background server knows or does not know that the user has a plurality of different Ids, it only appraises the actions performed by individual IDs, respectively, and sends the appraisal indexes corresponding to the different Ids separately; then, supposing that the core server knows that the user has a plurality of Ids under the same motif, the core server may comprehensively calculate the appraisal indexes of these Ids (e.g., based on a certain weight index), and records these appraisal indexes in the attribute account of the user.

The action performed by the user, which may be appraised, may be an operation implemented by the user or via its mobile terminal, as mentioned in any embodiment above, or the interaction operation of the user with respective other parties, e.g., including, but not limited to: an operation of registering with the background server, an operation of identifying the two-dimensional code to thereby obtain the service-related information from the corresponding background server, an operation of recommending (e.g., releasing the recommendation two-dimensional code) to other users, an operation of completing the transaction with the background corresponding to the service contained in the two-dimensional code, an operation of replying to an SNS search request or an SNS help seeking request from other users, and other conventional operations performed by the user at the social network platform maintained at the background server of a certain motif, etc. The action of the respective background server, which may be appraised by the core server, may be an operation of the background server mentioned in any embodiment above, or its interactive operation with the mobile terminal, the core server, or the third-party server, or an operation of appraising the user as mentioned in this embodiment, etc.

The data or information that needs to be sent by any interacting party (e.g., the user and its mobile terminal, the background server of respective motif, the third-party server, the core server) to respective other party, including, but not limited to: interaction information, appraisal index, rule notification information, O2O scenario information, etc., may be transmitted in a two-dimensional form; the sender of the information requests the core server for generation of the two-dimensional code, and the core server or a party authorized thereby generates the two-dimensional code including codes corresponding to the information.

An example of a uniform two-dimensional coding rule of the core server in the present disclosure is shown as follows: setting a two-dimensional generation interface, and adjusting the length of the short code of the current two-dimensional code from 8 bits to 12 bits, e.g., www.linkon.cn/ABCDEFGHIJKL_UVWXYZ. The first 12 bits (A~L) are unique, containing a promotion page two-dimensional code and a payment two-dimensional code; after an operation server invokes the interface, the short code is returned to the operation server, such that the operation server generates a two-dimensional image; the promotion page parameters: server ID, merchant ID, object type, object ID, area ID, channel ID, share to, user ID, source two-dimensional code, etc.; the payment two-dimensional interface parameter: server ID, merchant ID, manager ID, amount, notes, etc.; the interface needs to verify the operation server web site, server ID, application ID, application key, token, etc. The latter 6 bits (U~Z) refer to the merchant ID, location, channel management, object ID, and object type (Code Type, which may manage a plurality of attributes of the object, such as display/promotion and investment inviting/buy/questionnaire/collecting coupon/donate, etc., and services that may be obtained by clicking (e.g., in the WeChat)/long press (e.g., two-dimensional code in the WeChat)/code scanning (e.g., in an environment where code scanning is allowed)/shake (within a scene)), the user ID, the source code, etc.

Embodiment 8

Hereinafter, illustration will be made by further providing an example of weight calculation with the appraisal index to grant awards to a user's recommendation. Corresponding settings may refer to the embodiment above.

Still supposing that a certain user DM1 has a plurality of Ids based on a plurality of specific motifs. Respective backgrounds of these topics (e.g., WeChat, Weibo, and MoMo) maintain different social network platforms. They have an SNS release and disseminating function, respectively, and connected to a same access server, respectively, so as to obtain a content (e.g., service content/commodity content/promotion content, etc.) provided by the merchant from the access server, and release, on cooperative platforms (e.g., respective O2O scenes such as merchant, counter, webpage) corresponding to respective topics, a two-dimensional code with the encoded content containing the content to promote.

The SNS releasing and dissemination function of the background server of respective motif, including but not limited to, supporting the user to perform any of the following operations: posting or replying to a message on personal home page or other page; messaging between users, performing SNS search/SNS help seeking, and setting rights for message releasing or message obtaining, etc. The user may send the recommended content to other users based on the SNS releasing and dissemination function. The user may send the recommended content in a recommendation two-dimensional code form.

Moreover, the background server may also obtain the content provided by the merchant from an accessed server to generate two-dimensional codes corresponding to respective motifs; or the background server may directly obtain original two-dimensional codes containing the content from the accessed server, decode the relevant content, and then generate the two-dimensional codes corresponding to respective motifs. The operation of generating respective two-dimensional codes may refer to the depictions in the various embodiments above.

The two-dimensional codes released by the background servers of different topics may have uniform contents and formats; or, besides the contents such as the service content/commodity content/recommendation content provided by the merchant, the coded contents corresponding to the two-dimensional codes released for different topics may also be superimposed with the topic or unique identification information of its background server or other information (e.g., a link to the social network associated with the topic, the webpage, the client software, etc.); or, the two-dimensional codes released for different topics may also have coding patterns corresponding to respective motifs such that they can only be identified by client software for corresponding motifs, etc.

The user DM1 identifies, through its mobile terminal, the original two-dimensional code released by the merchant, or identifies the two-dimensional code released by the background server of a certain motif, and knows, by extracting the content contained therein, a rewarding rule "the sharing dissemination value of sharing links for a house property promotion with a total value of 1 million yuan is 10,000 yuan" set by the merchant. To obtain the dissemination reward, the user DM1 further superimposes, based on the content corresponding to the two-dimensional code, information of the user or its mobile terminal, to request the core server to obtain corresponding recommendation two-dimensional code. For example, generating, releasing, and identifying of the merchant's original two-dimensional code, the two-dimensional code released by the background server of respective topic, or the recommendation two-dimensional code of the user, may all refer to the depictions in the various embodiments above, which will not be detailed one by one.

The user DM1 may perform dissemination and promotion using a same kind of recommendation two-dimensional code or using a plurality of recommendation two-dimensional codes superimposed with its different ID information, on a social network platform of a same motif or on social network platforms of different motifs. For example, the user DM1 presents, with his ID of a certain motif, promotion content BUY1 to other users under the motif in scene O2O1 (at a certain time, location or, elements of other physical world peculiarities, or combinations thereof) by sharing the recommendation two-dimensional code or by other dissemination and promotion ways. The operation is recorded, by a background server (or core server or third-party server or accessed server, etc.) of the motif, as an action of "completing SNS recommendation 1 with the ID of WECHAT1_1"; the promotion content BUY1 is, for example, transmitted to his friend with the WeChat ID of WECHAT1_2, and transmitted all along till a friend with the WeChat of WECHAT1_N through multiple tiers of recommendation (which may refer to the depictions in the above embodiments); and transmission of the promotion content BUY1 directly causes a user WECHAT1_N+1 to create an operation of "buying" the promoted house property with the total value of 1 million yuan. The entire "dissemination chain" of multi-tier recommendation is referred to "O2O_CHAIN'," where the first tier of referral WECHAT1_1 till the Nth tier of direct referral WECHAT1_N facilitating the deal done may share the 10000 yuan commission award set by the merchant.

Supposing that the appraisal rule selects Rule 1, which prescribes: the profit appraisal weight for dissemination in the "dissemination chain" employs "Fibonacci sequence (N=10)=1, 1, 2, 3, 5, 8, 13, 21, 34, 55, 89, N=10", as shown in the table below:

| | Sequence | | | | | | | | | |
|---|---|---|---|---|---|---|---|---|---|---|
| | 1 | 2 | 3 | 4 | 5 | 6 | 7 | 8 | 9 | 10 |
| Tier | 1 | 2 | 3 | 5 | 8 | 13 | 21 | 34 | 55 | 89 |
| Weight | 0.43% | 0.87% | 1.30% | 2.16% | 3.46% | 5.63% | 9.09% | 14.72% | 23.81% | 38.53% |

That is, different "weights" are granted to respective "tiers" according to (a sequence of) 10 (the weight in this example=a percentage derived from the number of the present tier divided by the total number of the sequence).

Particularly, WECHAT1_N who directly "facilitates the deal done" will be granted the "commission" of 38.53% referred to in the tenth tier; the commission is calculated as follows: if the final buyer WECHAT1_N+1 only has one "upstream referral", i.e., "WECHAT1_N," then WECHAT1_N obtains an award of 10000 (yuan)×100%× 38.53%=3853 (Yuan); the corresponding awards attributed to other tiers of referral on the "dissemination chain" may be deduced in a similar manner.

In another scenario, the content is recommended to the final buyer by a plurality of users under a certain motif, while recommended by a further plurality of users under another motif, which finally urges him to buy the recommended commodity. Then, all of these users act as "upstream referrals" for direct recommendation, sharing the rewards corresponding to the sequence 10 in the table above.

Figure 11:
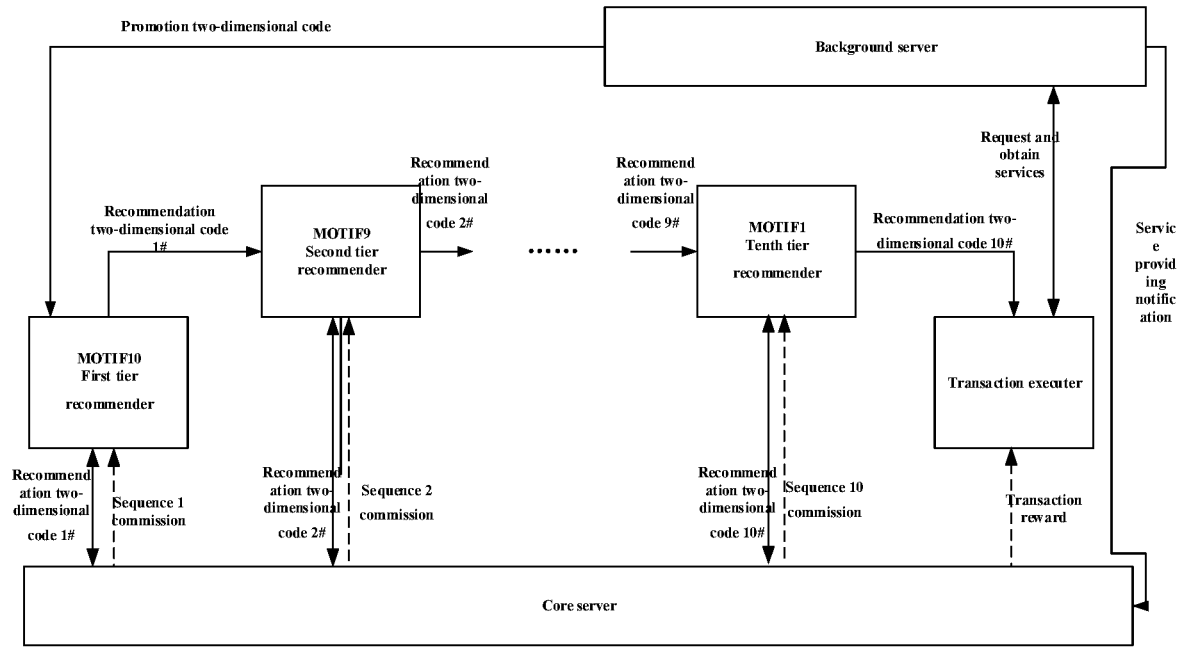
FIG. 11 is a structural schematic diagram of an information processing network based on uniform code issuing in an eighth embodiment of the present disclosure.

As shown in FIG. 11, for example, the "upstream referral" of the final buyer WECHAT1_N+1 may be defined as: the final buyer is recommended with three pieces of information being Recommendation 1 by three referrals MOTIF1 (i.e., WECHAT10), MTIF2, MOTIF3 under a same motif, then the three persons become "top three items closest to the final buyer arranged into a sequence according to time order for recommendations under a same theme." And the remaining 7 persons MOTIF4, MOTIF5, MOTIF10 who are recommended under a different motif, are also direct referrals of WECHAT_1+N, such that the 7 persons will constitute the "last 7 items of the sequence."

The forgoing MOTIF1, MOTIF2, . . . , MOTIF10 become 10 nodes, constituting awards assigned to a network (digital human being network identifier) of WECHAT_1+N VIPs closing the deal based on recommendation 1. The awards are assigned in such a manner: MOTIF1 (i.e., WECHAT1_10) is the first referral for recommending the content to the final buyer; therefore, he is awarded according to "the reward percentage is sequence 10 with the first weight 38.53%," namely, he is awarded to 10,000 yuan×100%×38.53% (reward percentage)×38.53% (weight percentage)=1484 yuan. MOTIF2 is the second referral for recommending the content to the final buyer; therefore, he is awarded according to "the reward percentage is sequence 10 with the second weight 23.81%," namely, he is awarded to 10,000 yuan× 100%×38.53% (reward percentage)×23.81% (weight percentage)=917.4 yuan. And so on, each "node" in the "digital human being network" for the deal may be awarded as calculated above.

Of course, other sequences may also be selected to calculate reward percentages or weight indexes according to actual application scenarios. In addition, the "first" referral in this example is ranked by time order, e.g., a referral whose recommendation time is closest to the buy time, or in alternative examples, he may also refer to the earliest referral; and in similar fashion, the ranks of the "second" and subsequent referrals may be derived. The present disclosure does not limit ranking the respective referrals based on other peculiar elements (e.g., distance, credits) or combination of peculiar elements (e.g., combination of distance and time) than time.

Relevant computation rules such as the specific weight indexes and reward percentages may be stipulated by a third party (e.g., merchants who specifically provide services or grant rewards), and sent by the internal server of the third party to the access server, the core server, or the background server of respective motif, available for respective parties to use when generating a two-dimensional code or calculating parameters such as the specific attribute values, appraisal indexes, award amount, etc. Or, in other examples, the rules above may also be set by the core server or the access server based on the requirements of the third party (merchant) and notified to other parties to record.

As to the rules involved in computing relevant weight indexes/reward percentages, or in computing other attribute values based on the weight indexes/reward percentages, respective parties (e.g., the core server, the access server, the background server of respective motif, etc.) may claim them from the rule stipulating party or recording party when performing the computations above. The internal server of the merchant or the background server/third-party server appointed by the merchant may refer to the descriptions in the various embodiments so as to close the deal through interaction with the mobile terminal of the final buyer.

The roles played by referral-related information in the entire "dissemination chain," particularly the referrals from different motifs, to the final closing of the deal, for example, may be known by tracing back the information of respective tiers of referrals in the recommendation two-dimensional code. In view that the recommendation two-dimensional code is unanimously generated by the core server or after the core server knows it, generated by a respective party under authorization by the core server, the core server may know the information of respective tiers of referrals, such that other parties (internal server of the merchant, access server, background server of respective motif, etc.) may query the core server for the information of the referrals when necessary. In different examples, the core server, the internal server of the merchant, the access server, and the background server of respective motif may calculate the specific appraisal index, award amount, and various other attribute values of a user; the attribute values independently calculated by respective parties may be recorded in the databases respectively established by the respective parties or may be used for calculating other parameters; or, the attribute values independently computed by respective parties may be notified to the core server to record in the attribute accounts of the users or notified to the core server to conduct a comprehensive computation, etc.

Further, besides recommending the contents generated or pushed by respective other servers, the personal users may also create digitalized contents, e.g., articles/music/cartoons/videos/games, etc., for example, generating a two-dimensional code corresponding to the digitalized content or its link address, so as to be disseminated to other users. As a service provider, the user may set corresponding use rules and/or award policies for promotion of that digitalized content: for example, the first 1000 users who obtain the digitalized content by identifying a dissemination two-dimensional information may be charged free, while starting from the 1001th user, each user will be charged 1 yuan for each use; to this end, the service provider performs recording and judging based on the time order of the requests sent thereto from the dissemination two-dimensional code receiving users for obtaining the digitalized content. For another example, a referral who disseminates and shares the digitalized content is granted a "whole-chain transaction commission reward mechanism" to set that different charging rules are available for different distribution amounts, and different awards are granted to successful disseminations or successful deals: supposing for each incrementation of one dissemination user on the promotion and dissemination chain, the award will be 0.1 yuan, and for each incrementation of one paying user, the award will be 0.2 yuan, etc.

The user creating the digitalized content notifies the core server of his originator conditions, use rules, and reward policies, for the core server to formulate corresponding rules needed in generating a dissemination two-dimensional code, and generating recommendation two-dimensional codes during respective stages of promotion procedure; based on the agreements, any party in the core server/background server of the social platform/third-party server storing the digitalized content, etc., grants the rewards to referrals based on the corresponding policies above. In view that the dissemination two-dimensional code and recommendation two-dimensional code are all uniformly generated by the core server or a party authorized thereby based on the set coding rules, user information of the originator and respective tiers of referrals may be included therein, and the information of users who request the service provider for the digitalized contents by identifying respective two-dimensional codes may also be known, thereby achieving a traceability of the user information in the entire dissemination chain, so as to grant rewards to referrals, charge users, and protect the benefits and rights of the originator.

Embodiment 9

Figure 12:
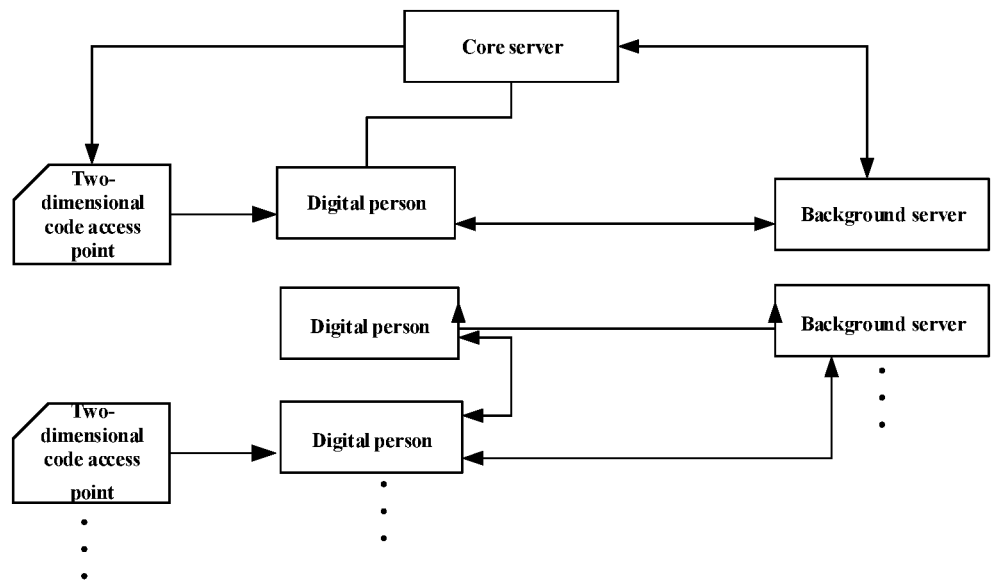
FIG. 12 is a structural schematic diagram of an information processing network based on uniform code issuing in a ninth embodiment of the present disclosure.

This embodiment relates to a digital human being, a digital human being network constructed based thereupon, and a communication method, as shown in FIG. 12.

The "digital human being" defined in the present disclosure is superimposed or attached to an entity person, which may be understood as an integration of a person in the real world with a device that is equipped to the person and enables digitalized sensing access. The digitalized sensing accessed device imparts digitalized properties to the entity person, to make the digital human being become a node in a network. The mobile terminal/client/wearable device and the like of the user described in various embodiments and their varied embodiments of the present disclosure are a kind of digitalized sensing accessed device; operations performed by a user with the corresponding device or the interactive operations between the user and respective parties, as described in various embodiments and their varied embodiments of the present disclosure may be regarded as acts of a digital human being.

The digital human being has any one or any combination of the following behavior patterns: the digital human being may understand, by identifying one or some coding mediums (e.g., any one kind of two-dimensional codes or corresponding hyperlink as mentioned above, and other forms of coding mediums will also be described in subsequent embodiments), the content corresponding to coded information in the coding medium or an approach of accessing the corresponding content (the content, for example, may be a notification message, a digitalized product, a predefined operation process, a condition policy, an operation instruction, etc., and the accessing approach may refer to being redirected to the webpage, link address, identification information or the like of a content providing agency), access the corresponding information network defined in the coded information, and communicate with a server of a specified agency defined in the coded information (for information interaction, transaction execution, service access, etc.).

The digital human being has an identifiable digital human being symbol: in different examples, the digital human being symbol may be device information and/or user identity information; the user identity information may be bound to the device information; the digital human being symbol may be unique within a specific range. Any behavioral operation executed by the digital human being may be identified and recorded by an authorized agency based on the identifiable digital human being. The agency identifying or recording the digital human being information may, for example, select different digital human beings based on the identified digital human being information, and open different matching operation rights to corresponding digital human beings, execute different matching operation processes when interacting with the digital human beings, provide different matching services, and perform attribute recording and value adjustment with respect to the conditions of executing operations conforming to predefinitions, etc. The digital human being, when interacting with a corresponding agency, provides its own digital human being symbol thereto, for the counterpart to identify and verify.

The act of digital human being is closely associated with the real physical world. When interacting with a corresponding agency, the digital human being may provide some peculiar elements or a combination of elements (time, location, identify, behavior, etc.) available for the counterpart to identify the real physical world scene where it is located; then, the corresponding agency may identify the peculiar elements and compare them with the elements predefined in the rule policy, the comparison result acting as one of the grounds for selecting/opening corresponding rights to/providing matching services to/executing corresponding operations for/adjusting corresponding values of the digital human being.

One of the acts of the digital human being may be sharing and disseminating content to the outside. The shared content may be information obtained thereby from the coding medium, which is allowed to be superimposed with the symbol of the digital human being and/or information content newly added by the digital human being according to needs. By identifying the symbol therein, the corresponding agency identifies/records/adjusts the attributes thereof regarding the sharing operation. The digital human being may release the shared content to the outside in a recommendation two-dimensional code form, so as to perform multiple times of recommendation, multiple tiers of recommendation, etc., among a plurality of digital human beings. The recommendation two-dimensional code or any other two-dimensional code is all generated by a uniform code issuing agency within a region or generated by an agency authorized by the uniform code issuing agency; the uniform code issuance enables, for example, an effective tracing of the dissemination path of the shared content after multiple times/multiple tiers of recommendations, so as to identify contribution degrees of respective parties (e.g., the recommended party finally strikes a deal) and compute an attribute value matching thereto).

An act of the digital human being may also be conducting the SNS search or releasing the content for SNS search as mentioned above, and/or performing SNS help seeking or replying to other persons' SNS help seeking topic, and allowing setting of corresponding filter conditions or disclosure rights, etc. The digital human being logs on one or more social networks, based on its corresponding ID information, to perform acts such as forwarding the recommendation/SNS search/SNS help seeking, etc.; the ID information of the digital human being may be a symbol it has for the agency identifying the symbol to perform corresponding appraisals (recording and adjusting the attribute values, etc.).

To appraise the attribute value of the digital human being, different weight indexes may be assigned, according to the predefined rule, to different motifs (different social networks, different operations, different peculiar elements, recommendation levels, etc.) when the digital human being is conducting a corresponding act, so as to compute the corresponding attribute values. Some attribute values (appraisal index, peculiar elements, etc.) act as the basis for adjusting other attributes (credits, capital amount, etc.); some attribute values (appraisal index, peculiar elements, etc.) are available for query by other digital human beings or other agencies when necessary; some attribute values may be circulated and transferred (e.g., capital amount) between the accounts of digital human beings or between the accounts of a digital human being and other agencies); these have specific depictions in various embodiments of the present disclosure.

The digital human being uses a digitalized sensing access-enabled device to identify a coding medium, which may simplify the operations needed to access the interactive network defined thereby to obtain information/service, or provide services to other persons (e.g., recommending, releasing information to the SNS search, replying to an SNS help seeking motif, etc.). Based on the coding rule and the matching decoding rule uniform to respective parties, the interaction implemented between the respective parties and a digital human being (particularly the digital human being being registered with the respective party) is a closed-loop transaction (which is not limited to commodity transaction), such that other parties without the uniform rule can hardly hack into the closed-loop transaction process, which thus may effectively guarantee information security. Further, the digital human being's device may simplify corresponding operations by judging and automatically installing a client software with the corresponding rule.

A "command" triggered by a system (the digital human being device and corresponding devices of respective interacting parties) that may execute a closed-loop transaction command is compiled according to a coding rule specific to "the system," which also generates a coding medium such as a two-dimensional code; for example, it may be required that the digital human being have to be a registered user of the mobile phone APP and the background system, and it may execute a "closed transaction" only as a "member" of the "background system." In this example, the two-dimensional code may not only encode the URL address, but also may be encoded, for example, as O2OBUY12345 (the execution command with a symbol of 02OBUY server is 02OBUY12345).

Understanding of the physical world peculiar elements when the digital human being is accessed to the interactive network facilitates the digital human being to determine the grid space where it is located in the real world (the grid space represents a set of various properties in the physical world, e.g., region, organization, product group, sales channel, sales representative, reward policy, activity scope, etc.). Whether the digital human being may access the released information (e.g., in the form of coding medium) is dependent on whether the specific grid space under the real world environment of the releaser's interest, where the digital human being is located, matches a dissemination policy stipulated by the information releasing party, e.g., a specific location, a specific time point, a specific friend circle, a specific webpage browsing, an audience of a specific TV program, etc. In this way, the real economy creates more "value access points" in the "O2O e-commerce era," such that by imparting real world properties to the act of digital human being, an enterprise may perform a quantified evaluation on the investment and outcome of the "O2O full channel" for the overall advertisement placement based on the dissemination attribute and effect of the "grid space of physical world."

It needs to be noted that the "O2O" mentioned herein refers to Offline to Online, rather than traditionally Online to Offline. That is, the physical world belongs to an Offline world, for example, but not limited to: store, computer page, mobile terminal screen, and various other places visible to naked eyes. The sensing access capability of the digital human being device refers to a function of "the sensing device accesses by sensing," such as two-dimensional code scanning, and a function of accessing to an ad-hoc network through radio sensing such as ZIGBEE/IBEACON to interact with the server of other agency or other digital human being.

By identifying the digital human being symbol, the act of the digital human being may be identified/recorded/appraised/awarded by a corresponding agency, and by further combination with relevant physical world peculiar elements upon executing of the operation, a unique appraisal award or service may be obtained. Therefore, the digital human being will have an incentive to try its best to conduct an act meeting a predetermined appraisal policy so as to achieve a higher appraisal award (e.g., increasing the attribute value), e.g., sharing and disseminating in a social network to help other digital human beings to obtain information/services; and a commission award with a corresponding weight will be obtained based on its recommendation level to thereby achieve profit sharing. If mass digital human beings would like to disseminate and share contents, a benign circulation of "ready to help, all for one" will be formed.

Content sharing and disseminating conducted with digital human being IDs under different motifs in the social network is an effective extension implemented by a digital human being over an interactive network identifying the coding medium access, while by superimposing the digital human being symbol in the shared information, it would be convenient for the original information releaser or various other parties to trace each node (i.e., each sharing digital human being) on the content dissemination and sharing chain throughout the whole process. By generating the recommendation two-dimensional code by a uniform code issuing agency or a party authorized thereby, there provides an effective means of conveniently superimposing information such as digital human being symbol and facilitating the respective parties to obtain the digital human being symbol by identifying the recommendation two-dimensional code.

The present disclosure provides a digital human being network, which initiates an access point for services (e.g., commodities, rules, policies, operation flows, etc.) predefined by an initial agency (which may be an enterprise or an individual person), while the digital human being and the digital human being acts participate in its construction process. The initial agency encodes various contents defined thereby, presents then in various encoding medium forms such as two-dimensional codes, and releases the coding mediums to the real world. The coding medium is generated by a uniform code issuing agency or its authorized party, which may guarantee that the coding medium is generated based on a uniform coding rule (corresponding to the predefined content); and only the digital human being identifying the coding medium based on the matching decoding rule may trigger a signal of urging the digital human being and its respective interacting parties to execute a defined operation flow.

The real world is divided, by the digital human being network, into individual "O2O grid spaces," which become individual access points enabling the digital human being to access the digital human being network to obtain services or provide services; the physical world peculiar elements involved when the digital human being accesses provide an effective means of facilitating respective interacting parties (e.g., service providers) to understand the nature of the O2O grid space to which the digital human being belongs. Moreover, the access points formed by matching coding mediums distributed in different O2O grid spaces impart a "full channel O2O" digitalized access capability to the real world. Therefore, the real economy which is not covered by the Internet is also covered; meanwhile, a full-channel coverage, for the enterprise, of "Internet (channel 1)+real economy (channel 2)" may be achieved when presenting the coding medium such as the two-dimensional code on the Internet webpage; compared with the "additional hardware connection for the IoT," the present disclosure enables access only by identifying the coding medium, such that no additional hardware layout is needed except the sensing access device (the device has a universal applicability); in this way, wider applications may be obtained.

The full-channel O2O access points are spread in various scenes of the ambient world, and various SNS recommendations and SNS searches are existent anytime and anywhere. The reason why a digital human being may see a certain "e-commerce information" is that it belongs to a circle of "digital human being network based on a certain motif," and the information is only obtained through accessing/recommending/sharing from a full-channel traceable mechanism of the real world; after identifying the corresponding coding medium, the digital human being may know who recommends it thereto, what kind of social appraisal index is involved, and "a mechanism regarding what kind of sharing benefits the digital human being act will obtain"; on this base, the digital human being will take "what kind of digital human being act" to access the network or construct its own digital human being network.

Different from the existing Internet-centralized and information-based manners, the digital human being network of the present disclosure is an ad-hoc network hierarchy that is decentralized, closed-loop transaction-based, and centered about respective digital human being per se. In contrast to the Internet search which relies on a computer/browser, the SNS search and SNS help seeking and the like in the present disclosure is based on O2O access, and what is found is not a cold webpage, but "a service that may help you" and "a person that may help based on the digital human being social network."

With the digitalized sensing access device, each digital human being, who is bound with a digital human being symbol, has a digital attribute superimposed on a flesh attribute of the real world, which corresponds to accessing the real person to the IoT (Internet of Things). The digital human being may be searched with its digital human being symbol to thus become a part of mass data of the entire "digital human being network." any digital human being may not only act as an information content receiving node (receiving services), but also may act as a sending node to create a "social influence" and obtain a value by releasing contents to others (providing services, not limited to recommending and sharing information). A mechanism for recording the acts executed by the digital human being network for the digital human being and evaluate whether the digital human being act complies a predefinition so as to quantize the appraisal (e.g., computing the appraisal index of the shared content and grant corresponding rewards based on a uniform appraisal standard, etc.).

Each act of the digital human being is an act of "closed-loop transaction bearing a LOGIN ID and executing a background-specific function." That is, "a digital human being" may "implement the closed-loop transaction based on the function defined by the background through a LOGIN-ID," such that each "act" (including focus/click/disseminate/share/act, etc.) is superimposed with its own ID (DNA) and then passed to the background for recording, such that whole-process tracking may be realized; besides, it may also achieve "P4P (Pay for Performance) mode" and "work more, earn more"; various social network-based behavioral modes such as the "QR scan," "Moment share," and "SNS searchable" which may leave traces that may be recorded, queried, and appraised in the social network are significantly different from the information-based Internet mode.

That is, each digital human being may construct a digital human being network centered about "self" based on different "motifs, social statuses (appraisal indexes), open attitudes (shared to whom, who may see), and reward policies," etc. Each digital human being may be provided with a plurality of digital human being IDs that have multiple dimensions and are uniquely identified within different circle scopes, thereby having digitalized characteristics having a plurality of personal attributes; digitalized access and dissemination are enabled based on each digital human being ID, and the acts executed may be tracked and appraised, respectively, thereby implementing a social network constructed based on multi-motif matrix, a social reputation index (or social status)-based matrix (for dissemination path and influential power), and an open attitude matrix. The social reputation index refers to a "quantized appraisal index" within a certain time period based on a plurality of "closed-loop transaction" acts of the digital human being, which not only has an influential power to other digital human beings during the dissemination process, but also may act as a weight index for "Pay for Performance."

The following are some examples of digital human being network access points: offline, various kinds of two-dimensional codes are spread as access points in a shopping mall, which, after being identified, may implement "shoot to buy, prompt transaction"; they may also be join points and experience exhibition points of the "digital human being network"; "shopping mall service two-dimensional codes" are spread around the shopping mall, which become join points of the "digital human being network"; the shopping assistants or their relatives and friends become core recommenders of the "digital human being network," and the accessories with the service two-dimensional code they wear may act as the "access points of the digital human being network"; various kinds of real world scenes that may exhibit the offline access points of the "two-dimensional code" enable a statistical analysis of the dissemination effects of various kinds of passing population according to "O2O scene setting parameters," and "the access points" may also become "a mode for transaction commissions." Online, the "service access two-dimensional code" may be exhibited through various kinds of webpages, becoming access points of the "digital human being network." A webpage including the access two-dimensional code may also become a common Internet search object as well as an SNS search object.

It is seen that different from the traditional advertisement/market/marketing/planning, including the enterprises earning their revenues from TV stations/audience rating/market survey, the present disclosure implements a revolutionary "brand-new business model" based on the digital human being network; because the enterprises may arrange the "digital human being network" access points (e.g., a full-channel O2O two-dimensional code) at places where potential target client groups gather, the preferences and behavior patterns of "each individual" may be understood from the perspective of full samples, thereby improving formulation of the enterprise's marketing policies; while the "traditional advertising fee" is instead paid to each contributing party in the "full-process of dissemination," including the "releasing source," "propagation individual," and "management platform." Based on the construction of O2O full-channel marketing system, it is obtained "channel=beneficial rights from scene access"; the initial construction comes from the digital human being network of the enterprise owner; while the sustainable operation comes from "each digital human being that may conduct all-people marketing." For example, each employee of the company may promote the two-dimensional code corresponding to the commodity information to friends and relatives. By constructing the "digital human being network server," a plurality of O2O scenes may be correspondingly managed with one server website, which is applicable to a multi-ID multi-O2O scene comprehensive weight appraisal mechanism. The server may compute the rebate for each employee based on the corresponding channel, sales organization, sales representative, sales price, rebate percentage, etc., and making statistics and parsing the sales conditions of respective channels.

Based on MatrixLink protocol, accessing with O2O and O2O two-dimensional code, the MatrixLink protocol is downwardly compatible and in replacement of the Http protocol. Similar to the principle that the http protocol is an Internet basic protocol, WWW is an application system with the Internet as a transmission medium, and the basic transmission unit on the WWW network is the Web page, MatrixLink is also a basic protocol of MatrixLink network (digital human being network). Its working principle and mechanism is also based on a mobile client/server computation model, comprising a sensing access device such as an NFC chip (identification NFC reader) of the mobile terminal, a camera, and an identification software unit (which may be preset in the mobile terminal, or installed layer), implementing a similar mechanism formed by Web browser (client) and Web server (server); the communication between the mobile client/server may also adopt a similar HTTTP protocol (but including the MatrixLink coding rule). The MatrixLink protocol is also a protocol based on TCP/IP protocol, which is an application layer protocol between the mobile terminal and the Web server, which may be a universal or customized protocol including traffic logic, encryption rule, and operation execution procedure.

The working principle of the MatrixLink protocol includes:

(1) Connection: similar to clicking .com in the Web browser to establish a connection with the Web server, MatrixLink connection is also a connection to the background server by identification with a mobile terminal that scans a two-dimensional code and/or aligns with an image code (the image code is displayed on a screen, identified by a mobile terminal camera shooting module based on the bright spot UV line differences on the screen, not an image identified by human eyes).

(2) Request: similar to submitting a request to a Web server in a Web browser through a socket. MatrixLink request generally further comprises, besides establishing a connection, the server is directed to parameters related to a predefined service operation logic.

(3) Response: similar to transferring the http protocol to the Web server after submitting the request to the Web browser, after the Web server receives submission of the MatrixLink protocol from the mobile client, it performs transaction processing according to a predefined rule; the processing result is further transmitted back to the client through the MatrixLink protocol, such that the client software that may parse the predefined coding rule may be started at the mobile client, displaying the requested page and executing according to a predefined processing flow, or only executing the predefined flow, thereby implementing a predefined closed-loop transaction processing.

Therefore, with the MatrixLink protocol, a network connecting people to things and people to people may be constructed through the personal mobile terminal, referred to as a MatrixLink network. All contents and services of the Internet may become "a subset mainly including display under the protocol."

Basic compositions of the Internet include a plurality of interconnected background servers that uniformly defining the access mode and record a plurality of acts; O2O access points (i.e., full-channel node arrangement of two-dimensional code), and digital human beings each having any kind of sensing access device, which become receiving and sending nodes of the network in a manner similar to radio sensing ad-hoc network, so as to extend interaction with other digital human beings (e.g., based on the manner of login a social network with a digital human being ID). Any coding medium such as the two-dimensional code involved in the digital human being network is generated by the core server. Various other third-party servers such as the access server, platform server, etc., may be configured as needed with reference to various embodiments of the present disclosure.

To implement various embodiments of the present disclosure, the digitalized sensing access device equipped to the digital human being, for example, a mobile terminal such as a smart phone, a personal digital assistant (PDA), or a tablet computer, is required to be able to be bound with a digital human being symbol (which may be unique within a certain scope, and may be bound permanently or temporarily) and have functions of identifying coding mediums and networking communication; which also be any kind of client device having similar functions. Connection between the mobile terminal and a serer of one or more background agency and connection between servers of a plurality of background agencies may be made over a wireless network or a wired network. The wireless network may be a GPRS network, a 3G network, a 4G network, a Wi-Fi network, and a Bluetooth network, etc., a network that enables communication between the mobile terminal and the background server anytime where there are network signals.

Figure 13:
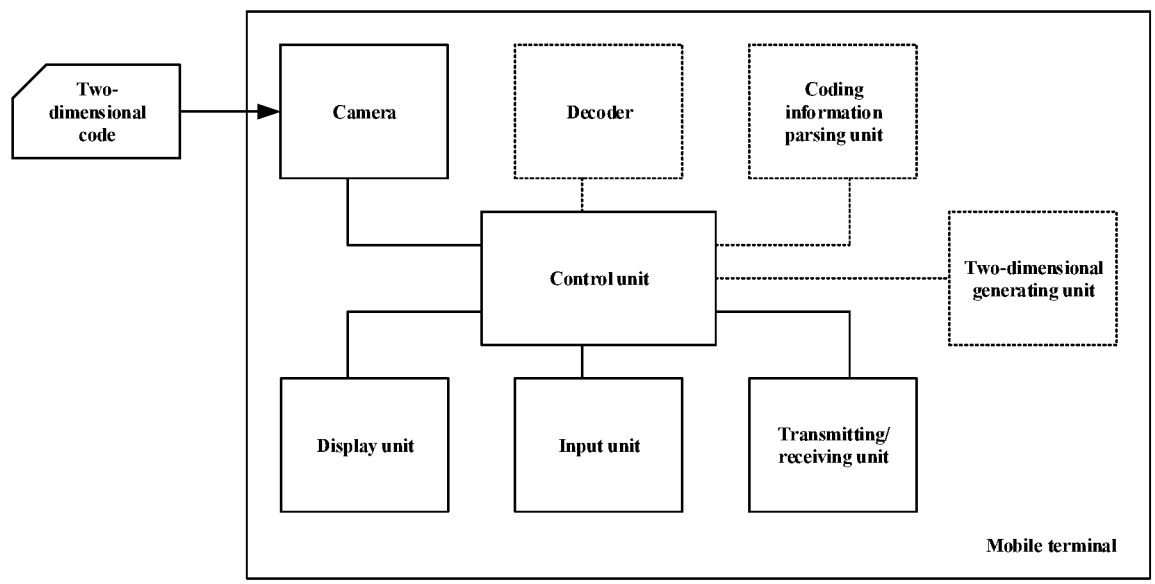
FIG. 13 is a schematic diagram of an exemplary structure of a mobile terminal in the information processing network based on uniform code issuing in the ninth embodiment of the present disclosure.

With an example of an identified coding medium being a two-dimensional code, as shown in FIG. 13, a mobile terminal in a preferred embodiment comprises the following modules: a control unit configured for generating signals of controlling respective other units and for controlling the respective other units to implement their own functions; a camera for shooting the two-dimensional code; wherein any camera with 0.3 megapixel or above may clearly shoot the two-dimensional code; a decoder configured for decoding the shot two-dimensional code to obtain coded information; a coded information parsing unit configured for parsing the coded information to determine whether the two-dimensional code is generated according to a preset coding rule; a transmitting/receiving unit configured for, if the two-dimensional code is generated based on the preset coding rule, interacting with the background server or a core server or other digital human being with respect to information to receive a service or provide a service, etc.; an input unit configured for inputting various input information involved in an interaction process; and a display unit configured for displaying contents resulting from identifying the two-dimensional code or various information that needs to be displayed during the interaction process with respective parties such as the background server.

Figure 14:
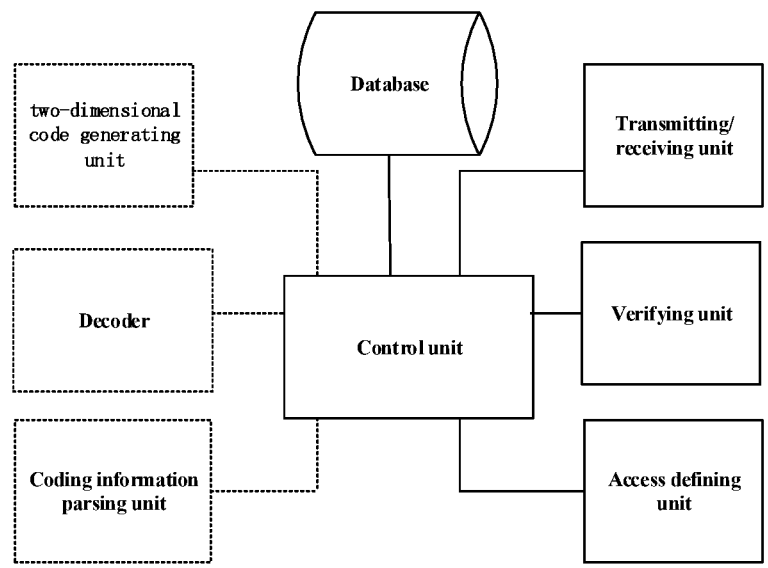
FIG. 14 is a schematic diagram of an exemplary structure of a background server in the ninth embodiment of the present disclosure.

The background server in a specific example, as shown in FIG. 14, comprises: a control unit configured for generating signals of controlling respective other units and for controlling the respective other units to implement their own functions; and a sending/receiving unit configured for interacting with a digital human being device such as a mobile terminal or an agency such as a core server; wherein the background server may be provided with an access defining unit for defining an access rule as a basis for the digital human being to access the digital human being network, e.g., defining information such as an operation procedure that needs to be executed by a digital human being or a server of other agency, a commission award policy, etc. The background server is provided with a built-in or external database that stores various information data during the interaction process and supports invoking at any time.

The core server in a specific example comprises: a control unit configured for generating signals of controlling respective other units and for controlling the respective other units to implement their own functions; a sending/receiving unit configured for interacting with a digital human being device such as a mobile terminal or an agency such as a background server; a coded information generating unit configured for generating a corresponding coding rule and generating corresponding coded information, based on various information such as a service provided by the background, and an access rule defined by the background server; and a two-dimensional generating unit configured for generating a two-dimensional code corresponding to the coded information.

In some different examples, the mobile terminal per se may not be provided with the aforementioned decoder and/or coded information parsing unit, but sends the shot two-dimensional code to a background server that has a decoder and a coded information parsing unit, such that the background server, after identifying the information included in the two-dimensional code, sends it back to the mobile terminal.

If the mobile terminal is required to execute a closed-loop transaction with respective interacting parties (i.e., commands needed for executing the operation procedure are corresponding to the coded information in the two-dimensional code), the mobile terminal needs to send registration information to the background server via the sending/receiving unit, and after a successful registration, receives a registration success message from the background server. If the two-dimensional code is generated based on the preset coding rule, the sending/transmitting unit of the mobile terminal is also configured for sending a service providing request message to the background server and receiving a service from the background server; if the two-dimensional code is not generated based on the preset coding rule, the sending/receiving unit is further configured for sending a webpage requesting message to a certain network browser and receiving a webpage corresponding to the coded information from the web browser, or outputting an error alert on the display unit.

The mobile terminal may also obtain the client software needed for executing the set operation procedure by downloading, memory card or other ways, and after completion of the installation, the mobile terminal communicates with the background server through the client software. The background server further comprises a client software monitoring unit configured for monitoring whether the mobile terminal is installed with a client software matching the coding rule of the two-dimensional code, and a client software installing unit configured for automatically providing download and installation of the client software for the mobile terminal when it is monitored that the mobile terminal is not installed with the client software.

The core server may authorize a mobile terminal or a background server having a two-dimensional code generating unit to autonomously generate a two-dimensional code (not limited to a recommendation two-dimensional code) based on a uniform coding rule. The coding rule is uniformly generated by the core server and sent to a mobile terminal or background server with rights. To execute a closed-loop transaction, respective parties involved in the interactive procedure has a uniform coding rule and decoding rule. Two-dimensional codes such as a transaction two-dimensional code, a content promotion two-dimensional code, and a recommendation two-dimensional code, etc., provide instructions for executing different acts after being identified dependent on different access rules defined in the coding rule based on which the two-dimensional codes are generated.

Figure 15:
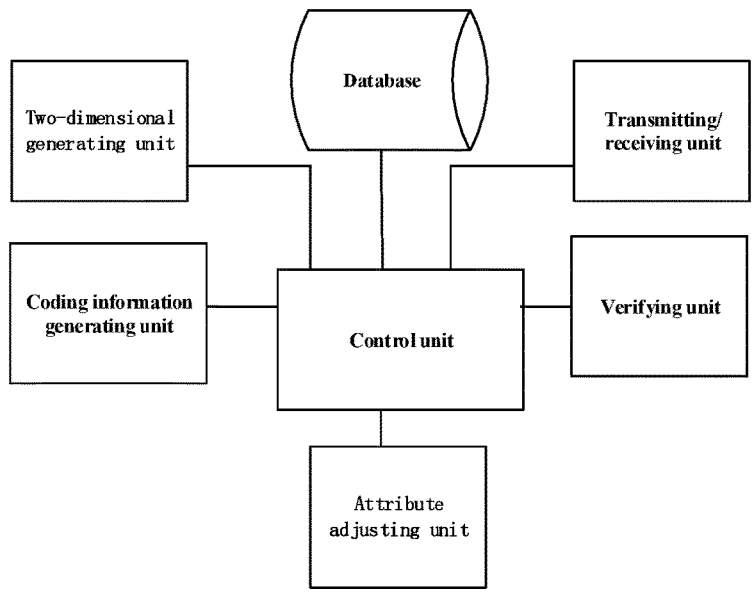
FIG. 15 is a schematic diagram of an exemplary structure of a core server in the ninth embodiment of the present disclosure.

Jointly referring to FIG. 14 and FIG. 15, a background server provided with a verifying unit may identify a digital human being symbol and executed operations when interacting with respective parties such as the digital human being, and compare the identified information with the predefined rules, so as to provide matching services to the digital human being. The background server may send the identified digital human being symbol information and the act executed by the digital human being in compliance with the preset rule to the core server via the sending/receiving unit to notify. The core server is provided with an attribute adjusting unit to perform recording and value adjustment with respect to various attributes under the account of the digital human being or background agency stored in a built-in or external database, to implement such as award granting, transferring of digital coin quota, etc. The core server may also be provided with a similar verifying unit to identify and verify the corresponding symbol and operation of the digital human being or background server. The background server may also perform recording and value adjustment with respect to the attributes of the digital human being accessing to the digital human being network initiated thereby in the corresponding database.

The mobile terminal may also provide a corresponding acquiring unit to obtain physical world peculiar elements of the corresponding scene based on the requirements defined in the two-dimensional code and provide them to the background server or the core server when interacting. Then, the verifying unit of the background serve or core server may identify the physical world peculiar elements of the digital human being and compare them with the predetermined policy rule, as one basis for operations such as attribute adjustment. Corresponding unit modules may be configured for the mobile terminal, background server, and core server based on the functions described in respective embodiments of the present disclosure.

Embodiment 10

Figure 16:
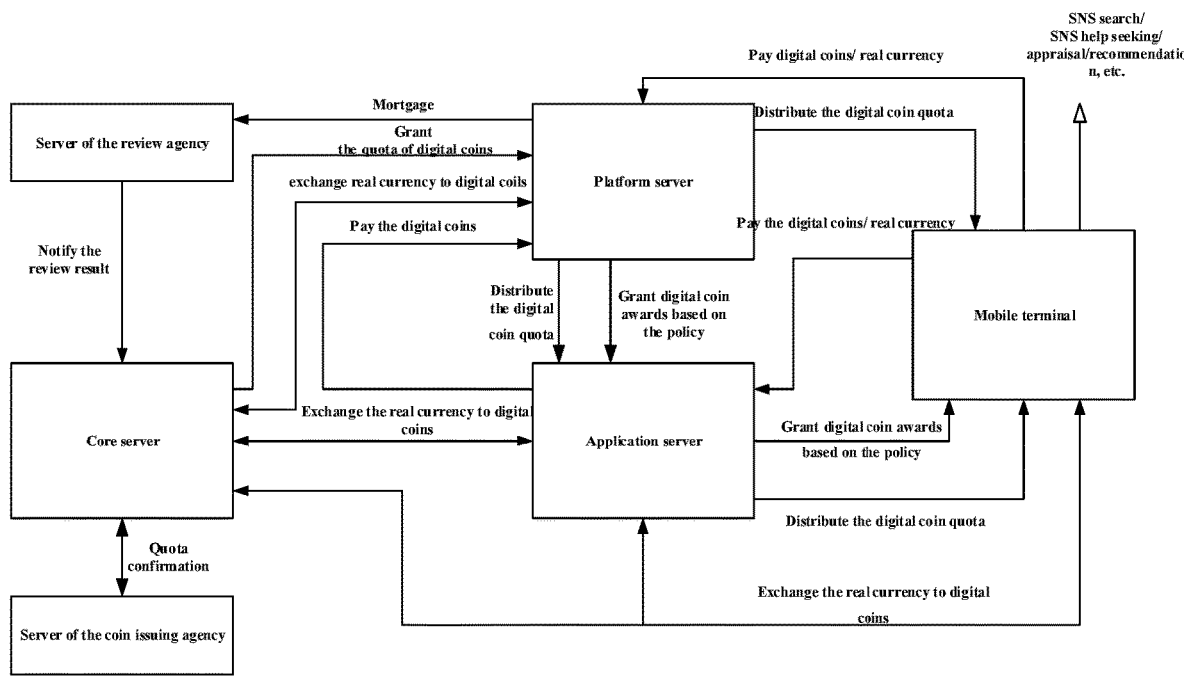
FIG. 16 is a structural schematic diagram of an information processing network based on uniform code issuing in a tenth embodiment of the present disclosure.

This embodiment provides an example of an information processing method based on uniform code issuance to implement promotion of a food center. As shown in FIG. 16, the method mainly involves a core server and a third-party appointed thereby (in charge of preparing coding rule for a two-dimensional code, uniform generation of a two-dimensional code, review of granting digital coin quota, and granting the quota), a platform server (acting as a first background server for providing services relative to a user or an application server, in charge of inviting investments from merchants, promotion of commercial ads, facilitating an electronic trade, and management relevant transaction procedures), one or more application servers (acting as a user relative to the platform server, while acting as a second background server for providing services relative to a consumer terminal, in charge of applying for an account, applying for being an administrator, editing promotion content, releasing and disseminating, striking a deal, generating a payment collecting two-dimensional code, presenting or releasing the payment collecting two-dimensional code, etc.), a consumer's client or mobile terminal (which may act as a user of the first background server and/or the second background server, interacting with respective other parties through identifying a two-dimensional access, obtaining a service after executing the set operation procedure, and obtaining an award by sharing to others); the interacting process between relevant providing parties and the user may refer to the embodiments above.

(1) setting a corresponding platform server for the food center; a corresponding capital account is set at the core server or a third-party server appointed thereby to record shares of the digital currency of the food city, as well as use and change conditions of the digital currency. The food center may obtain a use quota of digital currency through any one or any combination of the following ways:

1) with tangible or intangible assets (e.g., real estate, intellectual properties, etc.) as mortgages, issuing a request to the core server or a review agency appointed thereby, and obtaining corresponding digital currency after passing the review.

For example, the platform server of a food center issues a request of "mortgaging with the real estates of the food center for obtaining digital currency"; the core server, upon being notified from the core server or the platform server, assesses the values of the mortgaged real estates, and the core server determines, based on the assessment, that a digital current of for example 2 billion yuan may be granted to the platform server, and then the corresponding digital currency is transferred into the capital account of the platform server.

2) paying real currency to the core server or a third-party agency appointed thereby to exchange a share of digital currency, and directly charging it to the capital account corresponding to the present platform.

For example, the food center sends a request for exchanging digital currency to a server of an appointed bank and pays corresponding RMB currency; the server of the bank confirms, based on a preset exchange ratio, that a digital currency of for example 2 billion yuan may be exchanged; the server of the bank issues a notification that the corresponding RMB currency has been received or issues a notification that a corresponding digital currency may be exchanged; and the core server transfers the corresponding digital current into the capital account of the platform server according to the notification.

Particularly, the exchange ratio is set by the core server or other appointed agency; usually, the exchange will be made after the platform confirms. The digital currency may be exchanged back to the real currency according to a same or a different exchange ratio.

3) obtaining the digital currency paid by the application server or the user terminal to the platform server, the corresponding share being transferred into the capital account of the platform server from the capital account of the application server or the user terminal. After receiving the corresponding digital currency, the platform usually needs to provide a service or commodity of an equivalent value to the application server or the user terminal, wherein relevant operations involved during this period may refer to the depictions in the aforementioned embodiments.

(2) respective merchants stationed in the food center are respectively provided with a corresponding application server. (1) setting a corresponding capital account at the core server or the platform server or other third-party server appointed to record shares of the digital currency of respective merchants as well as use and change conditions of the digital currency. The merchants may obtain digital currency through any one or any combination of the following ways:

1) paying real currency to exchange for digital currency;

For example, the application server sends a request to the core server (or a platform server or an appointed third-party agency) and pays the real currency to exchange for the digital currency; the obtained digital currency is directly changed in the capital account corresponding to the present merchant. The exchange ratio is set by the core server or the platform server or the third-party agency; usually, the exchange will be made after the application server confirms.

2) executing various operations conforming to digital currency award rules to obtain the awarded digital currency;

The merchant performs operations of forwarding and recommending the two-dimensional code or other forms of promotion contents released by respective agencies such as the platform server or other application servers to obtain the digital currency awarded by the corresponding agency. For example, the application server may release a recommendation two-dimensional code to obtain the award of corresponding digital currency calculated based on a weight index (the operations involved may refer to the depictions in the foregoing embodiments). The agency granting the award notifies the core server to transfer a digital currency corresponding to the award into the merchant's corresponding capital account.

3) purchasing, with the real currency or the digital currency, a share of digital currency distributed by the platform server, wherein the purchased share is transferred from the platform's capital account into the merchant's capital account. Specific interactive operations needed when the merchant buys the share may refer to corresponding operations of buying commodities in the foregoing embodiments.

4) obtaining the digital currency paid by the user terminal to the application server, which is transferred from the capital account of the user terminal into the merchant's capital account; after receiving the corresponding digital currency, the application server usually needs to provide a service or commodity of an equivalent value to the user terminal; the corresponding interactive operations may also refer to the depictions in the foregoing embodiments.

(3) the consumer is provided with a corresponding capital account at the core server (or the platform server or the application server or other third-party server appointed) to record shares of the digital currency of the consumer as well as use and change conditions of the shares. The consumer may obtain digital currency through any one or any combination of the following ways:

1) paying real current to exchange for digital currency, and directly charging the digital currency into the capital account of the user.

For example, the client or mobile terminal of the consumer sends a request to the core server (or the platform server or the application server or an appointed third-party agency) and pays the real currency to exchange for the digital currency; the obtained digital currency is directly changed in the capital account corresponding to the consumer. The exchange ratio is set by the core server or the platform server or the third-party agency; usually, the exchange will be made after the consumer confirms.

2) purchasing, with a real currency or a digital currency, the digital currency share distributed by the food center, or purchasing a share of digital currency redistributed by the merchant, wherein the corresponding share is transferred into the consumer's capital account from the capital account of the food center platform or the merchant. The specific interactive operations of the consumer with the platform server or application server via the client or mobile terminal or the like when buying the shares may refer to various foregoing embodiments of buying a commodity.

3) executing various operations conforming to digital currency award rules to obtain the awarded digital currency.

For example, the consumer performs operations of posting and recommending the two-dimensional code or other forms of promotion contents released by the application server (or the platform server or various other agencies) to obtain the digital currency awarded by the corresponding server or agency. For example, obtaining an award with a corresponding digital calculated based on a weight index by performing operations of posting the recommendation two-dimensional code via a client or a mobile terminal (the operations involved may refer to the depictions in the foregoing embodiments). The server or agency granting the award notifies the core server to transfer the awarded digital currency into the consumer's corresponding capital account.

In a specific example, respective merchants obtain, by paying rents to the food center, a service of use rights of the place within a set period to become a stationing merchant of the food center, following use and settlement rules of the digital currency. Based on an agreement between the food center platform and the merchant, the rent may be paid in real currency or digital currency, which, for example, is implemented by various payment manners described in the foregoing embodiments.

Respective merchants may formulate an advertising policy and set award rules in form of digital currency or other form so as to define the value for awarding respective circulation nodes. Codes corresponding to the contents such as promotion content and award rules are included in the promotion two-dimensional code released by the merchant; the merchant releases the promotion two-dimensional code. The promotion two-dimensional code is generated by the core server or a party authorized thereby.

With the mobile terminal, the consumer identifies the promotion two-dimensional code or the recommendation two-dimensional code posted by other users to him, or receives a link to a promotion content released by the merchant or other user thereto, such that the consumer views the corresponding promotion content to access a digital currency use ecologic system. The consumer obtains a digital currency award corresponding to the transaction by disseminating and forwarding the merchant's promotion two-dimensional code or by generating, on that basis, a recommendation two-dimensional code superimposed with the consumer information according to the award rules set by the merchant.

The consumer's digital currency may be directly circulated and used among respective merchants of the food center. The consumer may consume by paying digital currency to the merchant's application server or the food center's platform server to obtain a service or a commodity. To this end, the merchant's application server or platform server may request the core server or its authorized party to generate a payment collecting two-dimensional code based on payable amount, including coded information of the corresponding payment collecting account information.

For example, the consumer installs a specific client software (e.g., WeChat payment, etc., in replacement of a bank card) in the mobile terminal, such that he may identify, on site or remotely, the payment collecting two-dimensional code (to replace a POS machine) released by the merchant according to a decoding rule corresponding to the preset coding rule, so as to pay corresponding fees to the merchant; the core server or other third-party agency recording the consumer digital currency account performs an operation of transferring the digital currency to the merchant's account, and sends the settlement information to the consumer and the merchant. After receiving the settlement information, the merchant provides services or commodities to the consumer.

Besides, the consumer's capital account may also be implemented in the form of a registered or unregistered prepaid card such as a shopping card. The consumer obtains the prepaid card issued by the food center platform or merchant by directly paying cash or transferring a real currency or digital currency, and consumes directly at the merchant with the prepaid card, which is not bound with the consumer's account. The merchant has a device that may identify the amount information of the digital currency in the prepaid card and collect corresponding payment. Or, the consumer purchases an unregistered prepaid card, transfers, with the client software installed, the digital currency amount in the card into a membership card or consumer account registered at the platform or at the merchant and pays with the balance in the membership card or account.

It may be understood that, in some other examples, the platform server of the food center and the application server of the merchant may switch their roles: for examples, the platform server disseminates and recommends the promotion content released by the application server to obtain a digital currency or other award granted by the application server; or, the platform pays the digital currency to the application server to obtain the services or commodities provided by the application server. Or, the merchant may mortgage its assets to the core server or review center to obtain a corresponding digital currency, etc.

In the embodiments above, any kind of two-dimensional code as generated, for example, a payment two-dimensional code, a promotion two-dimensional code, a recommendation two-dimensional code, etc., or a hyperlink corresponding to the two-dimensional code content, is all generated by the core server or generated under its authorization. If these two-dimensional codes are generated according to the specific coding rule while parsed by only the matching coding rule, then the information involved therein is protected more reliably, which may effectively prevent the information from being stolen.

The management issues regarding issuing and using of the digital currency as well as settlement rules thereof may be stripped off from the core server, e.g., which are managed by a uniform digital currency issuing unit, the unit performing operations such as adjusting the quota of the digital currency based on the notifications from respective parties (such as the core server, the review agency, the platform server, the application server, or the consumer terminal, etc.) during the interactive process; the respective interacting parties may query, from the digital currency issuing unit, the digital currency quota of its own or other parties based on the set rights. The quota of the digital currency of a certain party or use condition thereof may be recorded, as a certain attribute item, by the core server (or the platform server or application server or other third-party agency) to be referenced when adjusting the values of other attributes or correspondingly adjusted with value adjustment of other attributes.

In an example, the functions of the core server are deployed in different operating servers so as to corresponding to different operators, while the main functions of the core server, such as generating two-dimensional codes, reviewing and approving credit quota of the operating servers, etc., are integrated to become a core system. The digital currency quota of the operator is applied by respective operating server to the core system; the core system, after the review passes, grants the quota to respective operating servers; the quota consumed when the merchants and users charge and the quota released when withdrawing within the operating servers are operated within the quota scope. To this end, with a built-in or external database, the core system records, in a list of operating servers, the ID, name, domain, application ID, application key, Token and other information of respective operating server, and the amount of the generated object two-dimensional codes or payment two-dimensional codes, etc.; sets a list of digital currency quota for respective operating server to record the digital currency quota that may be granted by the operating server, the remained quota of the digital currency that may be granted to the merchants and users (deducting the withdrawal part), etc.

Embodiment 11

Figure 17:
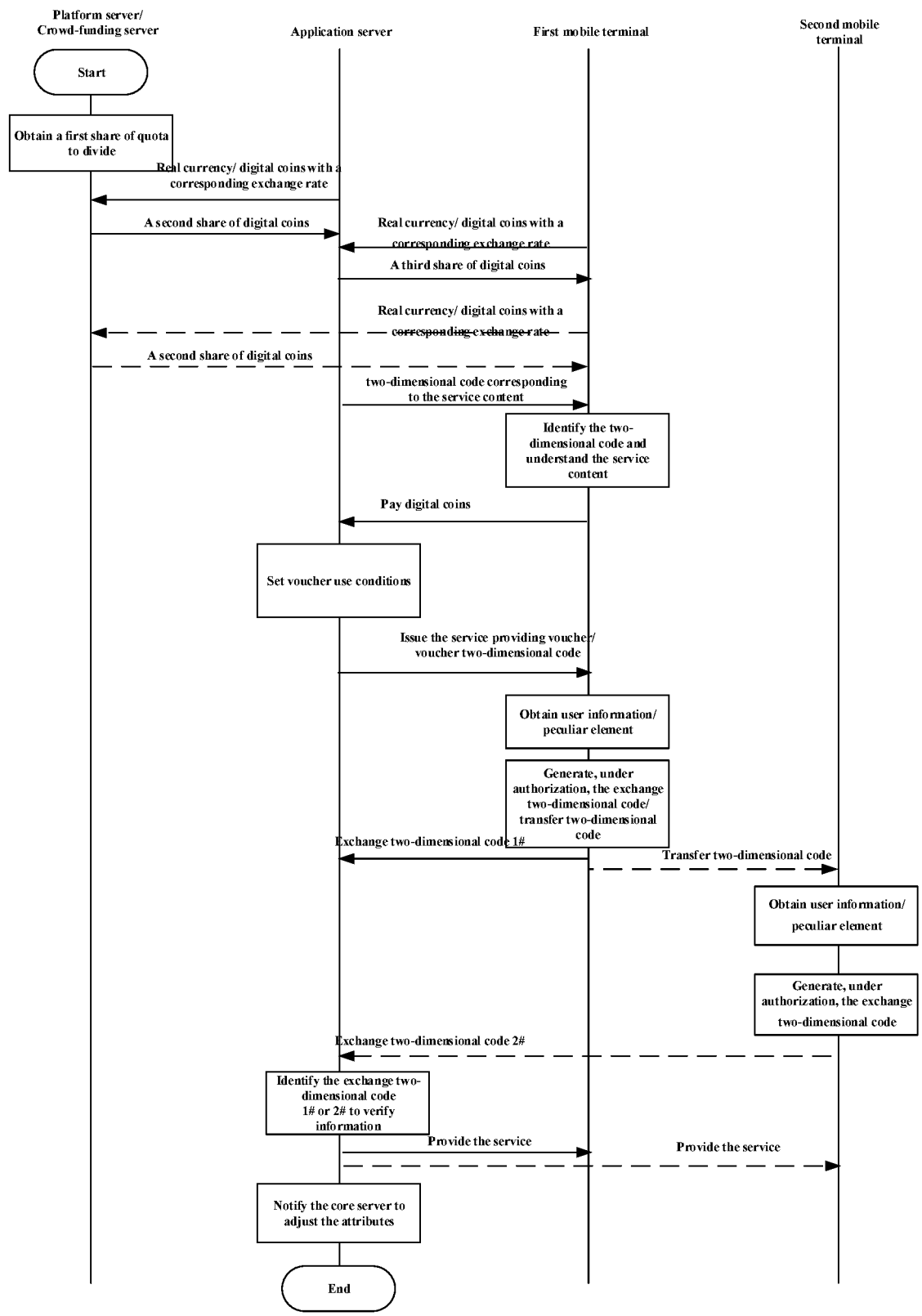
FIG. 17 is a flow diagram of an information processing method based on uniform code issuing in an eleventh embodiment of the present disclosure.

This embodiment provides an example of an information processing method based on uniform code issuance to implement crowd-funding, as shown in FIG. 17. Corresponding settings of respective parties such as the core server, the review agency, the platform server, the application server, the consumer terminal, the digital currency issuing unit in the foregoing embodiments may all be applied to this example; other third-party servers may be configured when needed.

Supposing that in the above case, the food center need to crowd-fund 2 billion yuan (corresponding to the first share), the digital currency of the first share is split into 200,000 shares each share being 10,000 yuan (corresponding to a second share) by setting a crowd-funding server; the 200,000 shares are distributed through the crowd-funding server or through a platform server, available for respective other parties (e.g., stationing merchants, or consumers, or other investment institutions, etc.) to subscribe.

The respective merchants subscribe for shares of the distributed digital currency with real currency (e.g., RMB yuan) from the crowd-funding server or platform server through the application server to obtain a plurality of second shares of the digital currency; or, respective merchants convert the digital currencies they already own into a plurality of second shares of the distributed digital currency at a set ratio (e.g., a digital currency worthy of 8,000 yuan may be used for subscribing for a share of digital currency worthy of 10,000 yuan).

The consumer may also subscribe for shares of distributed digital currency directly from the crowd-funding server or the platform server with real currency or digital currency. Or, the merchant may re-sell the obtained second share of digital currency to consumers. For example, the consumers may obtain a share of digital currency worthy of 1,050 yuan (corresponding to a third share) with a real currency of 1,000 yuan or by charging a digital currency worthy of 1,000 yuan.

The funds (real currency, digital currency, etc.) obtained by the food center crowd-funding platform may, for example, be used when further developing the food center. The shares of the digital currency purchased by the merchant or consumer may be circulated and used among the platform server, the application server, and the consumers, etc.; or, the shares of the purchased digital currency may be used for claiming value-added rewards from the food center platform and/or merchant when a certain condition reaches an expected setting (including, but not limited to, when the time, or funding scale, or profits reach set expectations), or directly obtaining the services or commodities as provided, or being converted into a voucher for obtaining the services or commodities later. The corresponding mechanism (core server, crowd-funding server or digital currency issuing unit, etc.) performs corresponding recording and adjustment in the capital accounts of respective parties with respect to the values or changes of the digital currency shares.

As agreed in advance, the voucher may be used by the buyer itself or transferred to other users for use when set conditions are satisfied, to exchange for corresponding services or commodities with the platform server or application server or third-party server. The voucher issued by the distributing party may be implemented in a two-dimensional code form. Coded information of the voucher two-dimensional code for example includes contents corresponding to the set conditions and the services or commodities to obtain; when exchanging the voucher, an exchange two-dimensional code where subscriber user information is superimposed on the content corresponding to the voucher two-dimensional code may be set so as to distinguish the subscriber and verify its exchanger identity. When transferring the voucher, a transfer two-dimensional code where the subscriber user information is superimposed on the content corresponding voucher two-dimensional code may also be sent, and when the transferee is exchanging, an exchange two-dimensional code where the transferee user information is superimposed on the content corresponding to the transfer two-dimensional code is sent to distinguish the transferee and verify its exchanger identity. As agreed in advance, the transferrer or the transferee may notify the platform server or application server or the third-party server to record the transfer matter upon transferring the voucher; the notification may also not be notified upon transferring, but verification is directly performed based on the corresponding content included in the exchange two-dimensional code upon exchanging. Respective two-dimensional codes must be generated by the core server or under authorization of the core server.

Besides, for the rent or other fees paid by a merchant to the food center platform via the application server, the food center will grant a corresponding electronic note and/or grants a corresponding percentage of share of digital currency, as the grounds for the merchant to contribute to the investment of the food center; when the food center investment earns profits, the merchant may obtain a bonus based on the electronic note, or exchange the real currency corresponding to the bonus with the share of digital currency.

Supposing that the developer of the food center raises funds through various manners such as the crowd-funding or contribution from the stationing merchants to buy land and build houses, the merchants or consumers who are granted the corresponding digital currency share or voucher or electronic notes during fund raising may require the developer to distribute the houses to sell for profits so as to obtain value-added rewards (in a form of digital currency, real currency or various other forms); or, may require converting, with enough shares, the above into the house per se, or converting into a qualification for buying a house with discounts, etc.

In the set conditions for determining a redemption, physical world peculiarities corresponding to the exchanger (subscriber) and/or the honor party (e.g., a platform server of the distributing or fund-raising party, or an application server, or a third-party server as appointed) may be further agreed upon; then upon redemption, the honor party will further verify the physical world peculiarities provided by the exchanger to the honor party when the exchanger was subscribing or exchanging, and/or the honor party will further verify the peculiarities of the physical world when the honor party per se is located, to determine whether the set conditions are satisfied, and then further determine whether to grant corresponding profits/provide services or commodities.

Operations such as propagation and recommendation as described in the foregoing embodiments may also be combined with the technical solutions regarding digital currency and set conditions in the example above to thereby implement a new dissemination management mechanism: for example, an activity of "recommending leading actors/actresses of a movie" launched by an e-commerce website of a film company; the consumer may view the introduction and promotion contents of the mobile through various means such as a mobile terminal or a webpage browser, e.g., by identifying the corresponding two-dimensional code or clicking a hyperlink. The consumer may obtain relevant information from the server of the e-commerce website through various means such as corresponding software installed at the mobile terminal, corresponding client installed in a computer device, or a webpage browser, and execute operations such as information interaction with the server and data processing.

In different application scenarios, through interacting with the server of the e-commerce website, the consumer, for example, may select to pay a down payment with a real currency or an already owned digital currency or newly exchanged digital currency to obtain rights of buying tickets with discount when the movie is on show, or obtain an option of equity sharing when the total box-office profits reach 0.1 billion yuan; then the server, after collecting the payment, will grant it a corresponding voucher, and honor it when conditions such as the movie being on show or box-office profits are satisfied. For another example, the consumer may participate in the activity to recommend a leading actor to the film company, and if the leading actor is employed, obtains a right of buying 100 tickets with discount; the right can be distributed to other users in a two-dimensional code (generated by the core server or under its authorization) form, and when the movie is on show, the right will be honored by the server; for example, each user claims a ticket based on the information read out from the same two-dimensional code; then the sequence of granting the tickets will be based on time order of reception of the ticket claiming requests, and when the ticket claiming requests exceed the predetermined quantity 100, granting of the tickets will be suspended; or, for example, the consumer generates, in advance, corresponding 100 two-dimensional codes (including different serial numbers); other users claim the tickets from the server based on the information read out from respective two-dimensional codes. For another example, the consumer superimposes the user information of the consumer with the promotion content of the website activity or the information of the leading actor recommended by the consumer, distribute a recommendation two-dimensional code generated (by the core server or under authorization thereby) and the corresponding hyperlink to other users; then, the server, for examples, triggers a right of allowing the consumer to buy 100 tickets with discount by counting the times of the recommendation two-dimensional codes or its lower tiers of recommendation two-dimensional codes being identified when all propagators under the share chain of the consumer reaches 10,000 person-times, or assign rights of buying different numbers of tickets among other propagators under the sharing chain based on set weight indexes, etc.

Embodiment 12

This embodiment illustrates a specific application of generating a "digital currency" based on "surplus value in circulation" so as to derivatively creative a "theory of digital human being economy" featuring "capitalization of advertisement placement, equitization of dissemination and circulation."

As indicated by Marx in Das Capital, currency was initially originated from a simple, individual, and occasional barter. With development of productivity and expansion of commodity production, an augmented value form forms gradually. When a commodity specifically acting as an equivalent for any commodities is split from the commodity world, a universal value form emerges. However, further development of productivity and further expansion of commodity exchange scope require that a universal equivalent should be fixed on a special form of commodity; then currency emerges. However, irrespective of value form, the value of a commodity has to be embodied on another real commodity. In an era when a mobile network is "existent anytime and ubiquitous," which is ignited by population of mobile terminals including wearable devices, a "digital currency" will emerge to act as a manifestation of any commodity.

If Marx's Das Capital fully illustrates the theories of "surplus value" in "production" and "currency exchange," the "digital human being" network theory proposed in the present disclosure further illustrates a "value system in circulation and sharing"; and with a "digitally traceable and quantifiable" measurement standard, a "digital currency" may emerge to become a "universal equivalent." In the present disclosure, the digital currency is originated from "circulation and dissemination," while use of the digital current is through a "two-dimensional code system."

Hereinafter, a specific example of implementing a digital currency exchange will be introduced. A "digital currency exchange" is an original carrier for stock analysis and dissemination and promotion pages; respective parties may obtain, by accessing a code issuing center, a dissemination two-dimensional code corresponding to a content that needs to be promoted, and may also implement stock purchase. An e-commerce website of an automobile manufacturer or "digital human being exchange," for example, will raise dissemination and order of a "new car model" to test market response (including a willingness to buy the new car as a final consumer, and a willingness to buy the stock as an investor).

The final consumer knows the promotion content in various ways (e.g., identifying a dissemination two-dimensional code, or accessing the e-commerce website, etc.), enters a corresponding page through interaction between the client terminal and the server of the e-commerce website to pay advance payment, and selects a real currency (USD/RMB) or digital currency (digital currency obtained in various ways, particularly a currency value generated in circulation, e.g., digital currency awarded by promoting the car) by paying consideration, to obtain a "right of triggering purchase of option with 800 USD/stock or 200,000 USD/car when the stock price rises to 1,000 USD," thereby implementing "quantization of the surplus value in dissemination and feedback to the value of shareholder's stock" and implementing practice of "Soros' Positive Feedback Theory" by quantization.

For an automobile manufacturer or "digital human being exchange," the more orders obtained from consumers in the above way, the larger the scale effect is achieved, which may reduce costs, increase marginal profits, and boost stock price. The automobile manufacturer takes a portion (e.g., 10%) of the total sales revenue as an award for dissemination and promotion to implement payment by promotion performance, which may reduce conventional advertising fees; besides, the rewards paid for advertising and dissemination will turn into enterprise profits if the awarded promoters buy the stock or purchase the cars.

In the whole procedure, it may be designed into a "digital currency" only mode: supposing that the car is priced as 200,000 digital coins/car; the award fee for dissemination and promotion is 10%, i.e., 20,000 digital coins/car; the current stock price is 400 digital coin/share, the total equity is 1 billion shares, i.e., the market value is 400 billion digital coins; the total sales amount is 100,000 cars, i.e., the predicted total sales revenue is 20 billion digital coins; the predicted net profit is 40%, i.e., 8 billion digital coins; the PE ratio (price-earnings ratio) is 100 times, and the market value will reach 800 billion digital coins. Then, the surplus value (quantized index) in circulation and dissemination is embodied in three aspects: 1) reduction of advertising fees and effective placement may be quantized into a range of specific percentages of the total sales revenue; 2) the company's net profit, and the percentage to convert awards into stocks (options); 3) value-added of the total market value caused by stock price rise.

Therefore, the digital currency has a "value scale" superior to the "surplus value in production in the traditional economic theory," while by measuring the value scale that may be "quantized, digitalized, and circulated" in the circulation and dissemination, a digital currency system may be established (incorporating various main circulation commodities, such as consumables, bulk commodities, and raw minerals, into the system), which is immune from the inflation caused by over-issuing of respective central banks; in the entire digital human being network world, only the digital currency is used in transaction, circulation, consumption, and award, and its value scale is hooked to the "three value representations." When people "leave the digital human being network world" and return to the "real world," the digital currency may be exchanged into real currency such as "USD/RMB" through setting an exchange rate.

The digital currency has a "stable value scale," because it is hooked to the surplus value in the circulation, thereby breaking away from the dilemma of over-issuing of paper notes caused by "currently, the currencies of respective countries are hooked to USD, while the USD is hooked to gold, which causes gold insufficiency; then under-issuing of USD; therefore, they are decoupled from the USD"; the digital currency has characteristics such as being generated in circulation, being able to trace the whole transaction process (satisfying the anti-money laundering regulation mode), being safe to pay, and being convenient for circulation; besides, it satisfies the requirement of "the conventional mode of first raising funds" for expanding reproduction of enterprise; further, the solution of the present disclosure now may reach "positive feedback from production capital+effectiveness of circulation and dissemination+ advance sale+profit increase causing stock price rise"; therefore, the enterprise may quickly expand the reproduction without a large production capital after small tests for researches have been completed.

Still with the automobile as an example, supposing that to complete upgrading to the latest version and small testing thereon, it is necessary to expand the reproduction to 100,000 cars, with a predicted sales revenue of 20 billion digital coins; according to the conventional mode, it is needed to prepare in advance 45% for covering the funds for production and sales costs, i.e., 9 billion digital coins; the profit is 40%, and the taxation is 15%. However, according to the solution of the present disclosure, with an order of 100,000 cars completed through dissemination and circulation, amounting to a sales revenue of 2 billion digital coins, as the computing basis, theoretically 10% (i.e., 2 billion digital coins) is taken as the "surplus value scale of the circulation and dissemination" to issue a digital currency for "buying cars and stocks" (if there is a concern that the automobile manufacturer does not have enough credit, it may be required to mortgage part of its shares, under the precondition that it does not mortgage its stocks (options) before listing, or manufacturing plants, or IPs, etc.). According to the principles described in various foregoing embodiments, the code issuing center signs with the automobile manufacturer to stepwise issue automobile-related digital currency as "reward expenditure" to be awarded to propagators (each level of recommenders).

The manufacturer or e-commerce website guides the consumers to pay the advance payment to thereby complete raising of funds for reproduction expansion; if only 10,000 cars are ordered, the expenditure of the promotion expenses will also decrease, so will the total value of the stocks; more stocks need to be taken out to mortgage; "algorithm terms" with respect to corresponding algorithms may be specified when signing with the code issuing center. Or, "mortgage with the expected benefits of the dissemination and sharing value of the digital human being as the founder" may be added to reach an agreement with the code issuing center, i.e., "quantizing and cashing the personal credit index and capability in advance"; algorithm example of the personal credit index may refer to the "appraisal index INDEX" mentioned above.

In this example, the mode of "production, sale, circulation, and stock issuance" implemented above is referred to as the "digital human being stock issuance and exchange." The code issuing center has the function of a digital human being stock exchange: the stocks mortgaged by the automobile manufacturer or used for exchanging digital currency may be regarded as to-be-issued stock (stock mortgage is similar to the market maker mechanism, wherein the due diligence includes predicting market sales of the product, assessing the validity of the moral quality index of the founder, assessing the product testing, assessing the feasibility of reproduction expansion, and assessing reliability of the production/sale/delivery). The consumer may be awarded with digital currency for his dissemination, may pay the digital currency for buying the car, and may also buy the stock of the manufacturer's stock "with the digital currency in the digital human being world," and sell the stock after appreciation to obtain digital currency (during the stock appreciation process, the value contribution in the circulation and dissemination may be quantized or partially quantized). Therefore, in the case, the value of digital currency is hooked to the value of circulating and disseminating the car, while indirectly hooked with the market sale price of the car, and even hooked with the manufacturer's stock, thereby implementing the value scale of digital currency.

When more and more enterprises select to issue stocks in the exchange manner, the currency value of the digital currency will become more and more stable (as a benchmark scale for a package of currencies to resist against the inflation of traditional paper notes); the funds obtained from issuing the stock may be monitored in the whole process, such that they will not be embezzled, and there will be no risk of "false financial statement"; the dissemination/order index is real-time produced and monitored, and the automobile manufacturer's stock index will also rise with promotion of the dissemination (i.e., rise of the dissemination index); announcement of the stock in this example may be regarded as "listing announcement of an enterprise," and the exchange is just a "digitized securities exchange."

Currently, various financial institutions, online retailers, and third-party payment agencies have successively launched their own two-dimensional code payment solutions. Besides so many technical problems (e.g., non-scene payment, identity identification, security guarantee, etc.) not solved yet, the market is divided with orderless competition; it is hard for the consumers to choose, and it is also impossible to form a nation-level large data. The present disclosure implements a top-level planning and systematic resolution for two-dimensional applications, which reduces repetitive investment. By establishing the "digital human being network digital currency issuing center" & "regional two-dimensional code issuing center" and the "national two-dimensional code payment and settlement (public) platform," security issues caused by hardly authenticating the two-dimensional codes independently issued by multiple agencies may be solved through uniform code issuance, which wins consumer recognition more easily; by establishing a public settlement platform (similar to UnionPay), the present disclosure addresses the issue of fair competition, such that all financial institutions, online vendors, and third-party payment agencies may share national settlement platform resources with their own uniformly authenticated two-dimensional code payment technologies, and in this way, a structural "big data" with respect to people's daily life of a significant strategical sense may be obtained.

The award granting manner provided in this example may be regarded as a "fans economy," which capitalizes advertisement placement, equitizes the purchase acts, and shapes a super virtual digital currency, and thus solves an important issue existing in the current economics: the Das Capital expounds the "surplus value theory in production"; however, in the circulation phase in the human society, the "social-model circulation and dissemination appraisal" is not "quantized and valued." To address this issue, the present disclosure provides a technical means for implementation.

Embodiment 13

Figure 18:
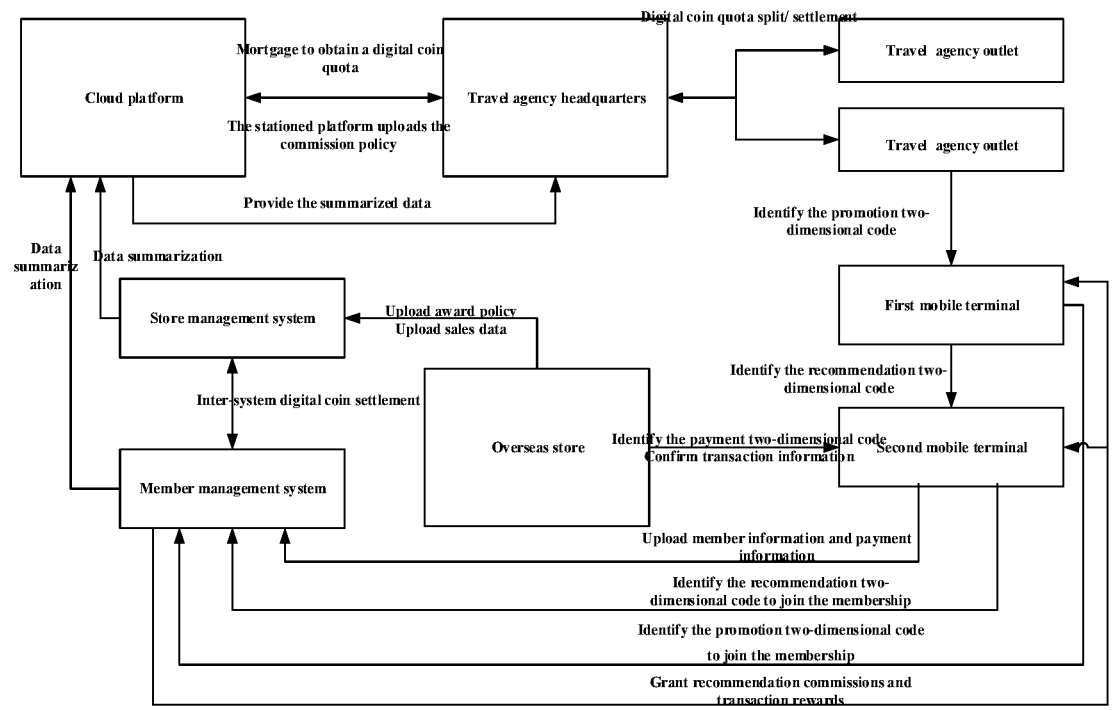
FIG. 18 is a structural schematic diagram of an information processing network based on uniform code issuing in a thirteenth embodiment of the present disclosure.

This embodiment provides an application case of a credit digital currency, as shown in FIG. 18, which involves a cloud platform, one of a plurality of merchants stationed in the platform, and a digital currency quota reviewing and approving agency, all of which have a corresponding server for data processing and information interaction; a consumer who having a device such as a mobile terminal to access the digital human being network; wherein two-dimensional codes needed during interaction between the respective parties above are generated by a core server of a code issuing center based on a coding rule set with a uniform standard.

Particularly, the merchant, as a registered merchant, accesses the cloud platform and submit an application for obtaining a digital currency quota to the cloud platform; the platform will send information, such as an asset certification provided by the merchant, credit of the merchant, and business qualification, to the server of the reviewing and approving server.

The reviewing and approving agency (e.g., a bank, an insurance company, etc.) grants a corresponding digital currency quota after undergoing assets assessment, creditor assessment, equity assessment, CDM (Clean Development Mechanism), BOT (Building-Operating-Transferring) assessment, PPP (Public-Private Partnership) assessment, etc., and transfers the quota into the merchant's account. The digital currency quota is dividable and traceable and may be used as note endorsement. The digital currency obtained by the merchant is equivalent to the valuation of its assets and credit.

The cloud platform performs a whole-process digitalized transaction management with respect to the issuance and circulation of the digital currency; during the transaction process, requests from respective parties for two-dimensional codes are all sent to the cloud platform, such that after interacting between the cloud platform and the code issuing center, a two-dimensional code generated by the latter will be returned to respective transaction party. In view that respective clients involved in the transaction are all registered users of the cloud platform, the cloud platform will provide a unique two-dimensional code for each client, corresponding to the client's information for identity verification and credit assessment. When needed, the client two-dimensional code may be provided to the reviewing and approving agency.

Besides, the cloud platform monitors each transaction and collects commissions according to the percentage agreed with the transaction parties. To implement monitoring, the cloud platform provides a unique transaction two-dimensional code, e.g., an order, a warehouse receipt, an invoice, a bill of exchange, a payment collection code, and also provides a unique two-dimensional code for each commodity/service item; then, when disseminating and promoting the commodity/service item, a result of decoding the coded information corresponding to the two-dimensional code may be superimposed in a secondarily generated recommendation two-dimensional code. The cloud platform or respective other parties may decode the two-dimensional code based on a preset uniform coding rule to obtain the client information, transaction information, and commodity/service information therein, and may know the situations of generating the two-dimensional code at multiple stages and multiple times, thereby implementing a traceability. Upon transaction, circulation of the digital currency may be implemented in a payment collection two-dimensional code form, for example; in view that the payment collection two-dimensional code is generated by uniform code issuance, it may be controlled in the whole process, thereby guaranteeing capital security and reducing capital costs.

Suppose the merchant is a travel agency. The travel agency requests, through accessing the cloud platform, requests for and obtains a digital currency quota granted by the reviewing and approving agency, wherein the quota of the digital currency may be circulated in transactions with outlets (not limited to real stores or online stores) home and abroad. A traveler registers, with his mobile terminal, to become a registered member of the travel agency, and may buy and exchange digital currencies at various outlets of the travel agency, or charge, through other ways, his personal digital currency account. Respective outlets upload sales data to the server of the travel agency and the cloud platform, such that the cloud platform settles the sales data of respective outlets and uniformly grant corresponding amounts to the outlets for example at the end of each month.

The traveler may also identify, with his mobile terminal, a promotion two-dimensional code regarding the travel agency information or travel route information exhibited at the outlet, and indirectly interact with the code issuing center by accessing the cloud platform, to obtain a secondarily generated recommendation two-dimensional code superimposed with user information of the traveler, for recommending to other users via various ways such as a social platform. The cloud platform grants an award (e.g., various kinds of awards such as a digital currency, or a coupon, etc.) to the traveler according to a policy stipulated by the merchant based on sharing and forwarding conditions of the recommendation two-dimensional code. Because some physical world peculiarities of travelers are different, the award may be further differentiated; the peculiarities may be superimposed in certain information interacting with the cloud platform or superimposed in a certain two-dimensional code.

With the traceability of the recommendation two-dimensional code, the cloud platform grants social online business-based transaction commissions to the user and may summarize relevant data to provide information regarding media channels/regions, target audiences, respective levels of people having interest/participants/forwarders/consumers, etc. to the travel agency.

Besides, the traveler needn't use foreign currency or credit card when traveling abroad. To complete payment of the digital currency, it is only needed to scan, with a mobile terminal, the payment collection two-dimensional code (in replacement of a POS machine) presented by the store to learn the account information of the payment collector; generally, after confirming the payment amount, the traveler uploads member information and payment information to a member management system of the cloud platform or travel agency; the store will also upload the sales data to the store management system of the cloud platform; the store management system and the member management system will perform inter-system settlement, realizing transfer of the digital currency. After returning home, the traveler may exchange the digital currency amount in its membership account back to local currency.

The sales data uploaded by respective stores may be in various forms, such as sales slip, order, shipping order, and order for settlement, etc. The cloud platform may further summarize and sort these data to provide to the agencies that need these data, such as the sore, the travel agency, a duty-free store manager, or a government agency, etc. for query, to thereby implement big data analysis and guide enterprise operation and government planning.

In some examples, the merchant may store the to-be-presented information into a cloud space assigned by the cloud platform to the merchant, and classifying the information into a plurality of information groups, such as commodity, activity, presentation, etc.; the merchant may also request the agency such as the cloud platform or the code issuing center to prepare the content involved in any information group into a two-dimensional code to be released to the external. Respective party, after scanning the two-dimensional code, may access the cloud space to retrieve contents in a corresponding information group. When the merchant requests for code issuance, it may define the identity of the code scanning party and the operations allowed to be executed by the code scanning party; then, the coded information of the generated two-dimensional code may include corresponding verification information; it also requires that the code scanning party, when accessing the cloud space by scanning the two-dimensional code, provide his identity information and/or elements of physical world peculiarities, available for the platform to verify the identity of the code scanning party and opening corresponding operation rights thereto.

Embodiment 14

Figure 19:
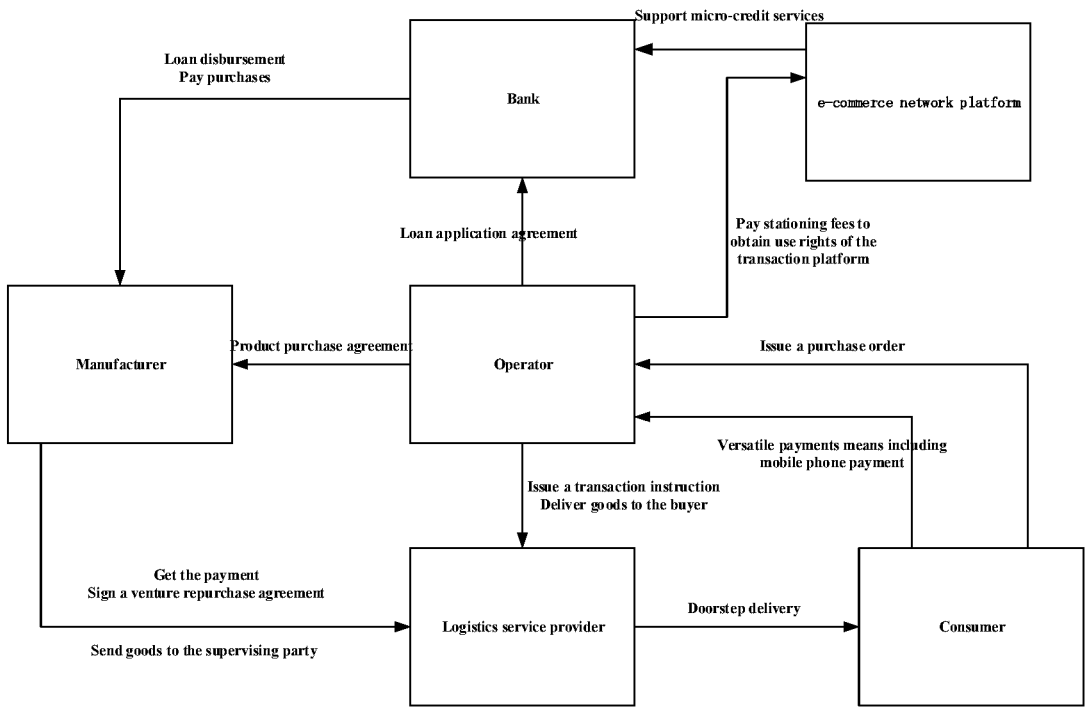
FIG. 19 is a structural schematic diagram of an information processing network based on uniform code issuing in a fourteenth embodiment of the present disclosure.

This embodiment provides a case of a supply chain management (SCM), as shown in FIG. 19, which involves an e-commerce network platform, one of a plurality of operations stationing in the platform, a bank, a consumable manufacturer, and a logistic service provider, all of which have a corresponding server for data processing and information interaction; a consumer who having a device such as a mobile terminal to access the digital human being network; wherein two-dimensional codes needed during interaction between the respective parties above are generated by a core server of a code issuing center based on a coding rule set with a uniform standard.

The operator obtains rights of relevant services such as setting up an electronic store, using the transaction platform, etc., by paying store fees. To this end, the server of the operator interacts with the server of the platform, e.g., paying fees to the platform by identifying a payment two-dimensional code released by the platform; an agency such as the bank or a core server which records the operator's account information, transfers the corresponding digital currency/real currency to the account of the platform; the platform provides corresponding services to the operator based on a notification of payment completion sent from the agency.

The operator signs a product purchase agreement with the manufacturer, sends a request to a bank with respect to the fees needed for purchasing the product, for applying for an unsecured load, and also sends relevant contents about products and their purchase prices in the agreement between the operator and the manufacturer via the server of the operator or manufacturer to the servers of the platform and the bank; the server of the operator submits a loan amount as needed to the servers of the platform and the bank.

The e-commerce network platform provides a support to the bank for micro credits, e.g., providing, via the server of the platform, credit records of the operator on the platform to the bank so as to assist the operator to get the loan. The manufacturer signs a guaranteed repurchase agreement with the bank. The bank disburses the loan and directly appropriates the funds to the manufacturer as the payment for the products purchased by the operator. As a capital information platform, the platform provides information such as the loan amount, repurchase amount, cash flow, available for the bank, the manufacturer, and the operator to query when needed.

After obtaining the payment, the manufacturer ships the goods purchased by the operator to a supervising party. That is, the goods purchased by the operator registered with the platform from the manufacturer according to the agreement are directly shipped from the manufacturer to a warehouse of a third-party logistics (3PL) appointed by the bank to store. The operator promotes the commodities he sell to the external in a form of two-dimensional code according to the manners in the foregoing embodiments.

The consumer browses, via various clients, the store on the platform or the two-dimensional code released by the operator to understand the commodities as sold; after confirming the commodity to buy, the consumer issues a purchase order to the server of the operator; the server of the operator issues a transaction instruction to the server of the third-party logistic service provider based on the order, such that the logistic server ships the corresponding commodity to the consumer.

The platform may interact with the server of the logistic service provider to obtain the species, quantity and value information of the good purchased and deposited by the operator, as well as the goods transaction status information and warehouse management information under the supervision of the logistic service provider; with such information, the platform may perform online analysis with respect to the financial balances of the operator, and if necessary, may provide such information to respective parties such as the bank, the manufacturer, and the operator to query.

The consumer pays through the client upon receiving the commodity, e.g., in the two-dimensional code-based mobile payment manner in the foregoing embodiment, to pay the purchased commodity to the operator (or the platform or the bank). Because two dimensional codes such as the promotion two-dimensional code, payment two-dimensional code, and recommendation two-dimensional code are all uniformly generated by the code issuing center, the platform, through information interaction with the code issuing center, may monitor the whole process of the transaction between the operator and the consumer, e.g., providing receivable information of the operation, payable information of the consumer, etc., which may be retrieved when queried by respective parties such as the bank, the manufacturer, the operator, and the consumer when needed. The platform provides customer services, handles transaction complaints and other issues, records credit values of the operator, records appraiser index of the consumer, and grants award, etc.

The loan is recovered at an appointed supervisory bank, and risk deposit is paid according to a certain percentage; if the merchant fails to repay the loan in due time, the manufacturer shall repurchase the commodities deposited at the logistic service provider according to the risk repurchase agreement, and the repurchase payment is directly transferred to the supervisory bank, thereby avoiding risks. To this end, when receiving the repurchase payment from the manufacturer, the bank sends an instruction of delivering the goods to a location specified by the manufacturer to the server of the logistic service provider; and the logistic service provider executes relevant operations. Besides the bank, the platform may also lower the recorded credit rating of the operator based on the default information of the operation sent from the bank.

Besides, the merchant may also pledge its legally owned goods for financing; the bank entrusts a qualified logistic company to supervise the goods in the whole transaction process; after the bank determines the lowest value, the bank will autonomously determine whether to grant loans to the part exceeding the lowest value.

In this example, the e-commerce service platform may solve the existing problems such as lacking reasonable and effective profit modes and insufficient supervision on credible transaction of commodities, thereby providing a high-quality commodity supply and distribution value chain platform, which charges by traffics and ensures quality products of outstanding enterprises to enter the market.

For the operators, who are faced with the problems of difficulty in obtaining financial support, slow fund recovery, and lack of comprehensive logistics services, the solution in this case may provide them with unsecured micro loan support from the bank, speed up their fund return, and provide them with high quality comprehensive VIP logistic services.

The bank may solve the problems of logistic supervisory risks and credit monitoring risks for micro loan services; with collaboration between the platform and strategic logistic partners, the risks for the logistic service provider to monitor the warehouse order pledge are reduced; by sharing credit and capital information through the platform, more loans (guarantees) may be provided to small and medium-sized enterprises with their future cash flow as a basis, which reduces credit risks while extending businesses.

To the manufacturer, the high cost of the original channel affects its profits, while it is hard to effectively extend the e-commerce channel; through this example, infiltration capabilities of respective operators in the consumer market may be fully exploited; with the assistance of the platform, the manufacturer and the operator may easily construct an e-commerce value chain with joint efforts, where the operator performs dissemination and promotion using two-dimensional codes or the like, while the manufacturer may focus on products.

The consumer may obtain quality products through the solution in this example, and obtain a high quality logistic service matching the quality product. The consumer may also obtain an award granted by the operator or the platform by performing operations meeting the award policies as described in the foregoing embodiments, e.g., recommending to others through a secondarily generated two-dimensional code, completing a transaction through interacting with the server of the operator or platform, etc.

Besides, the loan amount, repurchase payment amount, commodity purchase payment amount and the like in this example are all paid with a digital currency recognized by respective parties; the manner of obtaining the digital currency may refer to the depictions in the foregoing embodiments. Further, respective parties may exchange, at their localities, the digital currency into corresponding real currency. This is particularly suitable when respective parties such as the consumer and the manufacturer are not using the same real currency.

This embodiment provides a win-win novel business mode for multiple parties. It guarantees quality supervision. Logistic services are guaranteed. Goods storage and allocation are uniformly managed. The enforcement force of the load cooperation agreement between the bank, the goods supplier, and the operator is guaranteed. Credit risks are lowered. It also provides a secure and convenient payment mode for payment on delivery, which is hugely trustworthy for buyer users and provides a powerful support for seller users to build a top-level VIP store.

Embodiment 15

This embodiment provides a case of implementing an information platform-based factoring business. In traditional factoring businesses, a factoring company or bank can hardly understand relevant situations between an upstream supplier and a core manufacturer/vendor, e.g., orders, shipments, acceptance, invoicing, payment, and similar situations between the core manufacturer/vendor and store customers. Therefore, insufficient information integration and sharing and unclear sales information can hardly provide effective data support to factoring services. Nonuniform documents and notes and relevant ease of counterfeiting documents and notes bring risks to the financier and the final creditor; there is also a risk of repetitive pledge financing; the mismatch of factoring terms will cause misappropriation of funds; all of the above bring a huge operational risk for factoring services.

Figure 20:
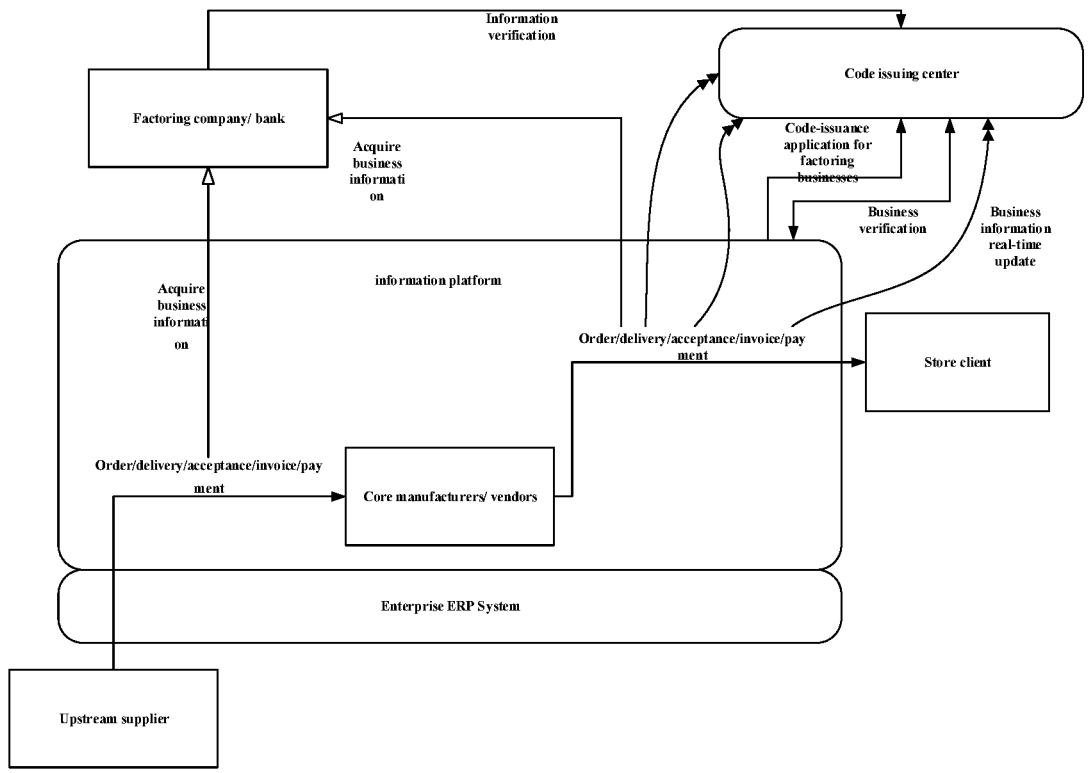
FIG. 20 and FIG. 21 are structural schematic diagrams of an entirety of an information processing network based on uniform code issuing in a fifteenth embodiment of the present disclosure.

As shown in FIG. 20, in this embodiment, with an information platform, the factoring company or bank is interfaced in depth with an enterprise ERP system (enterprise management information platform) of the core manufacturer/vendor, to obtain sales information such as the orders, materials, capitals between the core manufacturer/vendor and the upstream supplier or client, such that the factoring company or bank may timely grasp such information and provides a credit financing service to the whole supply chain based on such information.

The information platform is interfaced with the enterprise ERP systems of a plurality of core manufacturers/vendors, respectively. The following will refer to interactive operations between respective parties when any one of the core manufacturers/vendors applies to the factoring company or bank to conduct a factoring service. The enterprise ERP system sends the application for the factoring service, and the information corresponding to the factoring service, agreed between the core manufacturer/vendor and the upstream supplier and/or the client in an agreement, to the information platform. The information agreed in the agreement refers to, for example, but not limited to, the quantity of items and purchase prices and the like specified in the order, time limit and standards and the like involved in respective stages such as shipments, acceptance, payments, and various specific relevant operations of actual executors of respective stages (e.g., one of the signing parties of the agreement, or a third-party authorized thereby).

The information platform requests the code issuing center to obtain a two-dimensional code uniquely corresponding to the factoring service with the core manufacturer/vendor based on the application for the factoring service and the information above as obtained. When identifying the two-dimensional code sent from the information platform (or core manufacturer/vendor) thereto, the factoring company or bank extracts information about the core manufacturer/vendor and relevant agreed operations so as to confirm whether to accept this factoring service. The code issuing center may also obtain corresponding service information from the information platform to verify.

In respective steps of the sale execution process, the information platform may obtain corresponding real-time service information from respective parties to the agreement or a third-party authorized thereby, and add it to record entries correspondingly set by the information platform for the core manufacturer/vendor or for the factoring service; and coded content of the two-dimensional code uniquely corresponding to the core manufacturer/vendor and the factoring service is also included in the added real-time service information.

For example, the two-dimensional code may also be the same two-dimensional code generated upon the original application; however, when identifying it in different stages, the (factoring company or bank or various other agencies) may obtain contents in the record entries corresponding to different stages in the information platform. Or, after the real-time service information of a certain stage is added, the information platform requests the code issuing center to superimpose the content of real-time service information based on the content of the original two-dimensional code to generate a new two-dimensional code, and (the factoring company or bank or various other agencies) obtain the corresponding real-time service information by identifying the new two-dimensional code so as to verify the factoring service.

Similarly, supposing the respective parties to the agreement agree upon some newly added relevant operations in a certain stage of the factored sale business and notify the information platform, the information platform may record the information of the newly added operations in the record entry stored for the factoring service, such that the information about the newly added operations may be obtained by identifying the original two-dimensional code or the newly generated two-dimensional code.

obtaining of the real-time service information does not purely rely on the documents uploaded to the information platform from the core manufacturer/vendor. For example, as to determining whether the shipment operation has been completed, the logistics agency or warehouse agency specified in the agreement may access, via their respective device, interaction with the information platform to send, to the information platform, that the delivery has been made or the acceptance has been confirmed, and then the information platform will record the corresponding information about completion of the shipment stage. For example, the logistics agency or warehouse agency may, after superimposing its own identification information and its confirmation information of relevant stage of the factoring service based on the information of the factoring service, request the code issuing center to generate a new two-dimensional code, and send the new two-dimensional code to the information platform, such that the information platform updates the real-time service information.

Figure 21:
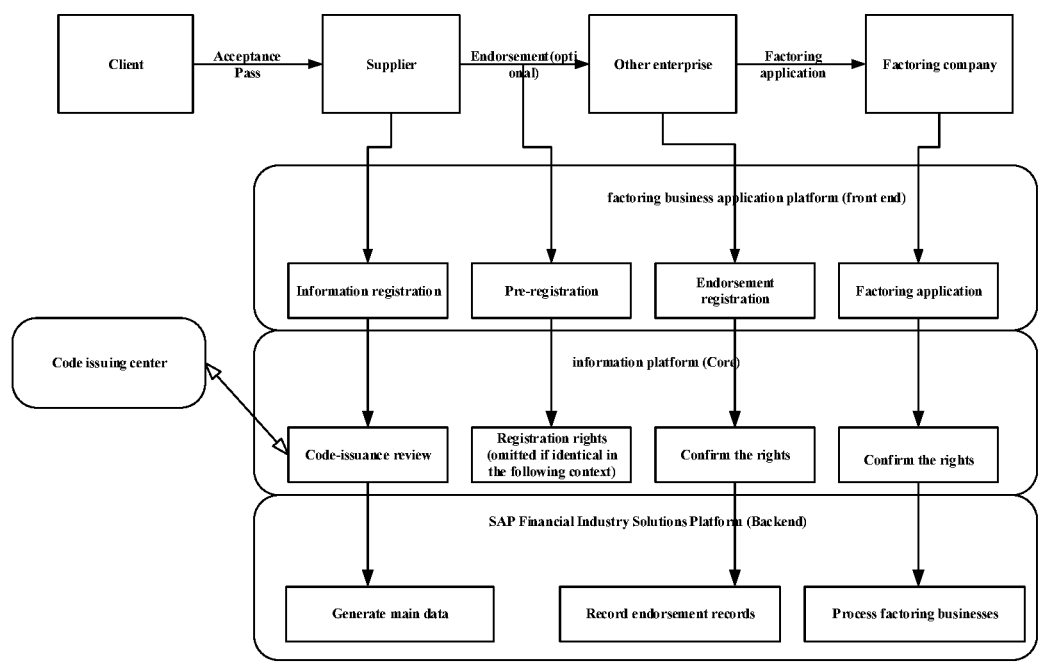

In one example, as shown in FIGS. 20 and 21, the vendor passing the client acceptance, performs information registration through a factoring service application platform at the front end of the information platform; a core part of the information platform, after reviewing the registered information, requests the code issuing center that issues codes uniformly to generate a two-dimensional code corresponding to the vendor and the factoring content it applies for; an SAP system (financial industry solution platform) at the backend of the information platform may generate main data corresponding to the included content based on the two-dimensional code. If an endorsement to other enterprises is required, the vendor provides the two-dimensional code and the information about the endorsed enterprise to the factoring service application platform and pre-registers at the factoring service application platform; the information platform obtains the rights of the endorsed enterprise as registered by the vendor to record. The enterprise provides a two-dimensional code and its own identification to the factoring service application platform and performs endorsement registration at the factoring service application platform; the information platform obtains the information of the enterprise and the recorded rights for comparison and confirmation, and in the case of confirming the consistency, notifies the SAP system for recording the endorsement records. When the enterprise applies the factoring company for the factoring service, the factoring company obtains relevant conditions of the factoring application through the factoring service application platform based on the information from identifying the two-dimensional code, and interacts with the information platform to confirm the rights of the enterprise; in the case of confirming no error, the SAP system processes the factoring service.

In an example of reviewing and approving a business flow using the information platform, interactions with the vendor and the factoring company are added to basic settings of the SAP system on the information platform, to set functions such as submitting an amount review and approval request, amount settlement, and amount review and approval. Based on the original functions of finance, cost, procurement, and project management of the SAP system, the information platform in this example is interfaced with the original SAP system via the SAP interface and performs interaction based on the MatrixLink protocol; a framework of the information platform is connected to the application database to perform relevant operations of project reviewing and approval and amount accounting management including main data management, sale support, work flow management, project management, and review management, etc.

Figure 22:
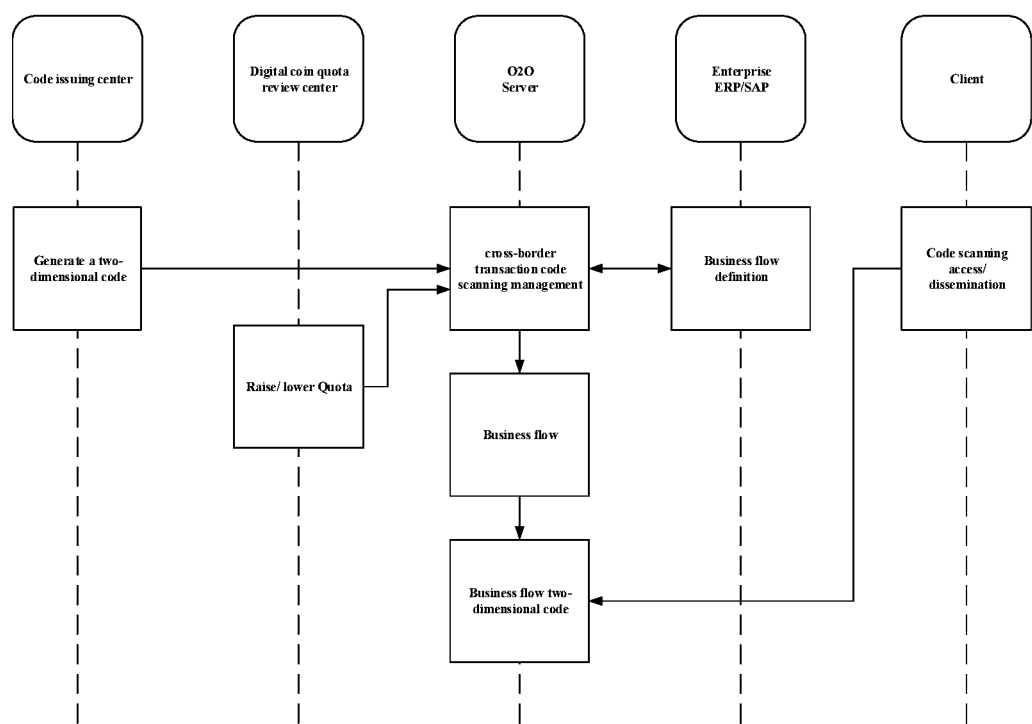
FIG. 22 is a schematic diagram of an exemplary flow of an information processing method based on uniform code issuing in the fifteenth embodiment of the present disclosure.

As shown in FIG. 22, setting of the business flow may be implemented through the ERP or SAP system within the enterprise, e.g., completing a "general manager A1-sales director A2-salesman A3" reviewing flow and rights setting, or completing a review flow B1, B2, B3 executed by different enterprise staff members.

Settings of the business flow are provided to the O2O server and may be open to the external partnership; the O2O server may request the code issuing center to generate a corresponding two-dimensional code based on the settings; the two-dimensional code generated based on the settings, for example, prescribes that only a specified person may set the business flow according to the work flow A1, A2, A3 or B1, B2, B3.

The corresponding person accesses the interaction with the O2O server by scanning the two-dimensional code with a client device to obtain corresponding business flow; unique identity information of the client may be submitted during the interaction to verify whether it has rights to execute the operations prescribed by the flow. The O2O server may interact with a digital currency quota reviewing and approving center based on the unique identity information of the client to settle the digital currency quota, complete the transaction payment-related operations involved in the business flow.

Therefore, the client may complete, by scanning the two-dimensional codes, various prescribed flows such as "review and approval/acceptance/payment" (execution of some flows need interactive cooperation from respective other parties) to thereby simplify the operations and enhance network security of the Internet.

Embodiment 16

Figure 23:
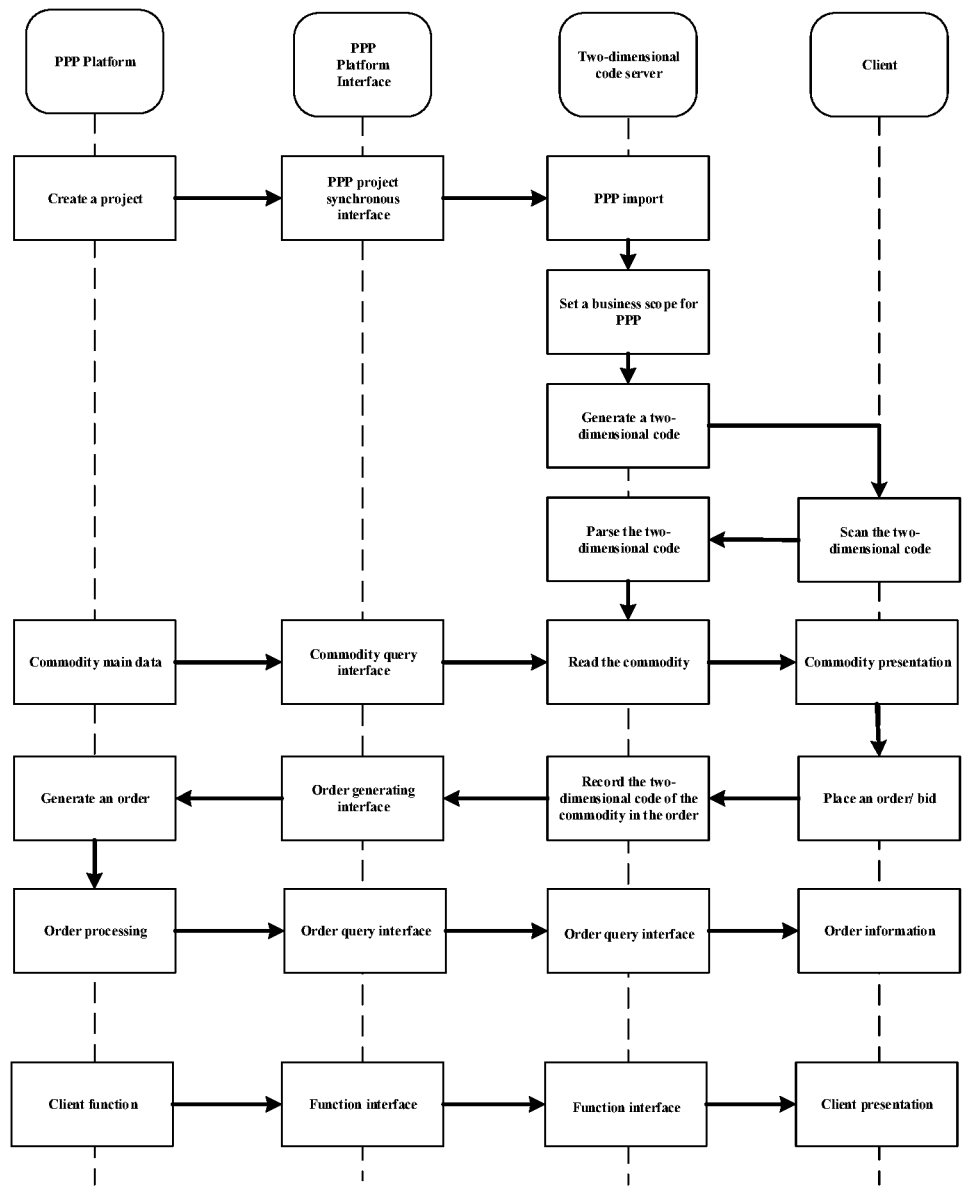
FIG. 23 and FIG. 24 are flow diagrams of an information processing method based on uniform code issuing in a sixteenth embodiment of the present disclosure.
Figure 24:
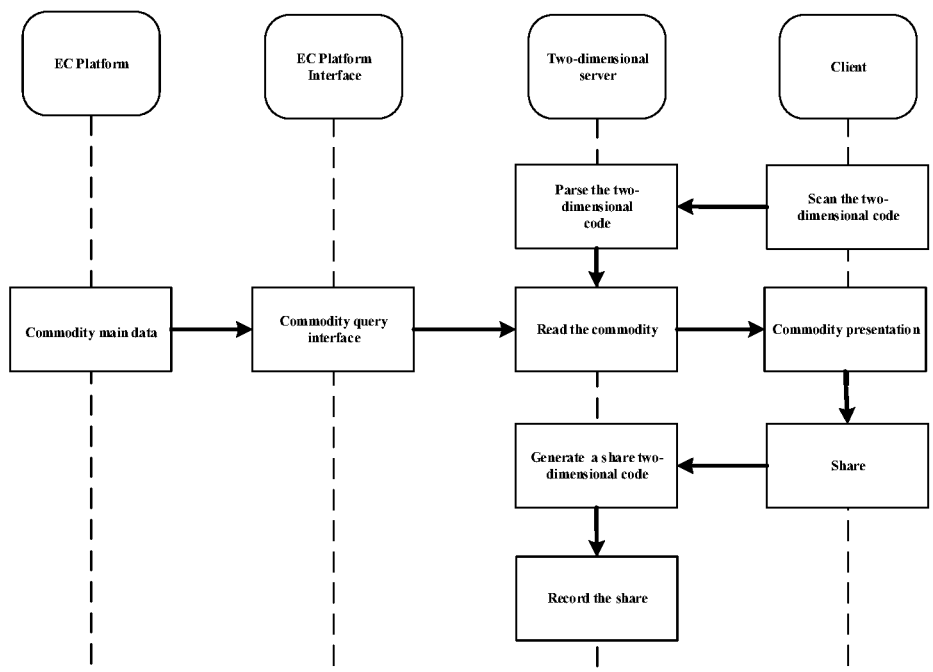

As shown in FIGS. 23 and 24, this embodiment involves the following parties: clients of the user at respective network platforms, which may perform two-dimensional code scanning, and share and recommend relevant information to other persons based on the content identified from the two-dimensional code, purchase by paying digital coins, and attend activities, etc.; a two-dimensional code server that supports user registration and login, sets sales organizations and channels, generates two-dimensional codes, assigns client access, shares a rebate mechanism, and implements client function interface; respective PPP platform interfaces that are connected to the two-dimensional code server and respective EC platforms, wherein an interface for quick implementation of connection to respective PPP platforms is developed in advance to realize a client function implementation interface, commodity interface, two-dimensional code interface, and order interface, etc.; and respective PPP platforms docked to the respective PPP platform interfaces to implement O2O services, client function implementation, commodity main data login, order processing, etc.

wherein the PPP platform creates a project related to a certain commodity, which is imported into the two-dimensional code server via a PPP project synchronous interface, and wherein business scope is set in the two-dimensional code server, and a corresponding two-dimensional code is generated and released to the external. After scanning the two-dimensional code, the user forwards it to the two-dimensional code server to parse, and obtains the corresponding commodity main data from the PPP platform based on the parsing result, and after the commodity main data are read by the two-dimensional code server via a commodity query interface, the commodity information is presented to the user's client.

If the user is satisfactory with the presented commodity, he will place an order; the two-dimensional code server records the order of the user, generates a two-dimensional code related to the order information and the transaction user information, which is sent, via an order generation interface, to the PPP platform to generate the order. The PPP platform performs order processing and feeds back the order information to the user's client via the PPP platform interface and the order query interface of the two-dimensional code server successively. The PPP platform may also set the functions that need to be executed by the client, which are transmitted successively via the PPP platform interface and the functional interface of the two-dimensional code server, and then presented to the client.

After the user scans the two-dimensional code and the two-dimensional code is parsed by the two-dimensional code server, the user obtains the corresponding commodity main data from the EC platform based on the parsing result, and after the commodity main data are read by the two-dimensional code server via a commodity query interface of the EC platform interface, the commodity main data are presented to the user's client.

The user requests, via the client, the two-dimensional code server to generate a sharing two-dimensional code and releases the sharing two-dimensional code to share with other users. The sharing operation is recorded by the two-dimensional code server for rebate. The actual corresponding functions may only be implemented at the client and the EC platform, wherein the EC platform interface is mainly used for information transmission.

By setting the PPP platform interface and EC platform interface, this embodiment may cause the corresponding platform to be docked with the two-dimensional code server, extending the platform with a plurality of new service functions based on the two-dimensional code.

Embodiment 17

Besides the two-dimensional code, the information sent from one party to respective other parties during any interacting process in the foregoing embodiments may also be encoded in other forms of coding mediums. The coding mediums may be barcode images such as one-dimensional code, two-dimensional code, multi-dimensional code, which are visible to naked eyes, or the barcode image or its coded information or any other kind of coded information may be an optical lattice diagram drawn with a fluorescent pen and represented in various forms such as: light-shadow rays, visible light, UV light or infrared light, polarized light, refurbish frequency, etc., or a digitalized acoustic represented with a specific rule/frequency change, as long as the coding medium may completely store the coded information corresponding to the information that needs to be sent. Although the one-dimensional code has a limited storage information amount, it is also feasible theoretically. The optical lattice diagram is generally designed to be unidentifiable or hardly identifiable to naked eyes, and the digitalized acoustic waves are generally designed to be hardly identifiable by human ears. However, the present disclosure is not limited thereto; when necessary, they may be made visible to naked eyes/audible to human ears.

A device that identifies any of the coding mediums above, performs data processing to the identified content, and performs various kinds of communication interaction operations with a background server appointed by the coding medium releasing mechanism to obtain contents/services corresponding to the coding medium, may also be a wearable device in addition to the mobile terminal (mobile phone, tablet computer) and personal computer as described in the foregoing embodiments. The wearable device refers to, but not limited to, various human body wearable parts such as a portion (e.g., for arranging a flexible information display and input screen) of accessories, eyewear, eyewear clips, headwear, hats, tie clips, brooches, bow ties, bracelets, watches, earphones, clothing, shoes. A certain user may be simultaneously equipped with one or more wearable devices.

A wearable device may have all functional modules of a mobile terminal in the foregoing embodiments to replace the functions of the mobile terminal, thereby implementing corresponding operations; or, a certain wearable device may only have some of the functional modules of the mobile terminal; but it must coordinate with a smart television, a set-top box, a home smart gateway, a mobile terminal, or further one or more wearable devices with remaining functional modules so as to implement the operations performed by a mobile terminal in the foregoing embodiments. The functional modules includes, but not limited to: an obtaining module configured for obtaining a coding medium, e.g., by shooting a visible barcode image using a camera, or receiving an optical lattice diagram or digitalized acoustic wave using a corresponding kind of obtaining module, etc.; a decoder for decoding the obtained coding medium to obtain coded information; a coded information parsing unit for parsing the coded information and determining whether the coding medium is generated based on preset coding rule; a transmitting/receiving unit configured for interacting with a background server or respective other parties with respect to information, receiving services or providing services if the coding medium is generated based on the preset coding rule; an input unit for inputting input information involved in the interaction process; and a displaying unit is configured for displaying the identified content or the information that required to be displayed during the interaction with the background server. These functional modules may be integrated into the same wearable device or scattered in a plurality of wearable devices or scattered in a plurality of devices such as the wearable device and the mobile terminal. The decoder and/or coded information parsing unit, for example, may even be arranged in the core server or background server or third-party server, and the wearable device or mobile terminal sends the obtained coding medium to these servers to identify, etc. The communication mechanism between the mobile terminal and various types of servers in the foregoing embodiments are all applicable to the combination between the wearable device and various kinds of servers in this embodiment.

With the wearable device being a smart eyewear as an example, it may comprise a camera for identifying a barcode image (which may further be configured with: an indicating unit (e.g., an indicator lamp) to indicate successful shooting or transmitting of the bar code image; a setting unit for setting shooting speed, definitions, etc.), and further comprise a transmitting unit that is in communicative connection with the mobile terminal or a further wearable device (e.g., a smart watch) in a wired manner or wireless manner such as Bluetooth/WiFi, etc. The transmitting unit is configured for sending the shot barcode image to the mobile terminal or watch. After the barcode image is identified by a decoder and a coded information parsing unit provided in the mobile terminal or watch, the content corresponding to the barcode image is sent back to the eyewear and displayed on the screen provided on the eyewear lens (or the content is displayed on the electronic screen of the mobile terminal or watch); after the user views the corresponding content, operations on the mobile terminal or watch implement sending of a service providing request to the background server and receiving of the provided service. Or, another example of the eyewear further comprises a decoder mentioned above; the coded information as decoded is sent to the mobile terminal for parsing; while the information display screen on the watch individually displays or synchronously displays the parsed information with the mobile terminal. In another example, the eyewear per se may perform all operations such as obtaining coded information from the barcode image, identifying, till interacting with the background sever, and obtaining the service; then, it may replace the mobile terminal. Or, the mobile terminal is used to signal connect with the eyewear to synchronously back up the data processed by the eyewear. Of course, the wearable device and the mobile terminal may also have a plurality of modified embodiments. It may be understood that these modified embodiments all fall within the protection scope of the present disclosure.

In different examples, a certain wearable device may be designed to be capable of identifying the one or more coding mediums described above. After obtaining an unidentifiable coding medium (including: unable to decode a certain barcode image, or although the coded information may be decoded, but a to-be-executed operation defined according to a rule cannot be parsed out), the wearable device or the mobile terminal that is signal connected therewith, for example, may alert Error, require a re-scanning, or be directed to other specified webpage; or no response is made; or, send the unidentified coding medium to the background server to identify, etc. When the coding medium is successfully identified and the operation flows defined by rules are obtained, the wearable device itself or the mobile terminal or other device driven thereby execute their respective operations.

The wearable device in this embodiment as a device of a digital human being may, like the mobile terminal in any of the foregoing embodiment, access the digital human being network when the user identifies an explicit or implicit coding medium through the wearable device (or with cooperation of other device terminal), and through operations as agreed in any embodiments above (including but not limited to, generating a new coding medium (e.g., a recommendation two-dimensional code) by a uniform core server/coding issuing center or other authorized party and recommending to other users, initiating an SNS search/SNS help seeking request or replying to other person's SNS search or SNS help seeking, completing the transaction, etc.), a corresponding agency such as the core server/platform server/background server/third party server records change of the attribute value (e.g., appraisal index) for the user, with the corresponding reward (e.g., digital currency) being obtained. In addition, during the interaction process with various agencies through the wearable device (or cooperation with other device terminal), e.g., when requesting the background server to provide a service based on the information obtained from identifying the coding medium, the user may report, to the background server or other agency, some peculiarities of the user per se or the physical world he is located (time/location/identity, etc.), so as to obtain peculiar service experiences (e.g., obtaining different discounts) corresponding to different peculiarities.

Figure 25:
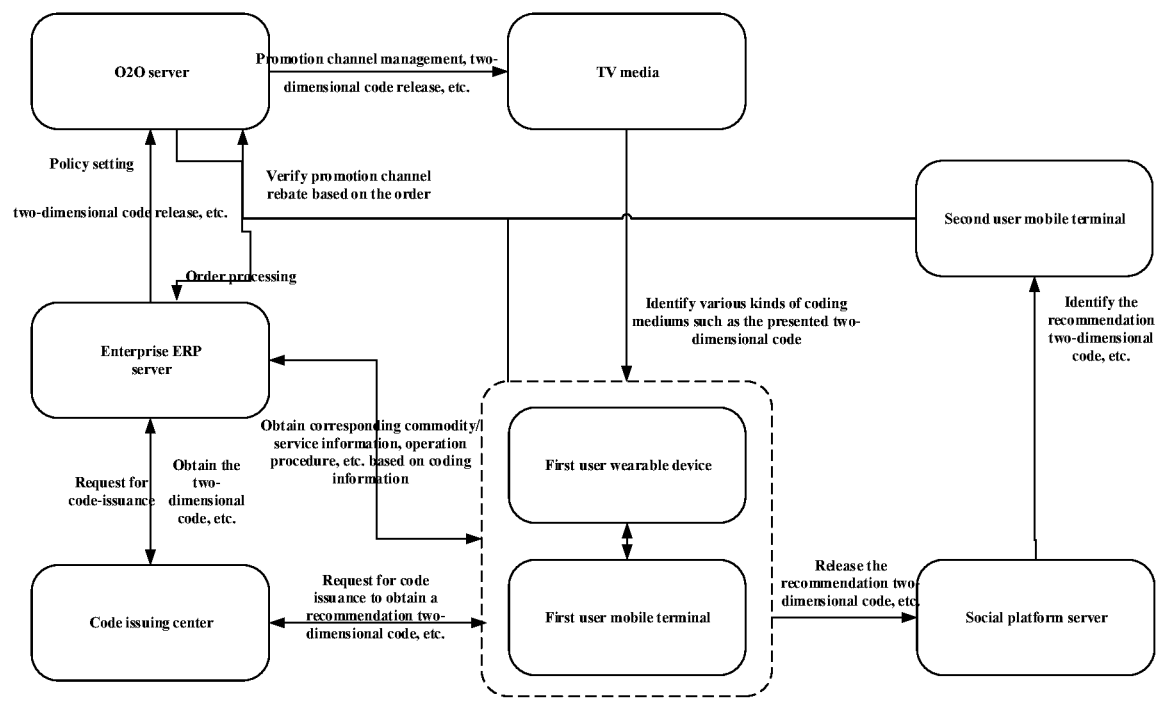
FIG. 25 is a schematic diagram of an exemplary structure of an information processing method based on uniform code issuing in the seventeenth embodiment of the present disclosure.

As shown in FIG. 25, in an application example, enterprise A prepares, through a background server, for a new product AP to be launched to the market. In an enterprise ERP server (including e-commerce processing), the sales amount and sales revenues of the new product AP are preset; the two-dimensional code is generated by the code issuing center according to a predefined rule, which is released through a television release channel and a store release channel.

In addition, a certain percentage (AP %) of the sales revenues of the product AP is extracted as a promotion fee for marketing, which is paid with a contacted third-party server (which may be prepaid or paid by stages). This manner covers advertising platforms such as TV stations, organizers of multi-level dissemination, two-dimensional code design and/or technology manufacturers, and server administrators, etc.

The two-dimensional code is released through TV stations. Consumers wear glasses, headphones or other wearable components when watching TV programs. The user may manipulate a built-in camera of the eyewear to shoot the two-dimensional code displayed at any time on the screen, without a need to take out a mobile terminal to start a shooting action, which is more user-friendly.

In addition to a two-dimensional code visible to human eyes, an invisible two-dimensional code may also be played on the screen for example by controlling the display frequency through a TV set-top box. The optical lattice corresponding to the invisible two-dimensional code is unidentifiable to naked eyes, but may be identified by a corresponding obtaining module of an eyewear, decoded and parsed by a decoder and a coded information parsing module embedded in corresponding client software.

As long as the consumer stared at the TV picture for several seconds (it may be set to other duration), the optical lattice may be automatically captured to start the execution flow of various set operations. The eyewear, watch, and mobile terminal in this example may all be embedded with a sense core engine. The sense core engine is a software/middleware, which drives the optical camera to identify optical signals of the optical lattice. The original optical information as read applies the two-dimensional code coding/identification principle, and after undergoing classified identification, error correction, matching, screening and/or signal format conversion, operation instructions corresponding to respective parties such as the eyewear, the mobile terminal, and the background server. The operation instructions are transmitted to the background server by the eye glass or mobile terminal, and by further processing based on transaction management according to corresponding rules, the following functions are implemented, such as download, opening APP, e-commerce, transaction and payment.

The eyewear drives a mobile terminal (or watch, or laptop, etc.) that is wired or wirelessly connected to itself to communicate with the background server. Introduction of the product AP returned from the background server is watched by opening the client software of the mobile terminal of the consumer (this product introduction may also be presented on the eyewear lens or the television screen). In addition, the consumer may also interact with the background server through the mobile terminal to post comments, answer survey questions, receive coupons, etc.; a recommended two-dimensional code may be re-generated by a code issuing center and released to other users, such that the mobile terminal becomes a lower level of sales representative of the product AP two-dimensional code developed through the TV channel.

An order is placed by scanning, with the mobile terminal or eyewear or like part, the payment two-dimensional code presented on the TV screen or mobile phone screen (or an order placement request is sent through a menu of the set-top box presented on the screen), and the coded information is first parsed and verified by the server. After the verification is completed, the coded information is passed to the O2O server (private to the enterprise) to implement functions such as TV channel management, and then passed to the enterprise ERP server to complete order processing. The order processing result is fed back to an order processing serve to perform rebate calculation. The server extracts a corresponding percentage from the advance payment to returns to respective corresponding parties including the mobile terminal (the user of the mobile terminal has the payment/payment collection account bound to the mobile terminal), the TV station, and the two-dimensional code technology manufacturing party, and a third-party server.

Figure 26:
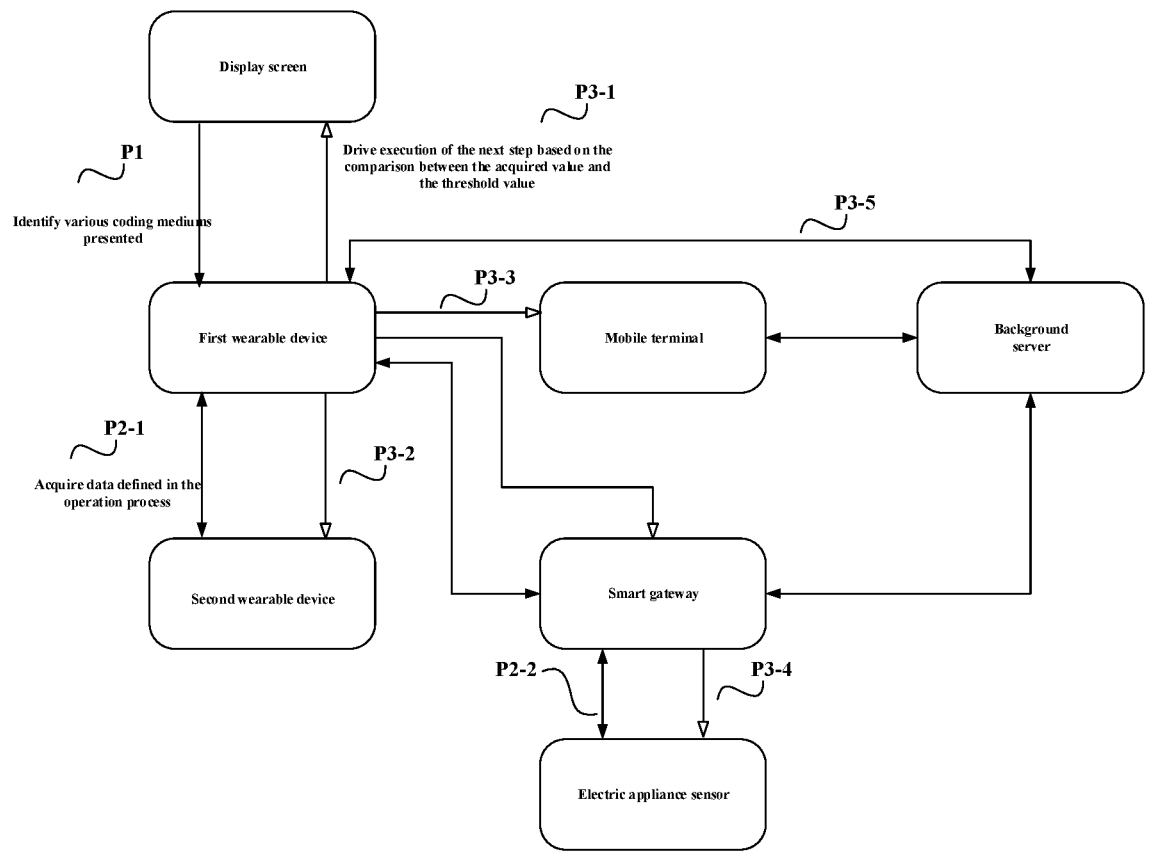
FIG. 26 is a schematic diagram of another exemplary structure of an information processing method based on uniform code issuing in the seventeenth embodiment of the present disclosure.

As shown in FIG. 26, in another example, a system capable of providing exercise guidance to a user is provided, wherein when the user wears a first wearable device (such as an eyewear) to watch a fitness video through an eyewear lens or through a screen of a television/mobile terminal, as indicated in P1, the eyewear identifies the two-dimensional code (which is preferably not visible to naked eyes; or in another example, a digitalized acoustic wave loaded in the video, which is preferably unidentifiable by human ears, but identifiable through earphones; the coded information of the two-dimensional code corresponds to a set of operation procedures required to be executed by relevant devices.

In view that the devices such as the eyewear, watch, earphone, mobile terminal, TV set-top box in the system are connected with each other in a wired or wireless way, or perform information interaction through a home smart gateway, when the operation flow defined in the coded information of the two-dimensional code may be parsed out by the client software of the mobile terminal, the operation flow is notified to other devices mentioned above such that they may know the operations to be performed thereby.

Therefore, after the eyewear or the mobile terminal connected with the eyewear identifies the two-dimensional code, it issues a control signal that drives a sensor in a second wearable device to detect according to a defined flow (as shown in P2-1). The second wearable device, for example, a smart watch worn by the user, may detect the user's heart rate; or, it is clothes covering the entire body of the user, wherein sensors are embedded in different parts of the corresponding body to detect body conditions such as heartbeat, blood pressure, sweating, etc.

The second wearable device detects physical conditions of the user in real time as the user moves along with the video according to the operation flow defined in the codes of the two-dimensional code; when it is judged that the detection result reaches a certain predefined threshold (such as too fast heartbeat), the second wearable device sends a request for "smart alert" to the eyewear or the mobile terminal.

According to the request, a prompt statement or prompt video for playing "deepen the breath and relaxing the abdomen" is triggered on the display screen of the eyewear or the mobile terminal (or the eyewear or the mobile terminal drives the set top box to display it the display screen of the television), or, the prompt statement (for example, P3-1) is played by an earpiece driven by the eyewear or mobile terminal, to guide the user to adjust his actions.

Supposing that the second wearable device determines that the detection result of the user's body is another threshold, according to the defined operation, an instruction may be issued to drive another device to perform a prompt request for another statement, or an instruction may be issued to switch to the next video. In addition, besides issuing commands based on the detection results of the user's body, respective devices such as the eyewear, smart watch, or mobile terminal may also detect other physical world peculiarities or combinations thereof (e.g., the built-in clock of the mobile terminal shows overtime of exercise) with a built-in or external sensor, for issuing instructions to other devices in the system (e.g., issuing a "turn off the video" instruction to the TV set-top box), or further interact with agencies outside the system to send control commands or transmit data such as the user's current exercise conditions (for example, the first and second wearable devices or the mobile terminal release the user's exercise duration on the social network platform by interacting with the background server, and the platform's server or core server grants different bonuses corresponding to the exercise duration with respect to the user's exercise conditions), as shown in P3-2, P3-3, P3-4, and P3-5.

In some different examples, the work of judging the acquired values and the set thresholds may be performed by the second wearable device or may be performed by the first wearable device or the mobile terminal according to different defined operating procedures. According to the judgment result, the device executing the judgment itself or the other device driven thereby performs the subsequent operations specified in the flow. The subsequent operations may be performed by one device or may be performed by interaction with other devices.

In another example, other sensors may be driven to detect by identifying various forms of two-dimensional codes. For example, the two-dimensional code in the form of optical lattice is provided on a smart furniture (for example, a set of light sources on an outer surface of a refrigerator embodies the optical lattice by light and dark changes according to a coding pattern of the two-dimensional code). For example, an initial two-dimensional code in the form of optical lattice is displayed first. A wearable device (such as eyewear) worn by the user identifies it, and then issues, based on a flow defined by the coded content, an instruction to drive the refrigerator to detect. The refrigerator receives the instruction, detects stored amounts for different foods in the refrigerator (for example, P2-1) through the built-in sensor; a second two-dimensional code indicating the stored amounts is generated under authorization of the code issuing center, wherein the two-dimensional code is represented in an optical lattice form. Then, the wearable device automatically continuously scans the two-dimensional code presented on the refrigerator within a set time, until obtains a second two-dimensional code to identify to thereby the stored amounts of foods in the refrigerator. For another example, when the refrigerator detects that the amount of a certain food storage is zero, it incorporates an instruction to ask the wearable device to purchase in the coded information of a generated third two-dimensional code; then, after identifying the two-dimensional code, the wearable device may also purchase foods by interacting with the server of platform or the server of a merchant stationing in the platform based on the link to the e-commerce platform included therein, and the e-commerce platform notifies the server of a logistics company to deliver goods. The function of the wearable device in this example can also be accomplished by a mobile terminal or other similar enterprise to deliver the goods. In this example, the functions of the wearable device may also be implemented by the mobile terminal or other similar devices. The approach in this example may also be applied to a scenario where a salesperson identifies, with a wearable device, a two-dimensional code of checking goods inventory.

Although the contents of the present disclosure have been described in detail through the foregoing preferred embodiments, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

I claim:

1. An information processing method based on uniform code issuance, comprising, when any interacting party in a plurality of interacting parties acts as a releaser, sending a corresponding code issuing request to an interacting party as a core administrator among the plurality of interacting parties and forwarding identification information of the releaser to the core administrator to request a coding medium that matches information provided by the releaser; and receiving, by the core administrator, the corresponding code issuing request, and generating, by the core administrator or a code issuing agency authorized by the core administrator, the coding medium, such that when any interacting party in the plurality of interacting parties, which acts as an accessing party, identifies the coding medium with an equipped sensing access device, it may obtain information that matches the identified coding medium and further obtain information provided by the releaser;

wherein the information provided by the releaser includes any or any combination of the following: information to be released by the releaser, attribute state of the releaser, attribute state of an interacting party associated with the releaser, and information obtained from identifying other coding medium with the sensing access device equipped to the releaser;

wherein the sensing access device is further configured to:
obtain, by an obtaining module, a coding medium of a corresponding type;

wherein the obtained coding medium may be decoded by a decoding unit of the sensing access device or a decoding unit of other interacting party to obtain coded information;

further, the coded information decoded may be parsed by a coded information decoding unit of the sensing access device or a coded information parsing unit of other interacting party to obtain information that matches the coded information; and interact, by a sending/receiving unit, with other interacting party and with other units of the sensing access device; and wherein the any interacting party is further configured to:
interact, by a sending/receiving unit, with other interacting party and with other units of a background server.

2. The information processing method according to claim 1, wherein:

any interacting party in the plurality of interacting parties has one or more identification information corresponding thereto; each identification information of the any interacting party satisfies any one or any combination of the following:

the identification information corresponding to execution of any operation by the any interacting party is used for binding an execution condition of the operation to the interacting party;

the any interacting party, after superimposing the identification information of the any interacting party to the information to be released, directly releases the information superimposed with said identification information; and the interacting party receiving the released information determines, by identifying the identification information, the interacting party that provides the released information; and the any interacting party when acting as the releaser, after superimposing the identification information of the any interacting party to the information to be released, provides the information superimposed with the identification information to the core administrator or the code issuing agency authorized by the core administrator to generate the corresponding coding medium, and release the coding medium; the accessing party identifies the corresponding coding medium to obtain a binding relationship between the coding medium and the releaser.

3. The information processing method according to claim 2, wherein:

when any interacting party as a first releaser is sending a first code issuing request, the information provided at least includes identification information of the first releaser; and the releaser obtains a first coding medium generated based on the first code issuing request; any other interacting party acting as the accessing party identifies the first coding medium through the equipped sensing access device to at least obtain the identification information of the first releaser, and the information provided when it sends, as a second releaser, a second code issuing request at least includes the identification information of the first releaser and the identification information of the second releaser, to thereby bind the second coding medium generated based on the second coding request with the first releaser and the second releaser, such that by identifying the second coding medium, the binding relationship may be known.

4. The information processing method according to claim 3, wherein:

the first releaser and an interacting party associated therewith constitute a first ad-hoc interactive network centered about the first releaser;

the second releaser accesses to the first ad-hoc interactive network by identifying the first coding medium, causing the second releaser and the first releaser to be associated with each other, and causing a second ad-hoc interactive network, which is formed by the second releaser and an interacting party associated therewith and centered about the second releaser, to be integrated with the first ad-hoc interactive network; and the second accessing party accesses to the second ad-hoc interactive network by identifying the second coding medium and meanwhile accesses to the first ad-hoc interactive network, so as to be associated with the first releaser and the second releaser.

5. The information processing method according to claim 4, wherein:

the releaser sends a code issuing request to the core administrator and at least includes service information in the information provided; the service information corresponds to a service provided by an interacting party acting as a service agency among the plurality of interacting parties; the core administrator or the code issuing agency authorized by the core administrator generates a corresponding coding medium based on the code issuing request;

the accessing party identifies the coding medium through the equipped sensing access device to at least obtain the service information; by sending a service providing request to the service agency, the accessing party enables itself or an appointed interacting party to obtain a service corresponding to the service information; and the service corresponding to the service information is provided by one service agency or provided by cooperation from a plurality of service agencies; an interacting party eligible as the service agency includes: the core administrator, the releaser, the interacting party associated with the releaser, the accessing party, and the interacting party associated with the accessing party.

6. The information processing method according to claim 5, wherein:
the service provided by the service agency or the service information corresponding thereto matches an execution condition of a set operation and/or a set attribute state;
the set operation includes an operation prescribed to be independently executed by an appointed interacting party among the plurality of interacting parties or an operation executed by cooperation from some appointed interacting parties among the plurality of interacting parties; and
the set attribute state refers to a state of one attribute or a superimposition of states of a plurality of attributes corresponding to one appointed interacting party in the plurality of interacting parties, or a superimposition of respective corresponding attribute states of appointed some interacting parties among the plurality of interacting parties.

7. The information processing method according to claim 6, wherein:
the attribute corresponding to any interacting party in the plurality of interacting parties satisfies any one or any combination of the following:
state of one or some attributes of the any interacting party, which is adjusted with variation of state of another one or some attributes of the any interacting party;
state of one or some attributes of the any interacting party, which is adjusted with variation of state of one or some attributes of an interacting party associated with the any interacting party;
state of one or some attributes of the any interacting party, which is adjusted with variation of execution condition of a set operation of the any interacting party; and
state of one or some attributes of the any interacting party, which is adjusted with variation of execution condition of a set operation of an interacting party associated with the any interacting party.

8. The information processing method according to claim 1, wherein:
one attribute of any interacting party refers to a physical world characteristic corresponding to the interacting party; the physical world characteristic corresponds to any one of the following or any combination thereof of a real environment and/or a virtual environment where the interacting party is currently located: time parameter, location parameter, ambient parameter, and state of another one or some attributes of the interacting party per se.

9. The information processing method according to claim 1, wherein:
one of the attributes of any interacting party refers to a monetary share of the interacting party, an entirety or portion of the monetary share of the any interacting party being distributable and adjustable among appointed some interacting parties;
the monetary share of the any interacting party is obtained or adjusted according to any one or a combination of the following manners:
the any interacting party obtains a matching monetary share by pledging assets to the core administrator or an appointed approval authority or an appointed other interacting party;
the any interacting party obtains a monetary share of a corresponding percentage through exchanging by paying a currency of any kind to the core administrator or an appointed approval authority or an appointed other interacting party;
the any interacting party obtains a monetary share or the currency exchangeable to the monetary share of a corresponding percentage paid to the any interacting party by the core administrator or an appointed approval authority or an appointed other interacting party; and
appointment of the approval authority or other interacting party is implemented by the any interacting party, or the core administrator, or an interacting party associated with the any interacting party.

10. The information processing method according to claim 1, wherein:
the identification information of any interacting party is used as one of the attributes of the interacting party; when the any interacting party as a releaser sends a corresponding code issuing request during executing an operation set thereto, the information simultaneously provided to the core administrator at least includes the identification information of the interacting party and the information about its executing condition of the set operation, thereby binding the coding medium generated based on the corresponding code issuing request with the releaser's execution condition of the set operation, such that the binding relationship may be known by identifying the corresponding coding medium.

11. The information processing method according to claim 1, wherein:
attributes corresponding to the any interacting party are recoded, and states thereof are adjusted, separately by one or more attribute management agencies or by cooperation from the plurality of attribute management agencies; and
the attribute management agency refers to any one of the following: the any interacting party, an interacting party associated with the any interacting party, the core administrator, and an external device appointed by the core administrator.

12. The information processing method according to claim 11, wherein:
one of the attributes of the any interacting party refers to association information about an association between the interacting party and other interacting party; and when the any interacting party is executing the set operation and/or adjusting the set attribute state, the attribute management agency may adjust the attribute state of the interacting party associated with the any interacting party.

13. The information processing method according to claim 11, wherein: one of the attributes of the any interacting party refers to a set weight index corresponding to the interacting party; based on the weight index, the attribute management agency may coordinately adjust different attributes of a same interacting party or coordinately adjust a same attribute of different interacting parties.

14. The information processing method according to claim 1, wherein:
an interactive network exists between a first interacting party and an interacting party associated therewith; a second interacting party and a third interacting party access to the interactive network, respectively, to be associated with the first interacting party, respectively; information released by the second interacting party to the first interacting party includes any one or any combination thereof: shared information, search request information, and help request information; the first interacting party sends the shared information to the third interacting party in the interactive network;

the first interacting party searches, based on the search request information, reply information associated with the search request information in the interactive network, and sorts the reply information to form a search request, and then pushes the search result to the second interacting party; the reply information is provided by the third interacting party to the first interacting party; and the first interacting party sends the help request information to the third interacting party in the interactive network to facilitate the third interacting party to provide the reply information to the first interacting party based on the search request information.

15. The information processing method according to claim 14, wherein:

a plurality of first interacting parties are provided, which correspond to a same motif or a plurality of different motifs, respectively; the second interacting party is associated with the first interacting parties having a corresponding motif based on one or more identification information of the first interacting parties;

the first interacting party of one motif or a fourth interacting party associated therewith, as the first releaser, releases a first coding medium obtained to the second interacting party; and the second interacting party, after identifying as a first accessing party information corresponding to the first coding medium, releases as a second releaser a second coding medium generated based on the information provided by the second releaser to the first interacting party of other motif.

16. The information processing method according to claim 15, wherein:

the first interacting parties of a plurality of motifs adjust, based on a secondary weight index, attribute states under corresponding identification information of the second interacting parties associated with them respectively; and the core administrator receives attribute states under the corresponding identification information of the second interacting parties, which are provided by the respective first interacting parties, and comprehensively adjusts the attribute states under all identification information of the second interacting parties based on a comprehensive weight index.

17. The information processing method according to claim 1, wherein:

the code issuing agency refers to a generating unit equipped to the releaser that sends a corresponding code issuing request, or a generating unit equipped to other interacting party than the releaser, or a third-party generating device other than the plurality of interacting parties; and the core administrator stipulates or updates coding rules and decoding rules matching the coding rules, such that the core administrator or a code issuing mechanism authorized thereby may generate corresponding coded information based on uniform coding rules and generate a corresponding coding medium based on the coded information; and a sensing access device based on the matching decoding rules may identify corresponding coded information from the coding medium as well as the information provided by the releaser.

18. The information processing method according to claim 17, wherein:

any interacting party as a policy releasing mechanism stipulates or updates a policy associated with the information provided by the releaser;

the policy includes a service providing policy associated with the information provided by the releaser, and/or the attribute adjustment policy associated with the attribute state provided by the releaser; and policy appointment and update by the policy releasing mechanism matches the execution condition of the set operation and/or the set attribute state.

19. The information processing method according to claim 18, wherein:

execution logic of the set operation of the appointed one or more interacting parties among the plurality of interacting parties is set in the policy of the policy releasing mechanism, such that the corresponding coding medium generated based on the coding rules matching the policy includes an instruction that drives the corresponding interacting party to execute the set execution logic; and the sensing access device of the corresponding interacting party obtains the instruction by identifying the coding medium based on the matching decoding rules.

20. The information processing method according to claim 19, wherein:

a plurality of second interacting parties are associated with a same first interacting party, respectively;

the first executing party sets the execution logic of an operation; the operation with the execution logic being set includes any one or any combination of the following: independent operation of respective second interacting party, interactive operations between the plurality of second interacting parties, and interactive operations between the second interacting parties and the first interacting party; and the first interacting party provides the execution logic to the core administrator, such that the coding medium generated by the core administrator or the code issuing agency authorized thereby based on the corresponding code issuing request from the first interacting party or the second interacting party includes an instruction that drives the first interacting party and/or the second interacting party to execute a corresponding operation set with the execution logic; the first interacting party or the second interacting party obtains the instruction by identifying the coding medium through their respective sensing access device.

21. The information processing method according to claim 20, wherein:

the plurality of first interacting parties are associated with a same third-party interacting party, and information interaction between the first interacting party and the core administrator is uniformly implemented by the third interacting party;

the third executing party sets the execution logic of an operation; the operation with the execution logic being set includes any one or any combination of the following: independent operation of respective first interacting party or second interacting party, interactive operations between the plurality of second interacting parties, interactive operations between a plurality of second interacting parties, and interactive operations between the second interacting parties and the first interacting party; and when an operation with execution logic being set is set with corresponding identification information and the corresponding interacting party executes any step of the operation with execution logic being set, the third interacting party provides the identification information of the operation and the identification information of the interacting party executing the operation to the core administrator to cause the generated coding medium to at least include the identification information, such that any interacting party may obtain execution conditions of respective steps in the operation by identifying the coding medium.

22. The information processing method according to claim 17, wherein:
the decoding rules matching the coding rules are set in client software; the sensing access device decodes the coding medium matching the coding rules through the client software to obtain corresponding coded information, parses the corresponding coded information to obtain parameters included in the coding medium, and automatically imports the parameters into the automatically boosted client software; and
for an unidentifiable coding medium, the sensing access device automatically installs the decoding client software or updates the decoding rules in the decoding client software or issue an error prompt.

23. The information processing method according to claim 1, wherein:
the releaser may release the coding medium to at least one region identifiable by the accessing party by any one or any combination of the following:
the releaser sends the corresponding coding medium to the sensing access device of the accessing party;
the releaser includes a device that may provide the at least one region and releases the corresponding coding medium through the device; and
the releaser sends the corresponding coding medium to a device that may provide the at least one region and releases the corresponding coding medium through the device.

24. The information processing method according to claim 1, wherein:
based on the information provided by the releaser, the core administrator or the code issuing agency authorized thereby generates a matching coding medium or generates a coding medium and a corresponding hyperlink; and
the coding medium refers to any one or any combination thereof: a bar code image where the coded information is generated in a pattern of one-dimensional code, two-dimensional code, or multi-dimensional code; an optical lattice diagram where the coded information is generated in a form of light-shadow ray or refurbishing frequency variation or in a form of visible light or UV or infrared light or polarized light; and a digitalized acoustic wave or radio wave generated with a specific law or a specific frequency variation pattern; and
the sensing access device includes a device that may identify a corresponding type of coding medium and/or hyperlink.

25. The information processing method according to claim 24, wherein
the sensing access device is further configured to
perform any one or any combination of the following:
decoding, by a decoding unit, the obtained coding medium to obtain coded information;
parsing, by a coding information parsing unit, the obtained coded information to obtain information that matches the coded information;
inputting, by an input unit, input information involved in interaction;
outputting, by an exhibiting unit, content identified from the coding medium and content involved in interaction;
generating, by a coding medium generating unit, the coding medium under authorization from the core administrator;
wherein the obtaining module and the sending/receiving unit of the sensing access device are configured in an interacting device,
wherein one or more of the decoding unit, the coding information parsing unit, the input unit, the exhibiting unit, and the coding medium generating unit are configured in the interacting device or one or more other interacting devices that are signal connected with the interacting device;
wherein the interacting device is a mobile terminal, or a stationary terminal, or a wearable device; the interacting device is provided with an internal sensor or signal connected with an external sensor to acquire attribute states of the interacting party.

26. The information processing method according to claim 24, wherein
any interacting party is further configured to
perform any one or any combination of the following:
storing, by a built-in or external database, various information data during an interaction process;
decoding, by a decoding unit, the coding medium obtained by the interacting party to obtain coded information;
parsing, by a coded information parsing unit, the obtained coded information to obtain information that matches the coded information;
inputting, by an input unit, input information involved in interaction;
outputting, by an exhibiting unit, content identified from the coding medium and content involved in interaction;
generating, by a coding medium generating unit, the coding medium under authorization from the core administrator;
sending, by the sending/receiving unit included in an interacting party as a releaser, a code issuing request to the core administrator and receiving the generated coding medium, and is further configured for releasing the obtained coding medium to at least one region identifiable by the accessing party;
receiving, by the sending/receiving unit included in an interacting party as a code issuing agency, an authorization sent from the core administrator to allow the code issuing agency to autonomously generate the coding medium, such that the coding medium generating unit of the code issuing agency generates the coding medium under the authorization from the core administrator;
formulating or updating, by an access defining unit of an interacting party as a policy releasing mechanism, a policy associated with the information provided by the releaser, and sending the policy to the core administrator through the sending/receiving unit of the interacting party as the policy releasing mechanism; and
receiving, by the sending/receiving unit of an interacting party as a core server, the code issuing request sent from the releaser or releasing the generated coding medium to the releaser or an interacting party appointed by the releaser; the interacting party as the core server further include: a coding medium generating unit configured for generating a matching coding medium from the information provided by the releaser;

wherein the core server is further configured to perform any one or any combination of the following:

verifying, by a verifying unit and based on the code issuing request from the releaser, whether a code issuing agency appointed by the code issuing request has rights for autonomously generating a coding medium; wherein when the appointed code issuing agency has rights for autonomously generating a coding medium, the sending/receiving unit of the interacting party as the core server sends, to the appointed code issuing agency, an authorization of allowing the code issuing agency to autonomously generate the coding medium; and formulating or updating, by a rule managing unit, the coding rules and the decoding rules matching the coding rules based on the policy provided by the policy releasing agency.

27. The information processing method according to claim 14, wherein: any interacting party has disclosure rights set with respect to the information received thereby and/or sent therefrom, the disclosure rights being configured for defining a plurality of conditions for receiving and/or sending information; wherein some conditions include attribute states of the any interacting party, or attribute states of other interacting party.

28. A sensing access device used by an entity person, wherein:

the sensing access device identifies a coding medium released in at least one region identifiable by the entity person to obtain information that matches the identified coding medium;

the sensing access device identifies the coding medium to cause an interacting party with the entity person as a body to access to an ad-hoc interactive network constructed with a releaser of the coding medium as the center, such that the entity person may interact via the sensing access device with the releaser or other interacting party associated with the releaser in the ad-hoc interactive network;

the coding medium is generated by a core administrator or a code issuing agency authorized thereby based on the information, which comprises identification information of the releaser, provided by the releaser in response to a code issuing request sent from the releaser to an interacting party as the core administrator;

the sensing access device further includes:

an obtaining module configured for obtaining a coding medium of a corresponding type; wherein the obtained coding medium may be decoded by a decoding unit of the sensing access device or a decoding unit of other interacting party to obtain coded information; further, the coded information decoded may be parsed by a coded information decoding unit of the sensing access device or a coded information parsing unit of other interacting party to obtain information that matches the coded information; and a sending/receiving unit configured for interacting with other interacting party and for interacting with other units in the sensing access device.

29. The sensing access device according to claim 28, wherein:

the interacting party with the entity person as the body has one or more identification information corresponding thereto; each identification information of the interacting party satisfies any one or any combination of the following:

corresponding the identification information when the interacting party is performing any operation is used for binding an execution situation of the operation to the interacting party;

the interacting party, after superimposing the identification information of the interacting party to the information to be released to the outside, directly releases the information superimposed with said identification information; and the interacting party receiving the released information determines, by identifying the identification, the interacting party that provides the released information; and when the interacting party acts as a second releaser, after superimposing the identification information of the interacting party to the information to be released to the outside, provides the information superimposed with the identification information to the core administrator or the authorized code issuing agency to generate a corresponding second coding medium, and releases the second coding medium; by identifying the second coding medium, a binding relationship between the second coding medium and the interacting party as the second releaser may be known.

30. The sensing access device according to claim 29, wherein:

the first releaser and an interacting party associated therewith constitute a first ad-hoc interactive network centered about the first releaser; the interacting party with the entity person as the body acting as a first accessing party identifies, through the sensing access device, the first coding medium released by the first releaser and is accessed to the first ad-hoc interactive network; and an interacting party with an entity person as the body further acts as a second releaser to release a second coding medium; another interacting party as a second accessing party identifies the second coding medium through another sensing access device equipped to realize association with the second releaser, thereby causing the second accessing party to access to a second ad-hoc interactive network, which is formed by the second releaser and an interacting party associated therewith and centered about the second releaser, and meanwhile access to the first ad-hoc interactive network, such that the second ad-hoc interactive network is integrated with the first ad-hoc interactive network.

31. The sensing access device according to claim 30, wherein:

wherein the information provided by any releaser, when requesting the core administrator or the code issuing agency authorized thereby to generate the corresponding coding medium, includes any or any combination of the following: information to be released by the releaser, attribute state of the releaser, attribute state of an interacting party associated with the releaser, and information obtained from identifying other coding medium with the sensing access device equipped to the releaser.

32. The sensing access device according to claim 31, wherein:

among a plurality of interacting parties, an interactive network exists between a first interacting party and an interacting party associated therewith; a second interacting party and a third interacting party access to the interactive network, respectively, to be associated with the first interacting party, respectively; the respective interacting parties perform information interaction with other interacting parties through their respective sensing access devices; and information released by the second interacting party to the first interacting party includes any one or any combination thereof:

shared information, search request information, and help request information;

the first interacting party sends the shared information to the third interacting party in the interactive network; the first interacting party searches, based on the search request information, reply information associated with the search request information in the interactive network, and sorts the reply information to form a search request, and then pushes the search result to the second interacting party; the reply information is provided by the third interacting party to the first interacting party; and the first interacting party sends the help request information to the third interacting party in the interactive network to facilitate the third interacting party to provide the reply information to the first interacting party based on the search request information.

33. The sensing access device according to claim 28, wherein:

at least one region identifiable by the entity person refers to at least one physical grid in a real environment and/or virtual environment where the interacting party with the entity person as the body; and based on any one or any combination of the parameter conditions below, the real environment and/or virtual environment is divided to form corresponding physical grids: time parameter, location parameter, ambient parameter, and state of one or more other attribute of the interacting party per se.

34. The sensing access device according to claim 30, wherein:

any releaser releases the coding medium through any one or any combination of the following manners:

the releaser sends the corresponding coding medium to the sensing access device of the accessing party;

the releaser includes a device that may provide at least one region identifiable by the accessing party, through which device, a corresponding coding medium is released to facilitate the sensing access device of the accessing party to identify the coding medium; and the releaser sends the corresponding coding medium to a device that may provide at least one region identifiable by the accessing party, through which device, a corresponding coding medium is released to facilitate the sensing access device of the accessing party to identify the coding medium.

35. The sensing access device according to claim 28, wherein:

the accessing party identifies the corresponding coding medium through the sensing access device to obtain information provided by the releaser, or requests a service provided by an interacting party as a service agency in the plurality of interacting parties based on the service information;

the service information or a service corresponding thereto matches an execution condition of a set operation and/or a set attribute state;

the set operation includes an operation prescribed to be independently executed by an appointed interacting party among the plurality of interacting parties or an operation executed by cooperation from some appointed interacting parties among the plurality of interacting parties; and the set attribute state refers to a state of one attribute or a superimposition of states of a plurality of attributes corresponding to one appointed interacting party in the plurality of interacting parties, or a superimposition of respective corresponding attribute states of appointed some interacting parties among the plurality of interacting parties;

the plurality of interacting parties include: a core administrator, a releaser, an interacting party associated with the releaser, an accessing party, and an interacting party associated with the accessing party.

36. The sensing access device according to claim 35, wherein:

some attributes of any interacting party in a plurality of interacting parties include: physical world characteristic of a physical grid where the interacting party is located; monetary share that may be distributed and adjusted by the interacting party and circulated between appointed interacting parties; identification information of the interacting party; association information about mutual association between the interacting party and other interacting party; weight index for adjusting other attribute states of the interacting party.

37. The sensing access device according to claim 28, wherein:

decoding rules matching the coding rules based on which the coding medium is generated by the core administrator or under its authorization according to coding rules are set in client software;

the sensing access device decodes the coding medium matching the coding rules through the client software to obtain corresponding coded information, parses the corresponding coded information to obtain parameters included in the coding medium, and automatically imports the parameters into the automatically boosted client software; and for an unidentifiable coding medium, the sensing access device automatically installs the decoding client software or updates the decoding rules in the decoding client software or issue an error prompt.

38. The sensing access device according to claim 28, wherein:

the sensing access device includes a module that may identify a corresponding type of coding medium and/or a module that may identify a hyperlink to content corresponding to the coding medium;

the coding medium refers to any one or any combination of the following: a bar code image where the coded information is generated in a pattern of one-dimensional code, two-dimensional code, or multi-dimensional code; an optical lattice diagram where the coded information is generated in a form of light-shadow ray or refurbishing frequency variation or in a form of visible light or UV or infrared light or polarized light; and a digitalized acoustic wave or radio wave generated with a specific law or a specific frequency variation pattern.

39. The sensing access device according to claim 38, wherein:
the sensing access device includes additional parts including any one or any combination of the following:
a decoding unit configured for decoding the obtained coding medium to obtain coded information;
a coded information parsing unit configured for parsing the obtained coded information to obtain information that matches the coded information;
an input unit configured for inputting input information involved in interaction; an exhibiting unit configured for outputting content identified from the coding medium and content involved in interaction;
a coding medium generating unit configured for generating the coding medium under authorization from the core administrator;
wherein the obtaining module and the sending/receiving unit of the sensing access device are configured in an interacting device;
wherein one or more of the decoding unit, the coding information parsing unit, the input unit, the exhibiting unit, and the coding medium generating unit are configured in the interacting device or one or more other interacting devices that are signal connected with the interacting device;
wherein the interacting device is a mobile terminal, or a stationary terminal, or a wearable device; the interacting device is provided with an internal sensor or signal connected with an external sensor to acquire attribute states of the interacting party.

40. An information processing network based on uniform code issuance, wherein,
the information processing network comprises a plurality of interacting parties, including:
a core administrator that, based on a received code issuing request, autonomously generates a coding medium matching the code issuing request or authorizes, after verifying rights of a code issuing agency, the code issuing agency to generate a coding medium matching the code issuing request;
any interacting party as a releaser, which sends the code issuing request and provides information, which comprises identification information of the releaser, to the core administrator and obtains the coding medium that is generated by the core administrator or an authorized code issuing agency and matches the provided information; and
any interacting party as an accessing party, which identifies, through a sensing access device equipped thereto, the coding medium released to at least one region identifiable by the accessing party, to obtain information that matches the identified coding medium and further obtain information provided by the releaser of the identified coded information; and
wherein the information provided by the releaser includes any or any combination of the following: information to be released by the releaser, attribute state of the releaser, attribute state of an interacting party associated with the releaser, and information obtained from identifying other coding medium with the sensing access device equipped to the releaser,
the sensing access device configured to the interacting party at least acting as an accessing party comprises:
an obtaining module configured for obtaining a coding medium of a corresponding type; wherein the obtained coding medium may be decoded by a decoding unit of the sensing access device or a decoding unit of other interacting party to obtain coded information; further, the coded information decoded may be parsed by a coded information decoding unit of the sensing access device or a coded information parsing unit of other interacting party to obtain information that matches the coded information; and
a sending/receiving unit configured for interacting with other interacting party and for interacting with other units in the sensing access device; and
the any interacting party comprising:
a sending/receiving unit configured for interacting with other interacting party and for interacting with other units of a background server.

41. The information processing network according to claim 40, wherein:
any interacting party in the plurality of interacting parties has one or more identification information corresponding thereto; each identification information of the interacting party satisfies any one or any combination of the following:
corresponding the identification information when the interacting party is performing any operation is used for binding an execution situation of the operation to the interacting party;
the interacting party, after superimposing the identification information of the interacting party to the information to be released to the outside, directly releases the information superimposed with said identification information; and the interacting party receiving the released information determines, by identifying the identification, the interacting party that provides the released information; and
when the interacting party acts as a second releaser, after superimposing the identification information of the interacting party to the information to be released to the outside, provides the information superimposed with the identification information to the core administrator or the authorized code issuing agency to generate a corresponding second coding medium, and releases the second coding medium; by identifying the second coding medium, a binding relationship between the second coding medium and the interacting party as the second releaser may be known.

42. The information processing network according to claim 41, wherein:
the first releaser and an interacting party associated therewith constitute a first ad-hoc interactive network centered about the first releaser; a first accessing party identifies, through the sensing access device, the first coding medium released by the first releaser and is accessed to the first ad-hoc interactive network; and
the first accessing party further acts as a second releaser to release a second coding medium; another interacting party as a second accessing party identifies the second coding medium through another sensing access device equipped to realize association with the second releaser, thereby causing the second accessing party to access to a second ad-hoc interactive network, which is formed by the second releaser and an interacting party associated therewith and centered about the second releaser, and meanwhile is accessed to the first ad-hoc interactive network, such that the second ad-hoc interactive network is integrated with the first ad-hoc interactive network.

43. The information processing network according to claim 40, wherein:
   at least one region identifiable by the accessing party refers to at least one physical grid in a real environment and/or virtual environment where the accessing party is located; and
   based on any one or any combination of the parameter conditions below, the real environment and/or virtual environment is divided to form corresponding physical grids: time parameter, location parameter, ambient parameter, and state of one or more other attribute of the interacting party per se.

44. The information processing network according to claim 40, wherein:
   one or more attributes of any interacting party in the plurality of interacting parties are adjusted based on state change situations of respective one or more attributes of the interacting party or its associated interacting party, or adjusted based on change situations after superimposition of corresponding attributes of the interacting party or its associated interacting party; and
   some attributes of the any interacting party include: physical world characteristic of a physical grid where the interacting party is located; monetary share that may be distributed and adjusted by the interacting party and circulated between appointed interacting parties; identification information of the interacting party; association information about mutual association between the interacting party and other interacting party; weight index for adjusting other attribute states of the interacting party.

45. The information processing network according to claim 40, wherein:
   the code issuing agency refers to a generating unit equipped to the releaser that sends a corresponding code issuing request, or a generating unit equipped to other interacting party than the releaser, or a third-party generating device other than the plurality of interacting parties; and
   the core administrator stipulates or updates coding rules and decoding rules matching the coding rules, such that the core administrator or a code issuing mechanism authorized thereby may generate corresponding coded information based on uniform coding rules and generate a corresponding coding medium based on the coded information; and a sensing access device based on the matching decoding rules may identify corresponding coded information from the coding medium as well as the information provided by the releaser.

46. The information processing network according to claim 45, wherein:
   any interacting party as a policy releasing agency stipulates or updates a policy associated with the information provided by the releaser; the core administrator stipulates or updates corresponding coding rules and decoding rules based on the policy; and
   in the policy of the policy releasing agency, execution logic of a set operation of appointed one or more interacting parties among the plurality of interacting parties is set, such that the corresponding coding medium generated based on the coding rules matching the policy includes an instruction that drives the corresponding interacting party to execute the set execution logic; and the sensing access device of the corresponding interacting party obtains the instruction by identifying the coding medium based on the matching decoding rules.

47. The information processing network according to claim 46, wherein:
   the plurality of interacting parties have a plurality of interacting parties which are associated with a same third interacting party, and information interaction between the first interacting party and the core administrator is uniformly implemented by the third interacting party; each first interacting party has a plurality of second interacting parties associated therewith;
   the third executing party sets the execution logic of an operation; the operation with the execution logic being set includes any one or any combination of the following: independent operation of respective first interacting party or second interacting party, interactive operations between the plurality of second interacting parties, interactive operations between a plurality of second interacting parties, and interactive operations between the second interacting parties and the first interacting party; and
   when an operation with execution logic being set is set with corresponding identification information and the corresponding interacting party executes any step of the operation with execution logic being set, the third interacting party provides the identification information of the operation and the identification information of the interacting party executing the operation to the core administrator to cause the generated coding medium to at least include the identification information, such that any interacting party may obtain execution conditions of respective steps in the operation by identifying the coding medium.

48. The information processing network according to claim 42, wherein:
   among the plurality of interacting parties, an interactive network exists between a first interacting party and an interacting party associated therewith; a second interacting party and a third interacting party access the interactive network, respectively, to be associated with the first interacting party, respectively;
   information released by the second interacting party to the first interacting party includes any one or any combination thereof: shared information, search request information, and help request information;
   the first interacting party sends the shared information to the third interacting party in the interactive network;
   the first interacting party searches, based on the search request information, reply information associated with the search request information in the interactive network, and sorts the reply information to form a search request, and then pushes the search result to the second interacting party;
   the reply information is provided by the third interacting party to the first interacting party; and the first interacting party sends the help request information to the third interacting party in the interactive network to facilitate the third interacting party to provide the reply information to the first interacting party based on the search request information.

49. The information processing network according to claim 40, wherein:
   the coding medium refers to any one or any combination of the following: a bar code image where the coded information is generated in a pattern of one-dimensional code, two-dimensional code, or multi-dimensional code; an optical lattice diagram where the coded information is generated in a form of light-shadow ray or refurbishing frequency variation or in a form of visible light or UV or infrared light or polarized light; and a digitalized acoustic wave or radio wave generated with a specific law or a specific frequency variation pattern.

50. The information processing network according to claim 40, wherein:
the sensing access device configured to the interacting party at least acting as an accessing party comprises additional parts including any one or any combination of the following:
a decoding unit configured for decoding the obtained coding medium to obtain coded information;
a coded information parsing unit configured for parsing the obtained coded information to obtain information that matches the coded information;
an input unit configured for inputting input information involved in interaction;
an exhibiting unit configured for outputting content identified from the coding medium and content involved in interaction;
a coding medium generating unit configured for generating the coding medium under authorization from the core administrator;
wherein the obtaining module and the sending/receiving unit of the sensing access device are configured in an interacting device;
wherein one or more of the decoding unit, the coding information parsing unit, the input unit, the exhibiting unit, and the coding medium generating unit are configured in the interacting device or one or more other interacting devices that are signal connected with the interacting device;
wherein the interacting device is a mobile terminal, or a stationary terminal, or a wearable device; the interacting device is provided with an internal sensor or signal connected with an external sensor to acquire attribute states of the interacting party.

51. The information processing network according to claim 40, wherein:
the any interacting party includes
additional parts including any one or any combination of the following:
a built-in or external database for storing various information data during an interaction process;
a decoding unit configured for decoding the coding medium obtained by the interacting party to obtain coded information;
a coded information parsing unit configured for parsing the obtained coded information to obtain information that matches the coded information;
an input unit configured for inputting input information involved in interaction;
an exhibiting unit configured for outputting content identified from the coding medium and content involved in interaction;
a coding medium generating unit configured for generating the coding medium under authorization from the core administrator;
wherein the sending/receiving unit included in an interacting party as a releaser is configured for sending a code issuing request to the core administrator and receiving the generated coding medium, and is further configured for releasing the obtained coding medium to at least one region identifiable by the accessing party;
the sending/receiving unit included in an interacting party as a code issuing agency is configured for receiving an authorization sent from the core administrator to allow the code issuing agency to autonomously generate the coding medium, such that the coding medium generating unit of the code issuing agency generates the coding medium under the authorization from the core administrator;
wherein an interacting party as a policy releasing mechanism further comprises an access defining unit configured for formulating or updating a policy associated with the information provided by the releaser, and sending the policy to the core administrator through the sending/receiving unit of the policy releaser; and
the sending/receiving unit of an interacting party as a core server is configured for receiving the code issuing request sent from the releaser or releasing the generated coding medium to the releaser or an interacting party appointed by the releaser; the interacting party as the core server further include: a coding medium generating unit configured for generating a matching coding medium from the information provided by the releaser;
additional parts of the interacting party as the core server include any one or any combination of the following:
a verifying unit configured for verifying, based on the code issuing request from the releaser, whether a code issuing agency appointed by the code issuing request has rights for autonomously generating a coding medium; wherein when the appointed code issuing agency has rights for autonomously generating a coding medium, the sending/receiving unit of the interacting party as the core server sends, to the appointed code issuing agency, an authorization of allowing the code issuing agency to autonomously generate the coding medium; and
a rule managing unit configured for formulating or updating the coding rules and the decoding rules matching the coding rules based on the policy provided by the policy releasing agency.

52. The information processing network according to claim 40, wherein:
any interacting party has disclosure rights set with respect to the information received thereby and/or sent therefrom, the disclosure rights being configured for defining a plurality of conditions for receiving and/or sending information; wherein some conditions include attribute states of the any interacting party, or attribute states of other interacting party.

* * * * *